US011651216B2

United States Patent
Dalli et al.

(10) Patent No.: US 11,651,216 B2
(45) Date of Patent: May 16, 2023

(54) AUTOMATIC XAI (AUTOXAI) WITH EVOLUTIONARY NAS TECHNIQUES AND MODEL DISCOVERY AND REFINEMENT

(71) Applicant: UMNAI Limited, Ta'Xbiex (MT)

(72) Inventors: Angelo Dalli, Floriana (MT); Kristian D'Amato, Attard (MT); Mauro Pirrone, Kalkara (MT)

(73) Assignee: UMNAI Limited, Ta' Xbiex (MT)

( * ) Notice: Subject to any disclaimer, the term of this patent is extended or adjusted under 35 U.S.C. 154(b) by 0 days.

(21) Appl. No.: 17/836,569

(22) Filed: Jun. 9, 2022

(65) Prior Publication Data
US 2022/0398460 A1    Dec. 15, 2022

Related U.S. Application Data

(60) Provisional application No. 63/208,797, filed on Jun. 9, 2021.

(51) Int. Cl.
*G06N 3/08*    (2006.01)
*G06K 9/62*    (2022.01)
*G06N 3/04*    (2023.01)

(52) U.S. Cl.
CPC ............ *G06N 3/08* (2013.01); *G06K 9/6201* (2013.01); *G06K 9/6261* (2013.01); *G06K 9/6262* (2013.01); *G06N 3/0481* (2013.01)

(58) Field of Classification Search
CPC ...... G06N 3/08; G06N 3/0481; G06K 9/6201; G06K 9/6261; G06K 9/6262
See application file for complete search history.

(56) References Cited

U.S. PATENT DOCUMENTS

2022/0261659 A1\*    8/2022    Xu ........................... G06N 3/08

OTHER PUBLICATIONS

Bolon-Canedo et al., "A framework for cost-based feature selection", Jan. 28, 2014, Pattern Recognition 47(2014), pp. 2481-2489. (Year: 2014).\*

\* cited by examiner

*Primary Examiner* — Brent Johnston Hoover
(74) *Attorney, Agent, or Firm* — Maier & Maier, PLLC

(57) ABSTRACT

An exemplary model search may provide optimal explainable models based on a dataset. An exemplary embodiment may identify features from a training dataset, and may map feature costs to the identified features. The search space may be sampled to generate initial or seed candidates, which may be chosen based on one or more objectives and/or constraints. The candidates may be iteratively optimized until an exit condition is met. The optimization may be performed by an external optimizer. The external optimizer may iteratively apply constraints to the candidates to quantify a fitness level of each of the seed candidates. The fitness level may be based on the constraints and objectives. The candidates may be a set of data, or may be trained to form explainable models. The external optimizer may optimize the explainable models until the exit conditions are met.

30 Claims, 25 Drawing Sheets

Model Search Flowchart

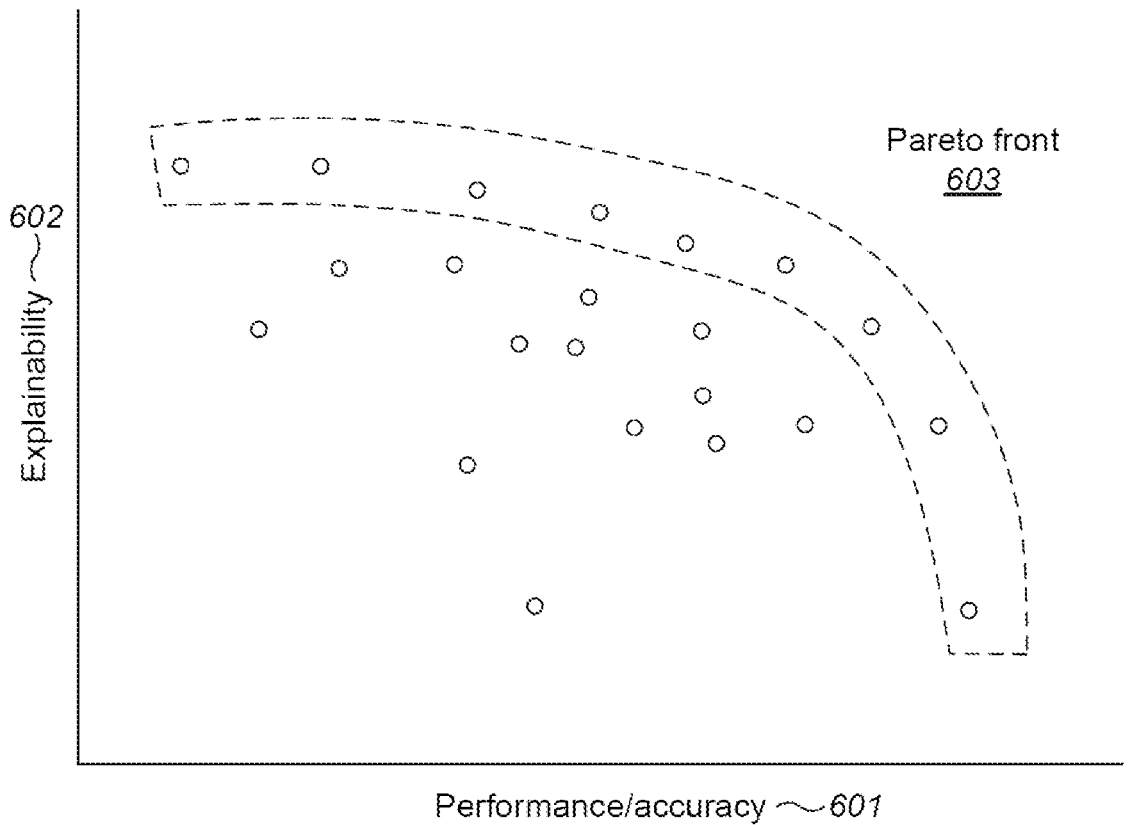
Figure 1 – Pareto Front

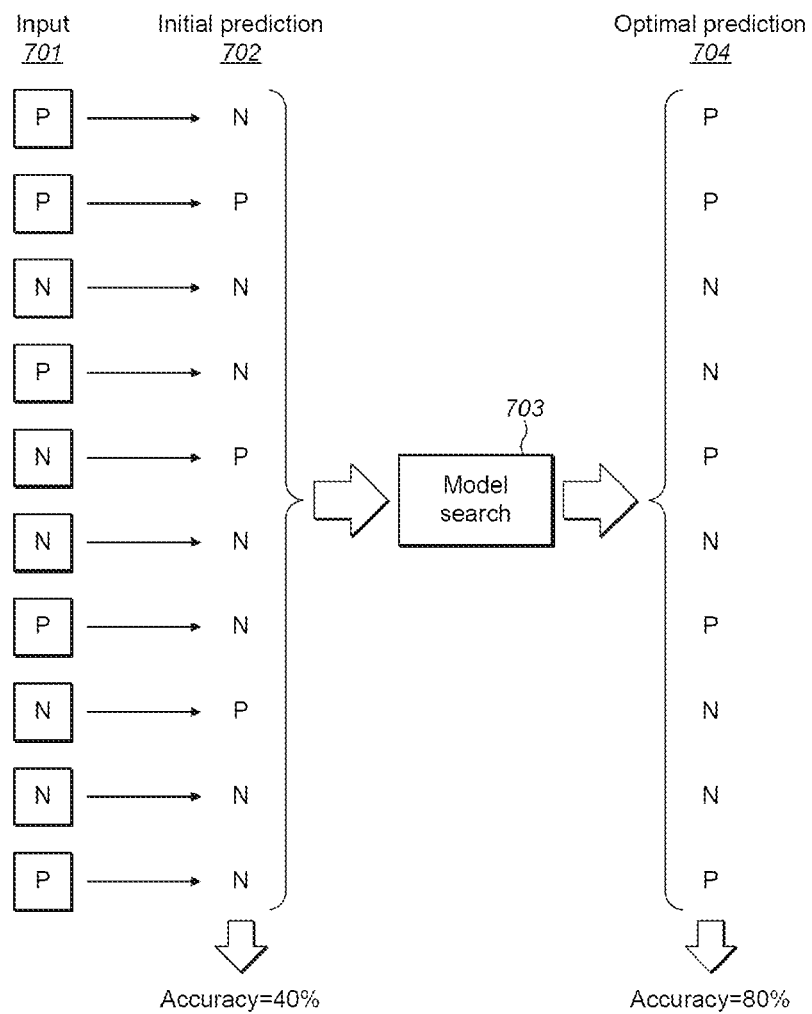
Figure 2 – Input and Output of a Candidate Model Before and After Model Search

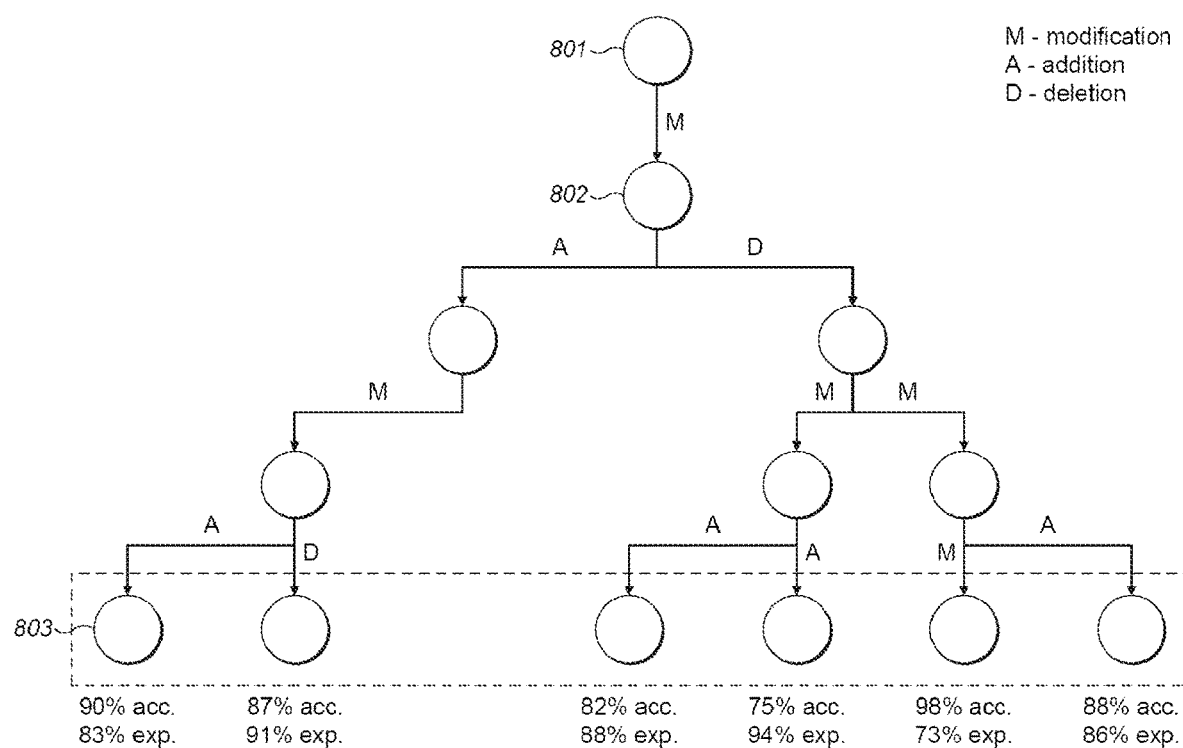
Figure 3A – Visualized Evolution of Candidate Models

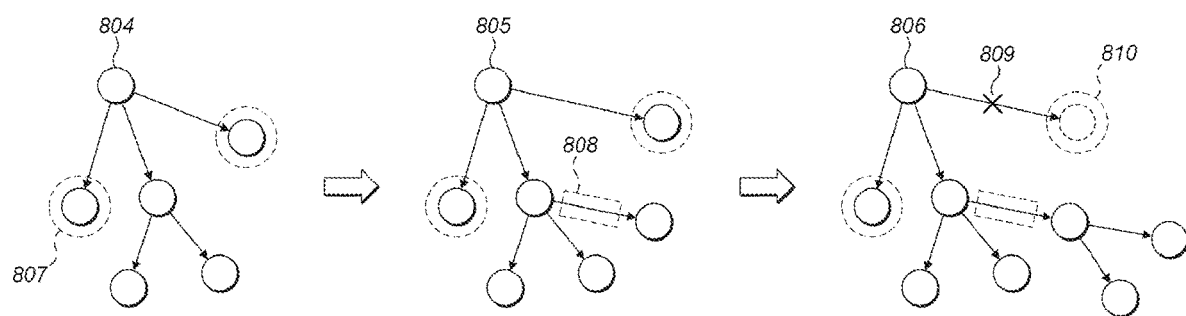
Figure 3B – Visualized Evolution of Labelled Partitions

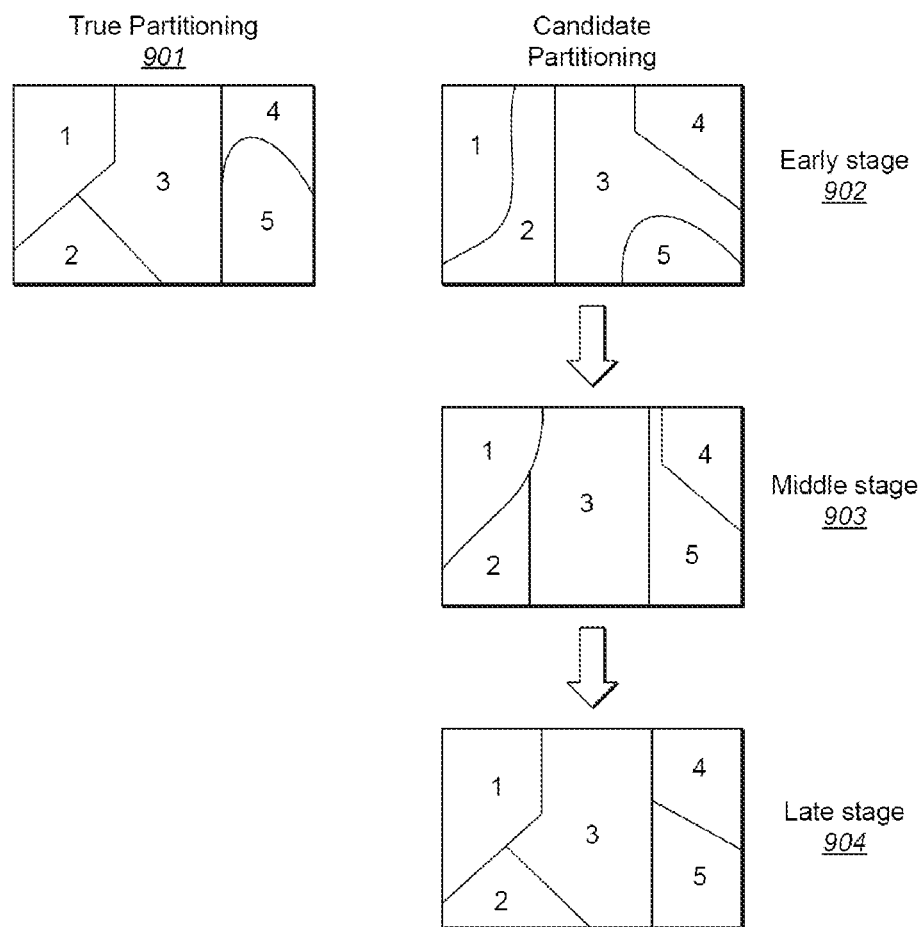
Figure 4 – Evolution of Partitions optimized by Model Search

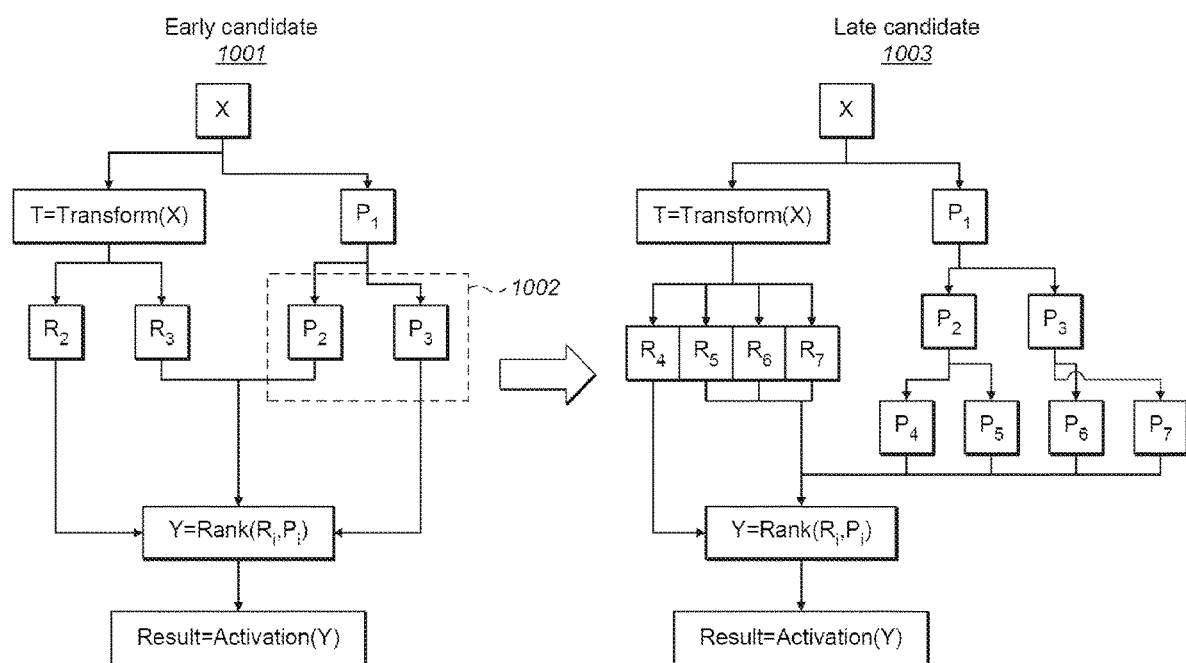
Figure 5 – Evolution of XNN Model optimized by Model Search

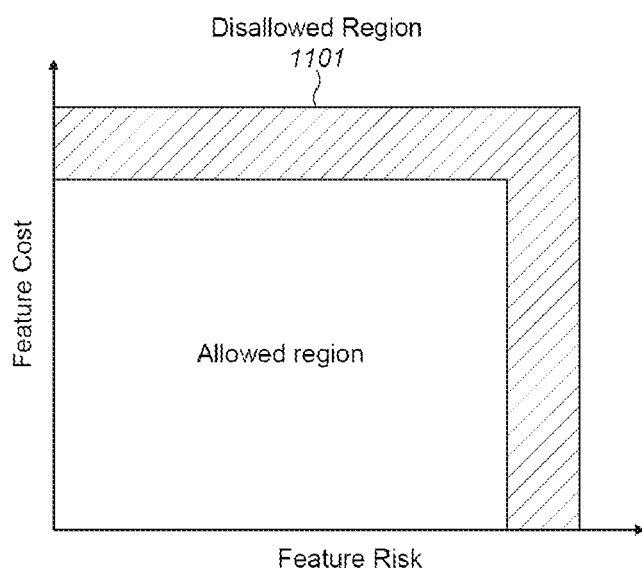
Figure 6 – Exemplary hard constraint expressed as a disallowed region

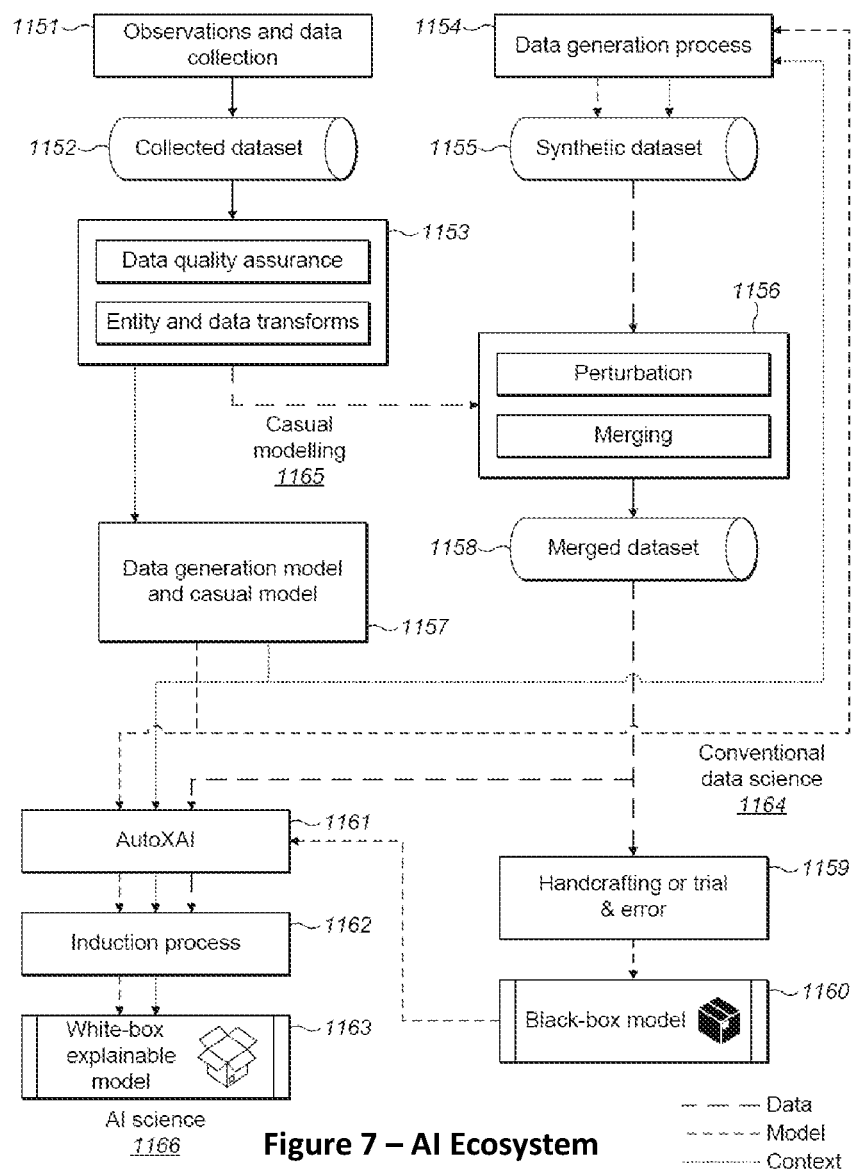
Figure 7 – AI Ecosystem

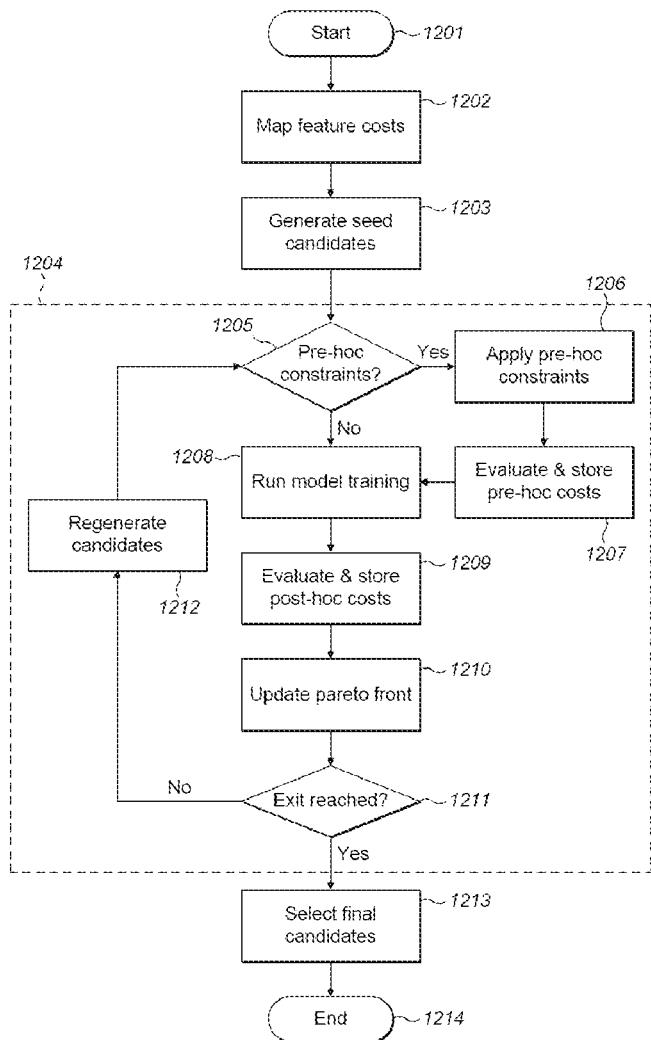
Figure 8 – Model Search Flowchart

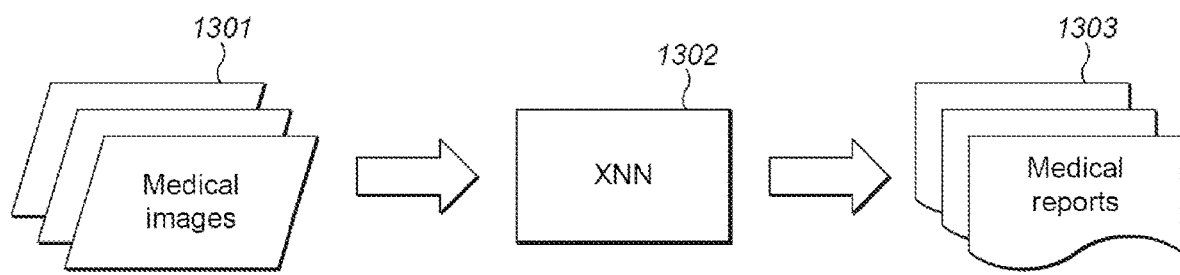
Figure 9A – Exemplary embodiment of an XNN applied to medical imaging

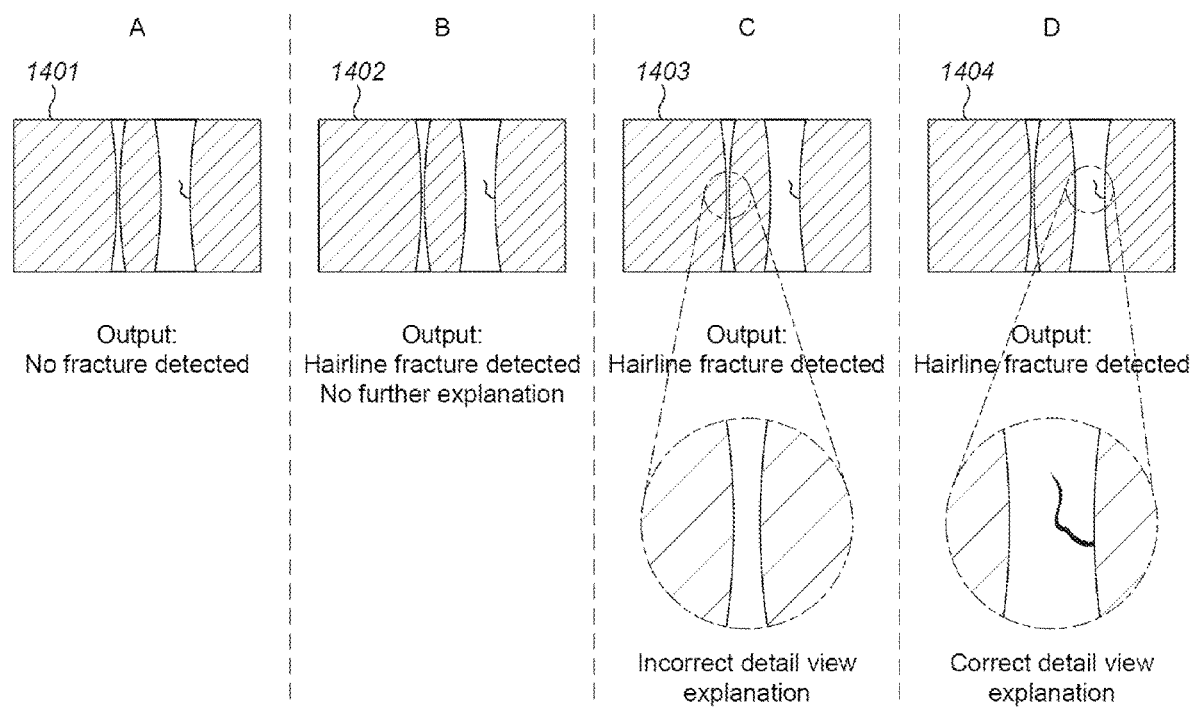
Figure 9B – Output from model search applied to medical imaging

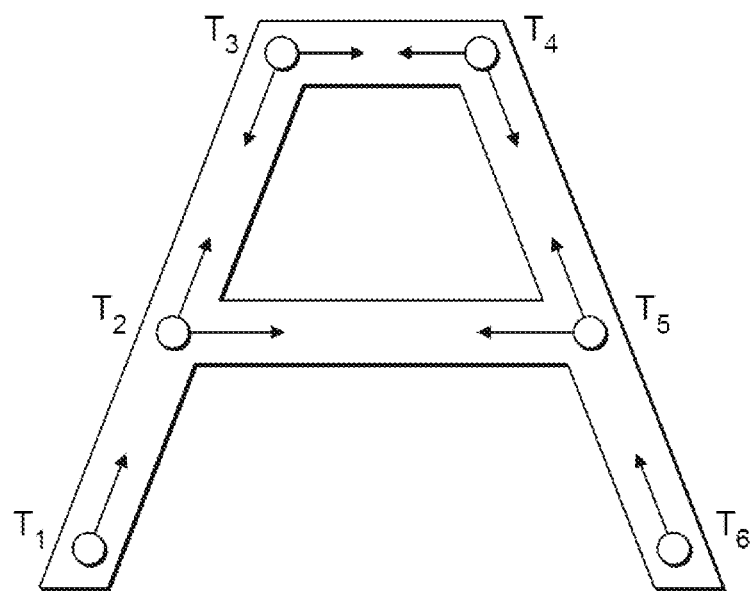
Figure 10A – Exemplary embodiment of an XAI system applied to engineering (physical model)

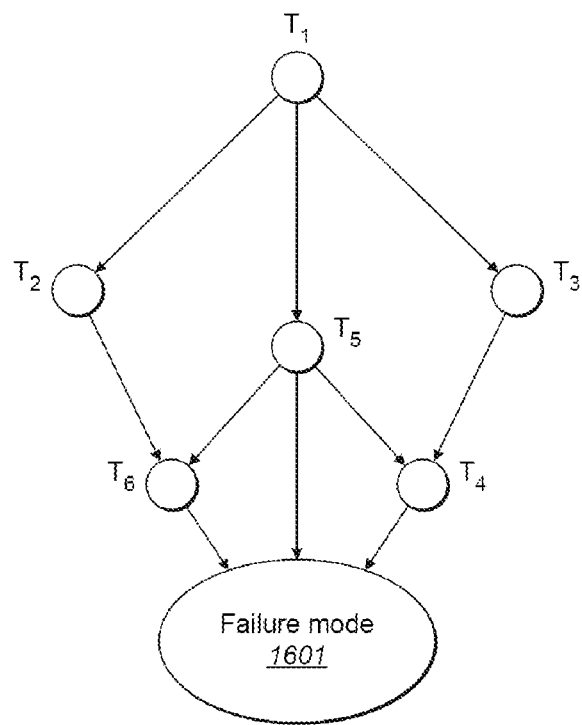
Figure 10B – Exemplary embodiment of an XAI system applied to engineering (causal model)

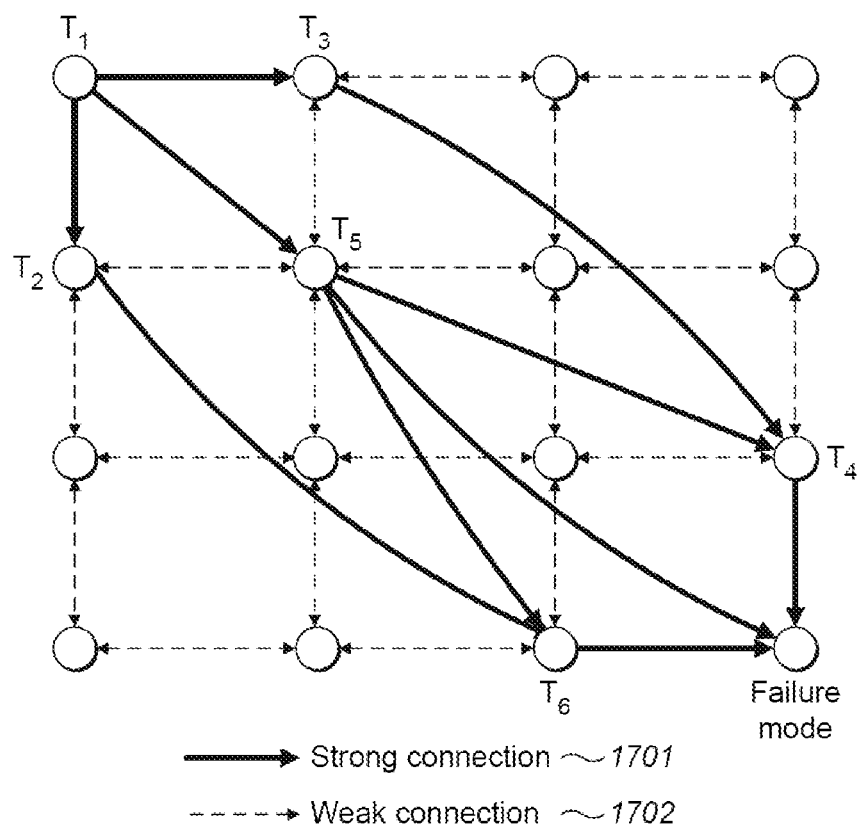
Figure 10C – Exemplary embodiment of an XAI system applied to engineering (XSN model)

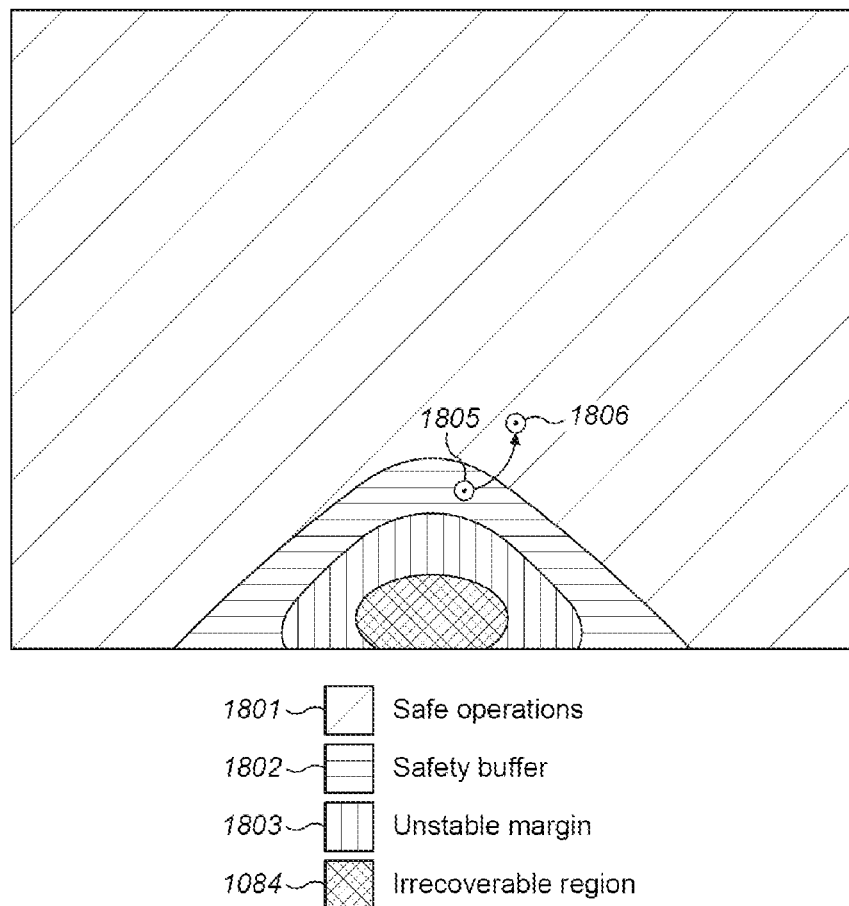
Figure 11 – Exemplary illustration of a flight envelope

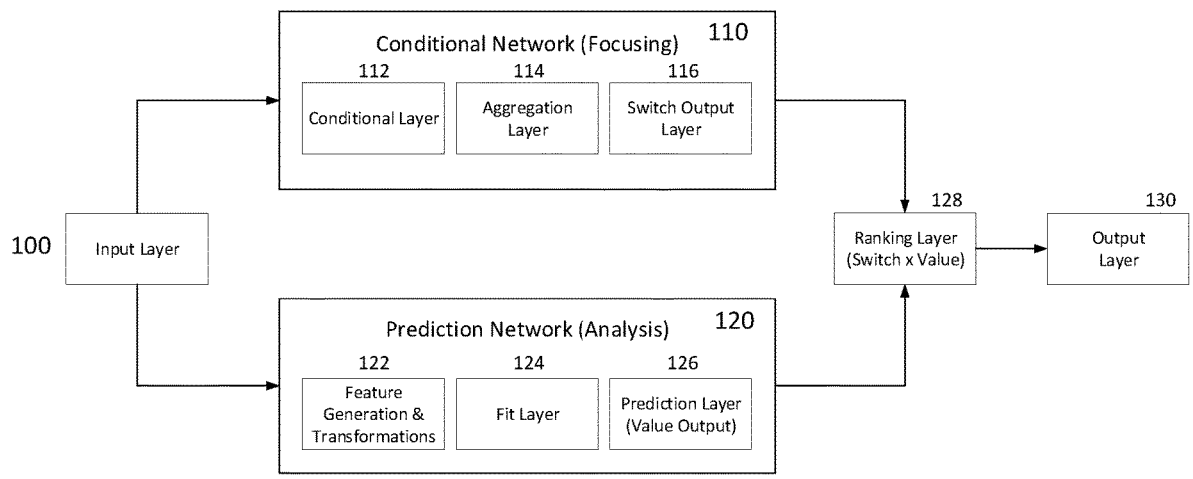
Figure 12 - XNN Architecture

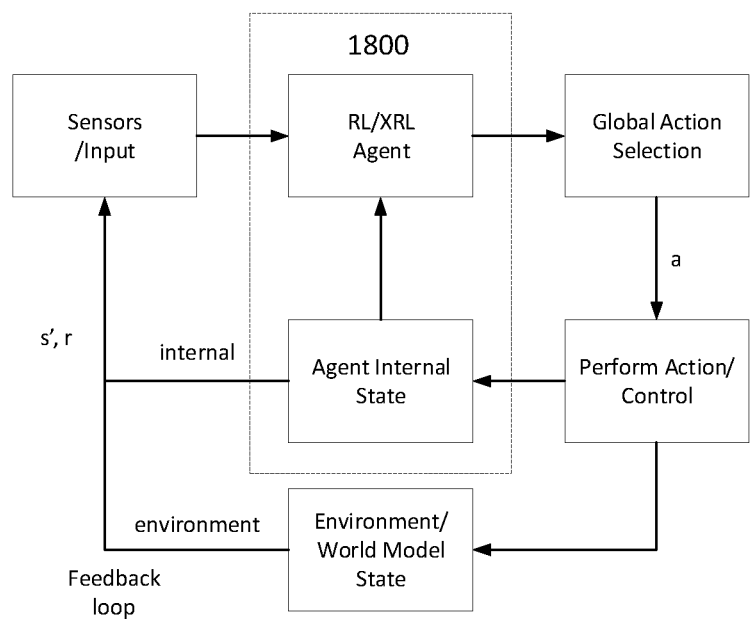
Figure 13 – RL Agent FSM/Markov Process

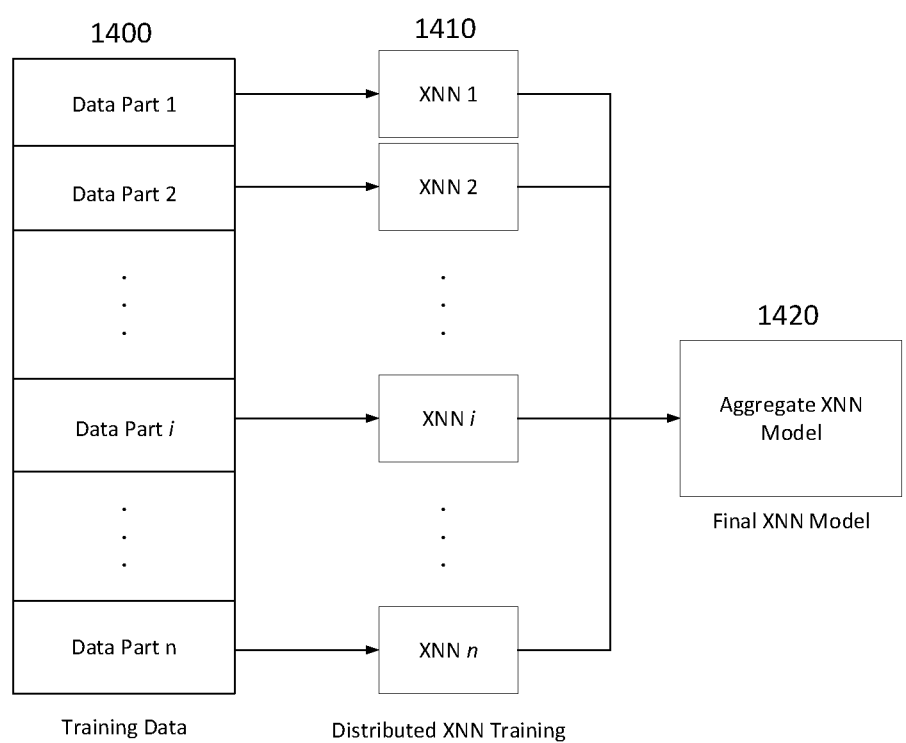
Figure 14 – High Level Architecture of a Distributed XNN Training System

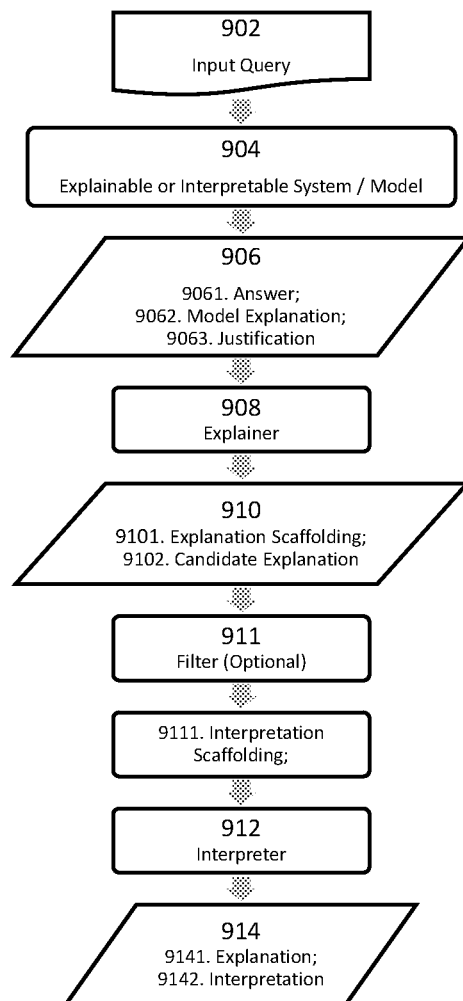
Figure 15A – Exemplary Explanation and Interpretation Process and Outputs

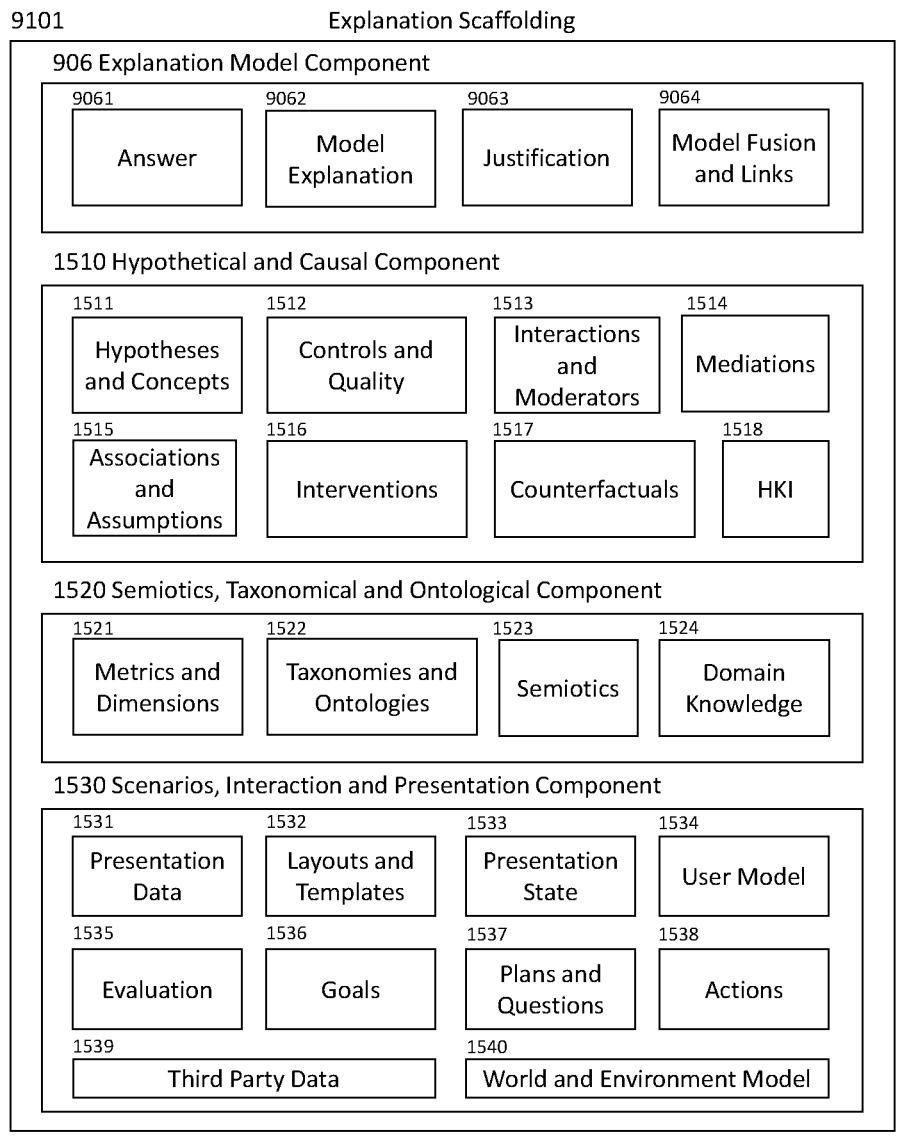
Figure 15B – Explanation Scaffolding Structure

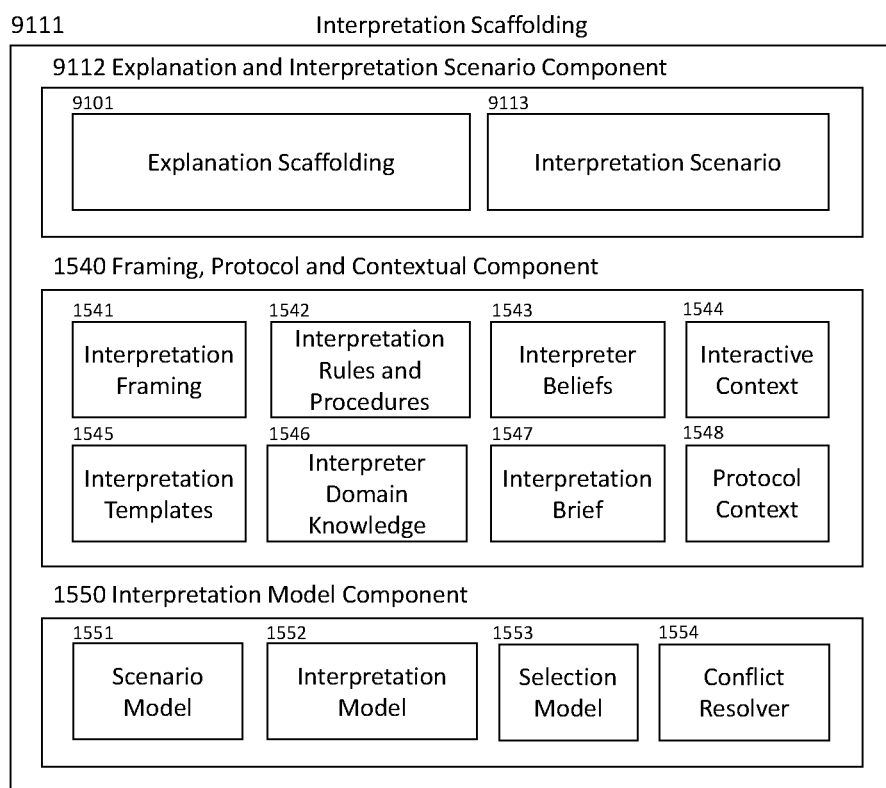
Figure 15C – Interpretation Scaffolding Structure

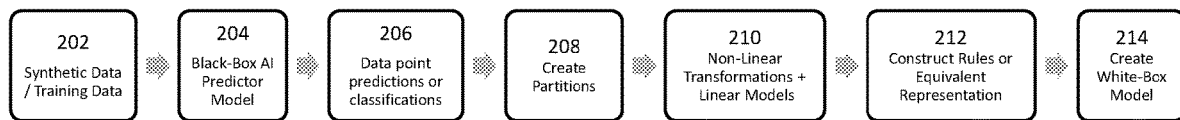
Figure 16 – Exemplary Induction Method

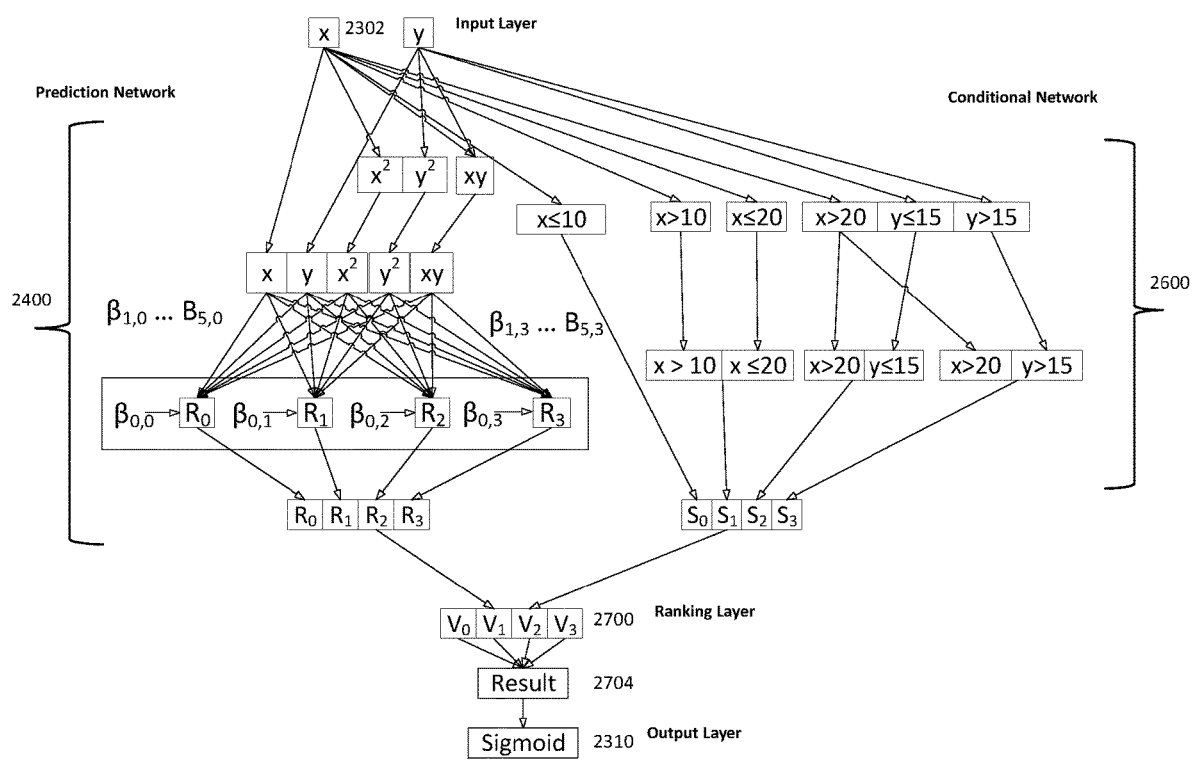
Figure 17 – Exemplary XNN Architecture

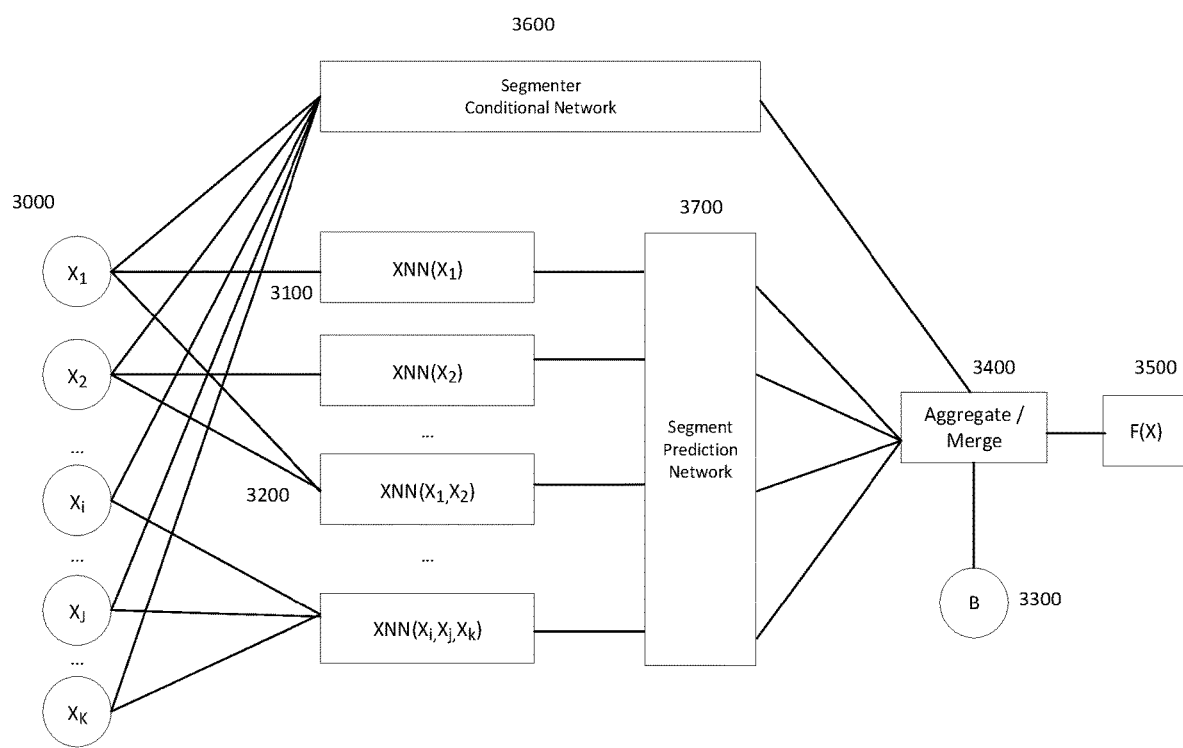
Figure 18 – Exemplary Network with XNN Sub-Graphs and Global Segmentation

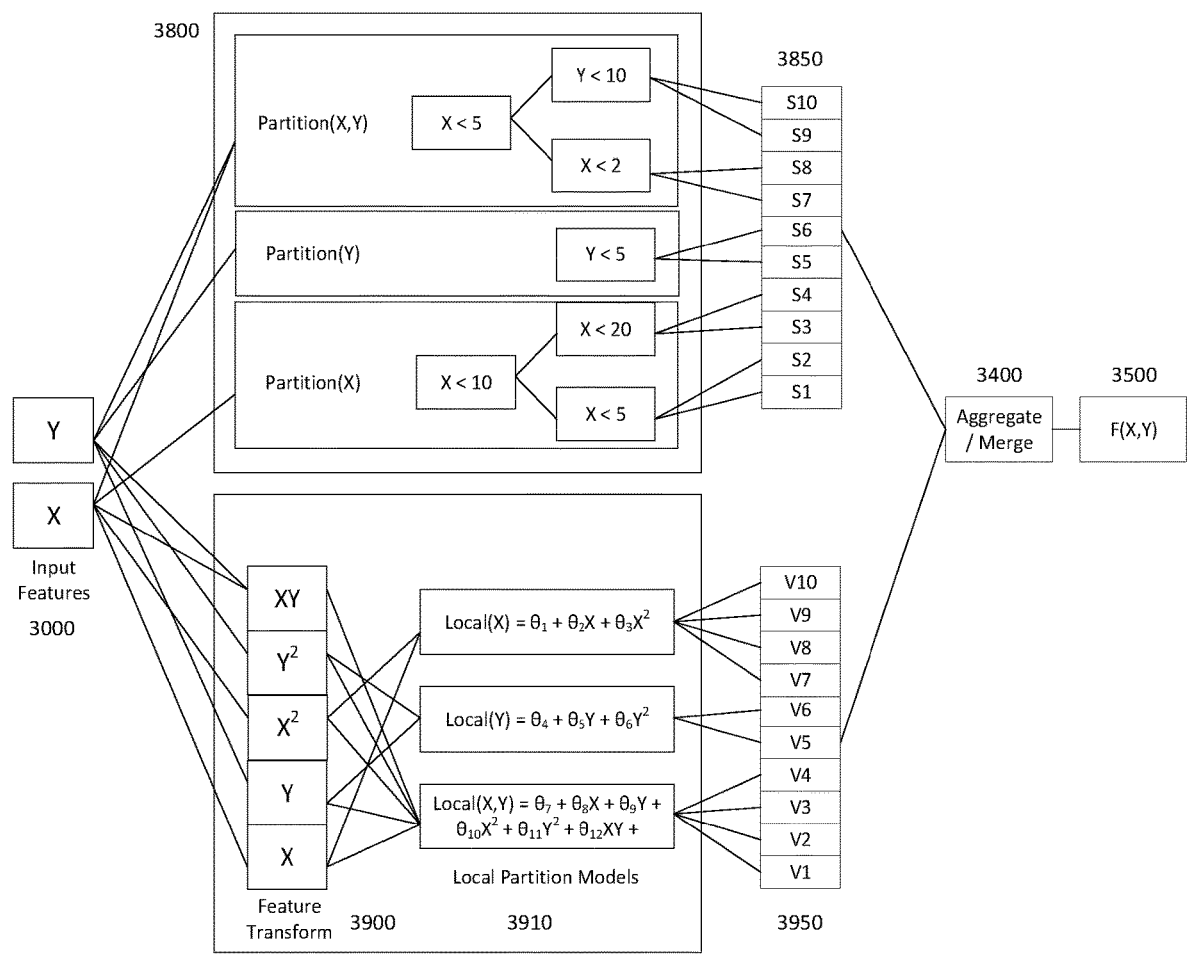
Figure 19 – Exemplary XNN Sub-Graphs Simplified as a Single Graph Network

AUTOMATIC XAI (AUTOXAI) WITH EVOLUTIONARY NAS TECHNIQUES AND MODEL DISCOVERY AND REFINEMENT

FIELD

An exemplary embodiment relates to the field of artificial intelligence.

BACKGROUND

Machine learning models have achieved widespread use and popularity over the last decade, enabled by cheaper computing power. This has made possible model architectures of exponentially increasing size and power, reaching state-of-the-art performance over several important problems. However, even though conventional machine learning (ML) models may successfully learn to solve a problem, the learning algorithm itself often uses parameters (called hyperparameters) that are handpicked and handcrafted arbitrarily by researchers.

Elsken et al., "Neural Architecture Search: A Survey" (2019b) is a highly cited, recent survey paper on neural architecture searching (NAS). It determines that NAS can be split into three components:

The search space may assume some type of constraints on the possible networks (e.g., chained layers), along with layer types and hyperparameters (e.g., stride, kernel size, etc.). It describes the range of possibilities any architecture can take. Some search algorithms look for motifs or blocks, i.e., repeating constructions, rather than the smallest-granularity units like layers. This helps to keep NAS more tractable. The choice of the search space may largely determine the difficulty of the optimization problem.

Search strategies may commonly include random search, Bayesian optimization, evolutionary methods, reinforcement learning (RL), and gradient-based methods, some of which may be highly compute-intensive. Zoph and Le, in "Neural Architecture Search with Reinforcement Learning", for example, used "800 GPUs for three to four weeks" in 2017. Newer methods, however, may improve efficiency. Evolutionary techniques may be popular, but as far as internal optimization is concerned, SGD-based weight optimization methods currently outperform evolutionary ones on large modern architectures, therefore typical neuro-evolution techniques optimize only the architecture, and leave the weight changes to gradient descent methods.

Feature selection and engineering is not usually subsumed under NAS— which seeks to optimize architectures on given input features—but it may be included as a part of the process of the broader AutoML workflow.

A study by Real et al., "Aging Evolution for Image Classifier Architecture Search" (2019) concludes that "RL and evolution perform equally well in terms of final test accuracy, with evolution having better anytime performance and finding smaller models." It may be noted that some formulations of Bayesian Optimization can outperform evolutionary algorithms.

Performance is only estimated in the prior art for the purpose of helping to reduce the computational demand of running a full training on each candidate architecture.

Performance estimation can be of several types: (i.) Lower-fidelity estimates (e.g., training on fewer data, for fewer steps, etc.); (ii.) Learning curve exploitation; (iii.) Weight inheritance and network morphisms (i.e., warm-starting instead of training from scratch); (iv). One-shot models and weight sharing (where each model is considered a subgraph of a larger one-shot model, which is trained only once for all the models).

Multi-objective optimization (MOO) may be used to solve problems that have competing objectives. Some MOO methods weight the different measures according to their importance, essentially scalarizing the problem and converting the original problem into a single-objective optimization problem. Another technique—the ε-constraint method—minimizes one objective while keeping the other objectives at user-set values or subject to inequality constraints. Other techniques may also be employed for these purposes, including the weighted metric method and evolutionary algorithm MOO techniques.

A few published papers deal directly with multi-optimization in NAS (balancing performance against memory consumption and computational demand, for instance). One good example is "Neural Architecture Search: A Survey", by Elsken (2019b), noted earlier, which penalizes high resource requirements and iteratively improves the Pareto front defined by the performance/resource-demand contour.

There are few examples of published research dealing with multi-objective optimization in the context of generic AutoML. One paper dealing with work in a similar direction is by Pfisterer et al., "Multi-Objective Automatic Machine Learning with AutoxgboostMC" (2019). This work takes a MOO approach to the AutoML workflow—including, among other things, feature selection, engineering, NAS and hyperparameter optimization. It also seeks to optimize the fairness, interpretability, and robustness of its resulting systems. Smithson et al., "Neural networks designing neural networks: Multi-objective hyper-parameter optimization" (2016) uses neural networks to predict the Pareto front (i.e., the best multi-objective performers) on a given problem, with good results. This can greatly reduce the resource usage of performance estimation in the AutoML/NAS workflow, as well as help suggest near-optimal configurations—in effect, suggesting a prior of initial configurations to work from, as opposed to random initialization, and dramatically reducing run-time.

Liu et al., "A Survey on Evolutionary Neural Architecture Search" (2021) gives a broad overview of evolutionary techniques in NAS. Among other evolutionary techniques, Particle Swarm Optimization (PSO), features heavily. Although PSO is established both for single- and multi-objective search, this survey paper states that PSO for multi-objective search is still a largely unexplored field. Applications of PSO and MOO in an explainable AI context seems to be an entirely novel approach that is not yet found in literature.

SUMMARY

An exemplary embodiment may implement an explainable model search. An exemplary embodiment may implement automatic machine learning and neural architecture search techniques in an explainable artificial intelligence or system. An exemplary model search may provide optimal explainable models based on a dataset. An exemplary embodiment may identify features from a training dataset, and may map feature costs to the identified features. The search space may be sampled to generate initial or seed candidates, which may be chosen based on one or more objectives and/or constraints. The candidates may be iteratively optimized until an exit condition is met. The optimization may be performed by an external optimizer. The external optimizer may iteratively apply constraints to the candidates to quantify a fitness level of each of the seed candidates. The fitness level may be based on the constraints and objectives. The candidates may be a set of data, or may be trained to form explainable models. The external optimizer may optimize the explainable models until the exit conditions are met.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 1 is an illustration of an exemplary Pareto front defined in two dimensions, explainability and accuracy.

FIG. 2 is a representation of exemplary input and output of a candidate model before and after a search process.

FIG. 3A is an exemplary visualization of the evolution of candidate models.

FIG. 3B is an exemplary visualization of the evolution of partitions in XAI models.

FIG. 4 is an exemplary illustration of the evolution of partitions in XAI models optimized by a model search process.

FIG. 5 is an exemplary illustration of the evolution of an XNN model optimized by a model search process.

FIG. 6 is an exemplary illustration of a statistical constraint used as prior knowledge input to the search process.

FIG. 7 is a representation of an exemplary AutoXAI ecosystem.

FIG. 8 is an exemplary method flowchart illustrating an exemplary model search process.

FIG. 9A is an exemplary embodiment of an XNN system applied to an exemplary medical imaging data set.

FIG. 9B is an illustration of exemplary output from an XNN system applied to an exemplary medical imaging data set, showing possible types of output failure and success.

FIG. 10A is an exemplary engineering embodiment of an XAI system showing the relationship between physical input variables.

FIG. 10B is an exemplary causal model shown as a directed acyclic graph embodying the engineer problem in FIG. 10A.

FIG. 10C is an exemplary embodiment of an XSN system applied to the exemplary engineering problem in FIG. 10A.

FIG. 11 is an exemplary illustration of a flight envelope displaying various stages of safety.

FIG. 12 is a schematic of an exemplary explainable neural network architecture.

FIG. 13 is a schematic of an exemplary reinforcement learning agent/Markov process.

FIG. 14 is an exemplary high-level architecture of a distributed XNN.

FIG. 15A is an exemplary schematic of an explanation and interpretation process.

FIG. 15B is an exemplary schematic of an explanation scaffolding structure.

FIG. 15C is an exemplary schematic of an interpretation scaffolding structure.

FIG. 16 is a schematic flowchart of an exemplary model induction method.

FIG. 17 shows an exemplary XNN graph.

FIG. 18 shows an exemplary XNN with smaller XNN sub-graphs.

FIG. 19 shows an exemplary XNN with sub-graphs simplified as a single graph network.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. The described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

Machine learning models have made possible model architectures of exponentially increasing size and power, reaching state-of-the-art performance over several important problems. Although conventional machine learning (ML) models may successfully learn to solve a problem, the learning algorithm itself often uses parameters (called hyperparameters) that are handpicked arbitrarily by the researcher. There are a wide range of hyperparameters, some describing the model architecture itself (such as dimensions and type), others describing the learning algorithm (such as learning rate), yet others the selection of input features.

An exemplary embodiment may implement an explainable neural network (which may be considered a form of XAI). Referring now to exemplary FIG. 12, FIG. 12 may illustrate a schematic diagram of an exemplary high-level XNN architecture. An input layer 100 may be inputted, possibly simultaneously, into both a conditional network 110 and a prediction network 120. The conditional network 110 may include a conditional layer 112, an aggregation layer 114, and a switch output layer (which outputs the conditional values) 116. The prediction network 120 may include a feature generation and transformation 122, a fit layer 124, and a prediction output layer (value output) 126. The layers may be analyzed by the selection and ranking layer 128 that may multiply the switch output by the value output, producing a ranked or scored output 130. The explanations and answers may be concurrently calculated by the XNN by the conditional network and the prediction network. The selection and ranking layer 128 may ensure that the answers and explanations are correctly matched, ranked and scored appropriately before being sent to the output 130.

The processing of the conditional network 110 and the prediction network 120 is contemplated to be in any order. Depending on the specific application of the XNN, it may be contemplated that some of the components of the conditional network 110 like components 112, 114 and 116 may be optional or replaced with a trivial implementation. Depending on the specific application of the XNN, it may further be contemplated that some of the components of the prediction network 120 such as components 122, 124 and 126 may be optional or replaced with a trivial implementation.

It may further be contemplated that in some circumstances, the selection and ranking layer 128 and the output 130 may be combined together into one integrated component. For optimization purposes, the XNN may also be implemented with both the conditional network 110 and the prediction network 120 together with all their components merged together into one network. This merged conditional and prediction network may also be merged together with a combined selection and ranking layer 128 and the output 130. This optimization will still result in a logically equivalent XNN, which may be faster for feed forward processing but may suffer when it comes to training via backward propagation and gradient descent techniques.

The XNN can thus be implemented in a way that there is the input layer 100, and a combination of the conditional network 110 and the prediction network 120, including the conditional layer 112, aggregation layer 114, switch output layer 116, feature generation and transformation layer 122, fit layer 124, prediction layer 126, and ranking layer 128 leading to the output 130. This combination may apply to all embodiments and implementations of the XNN, including both software and hardware implementations. The transformation capabilities of XNNs in this regard are unique and unparalleled in other neural network implementations since the white-box nature of XNNs allows flexibility without affecting the logical behavior of the XNN, although this improves size/space usage, performance, resource usage, trainability, and overall throughput.

The XNN may include a feature generation and transformation layer 122 that contains polynomial transformation neurons as well as a concatenation or fit layer 124, whereby it may combine all polynomial features into one layer.

An exemplary embodiment of a prediction network 120 using a linear model may utilize polynomial equations represented by or mathematically equivalent to the following exemplary polynomial equation:

$$f(x,y)=\beta_0+\beta_1 x+\beta_2 y+\beta_3 x^2+\beta_4 y^2+\beta_5 xy$$

The feature generation and transformation layer 122 may produce a set of variables which are of relevance to the output. The fit layer 124 may produce the set of coefficients which weigh the variables obtained in the feature generation and transformation layer 122. Finally, the coefficients may be analyzed, and a value may be produced in the value output layer 126.

The feature generation and transformation layer 122 is used to implement any advanced transformations that may be applied to the input features and relevant data, such as non-linear transformations. In an exemplary embodiment where a polynomial transformation is being applied, polynomial transformation neurons may be utilized, which may model polynomial equations using a system of specially interconnected weights and neurons that enable a white-box approach to polynomial transformations. The fit layer 124 may be used to implement any model fitting and prediction methods including but not limited to linear and non-linear fitting methods, Fourier series, multi-dimensional Bezier curves, recurrence relations, causal operators, etc. The value output layer 126 combines the value answers together and ensures that they can be combined into a matched pair including an answer together with its corresponding explanation.

Multiple such pairs may be generated if more than one partition has been selected by the XNN focusing step as determined by the conditional network 110. The XNN can be implemented to work completely in parallel, generating plausible answer and explanation pairs which are then filtered and selected at a later stage via the output of the conditional network 110. Both parallel and sequential implementations of the XNN are thus possible, as the implementation can be tweaked to the particular application domain and also to fit within the implementation constraints of the system being utilized to realize the XNN.

High-degree polynomials may successfully be used in order to model complex data, yet may still be uninterpretable, as well as computationally intensive in a high dimensional space. An XNN may instead split the fit of the entire model into multiple smaller fits. This may be done through the concept of "partitions". A partition models a specific region within the entire model. Partitions can be overlapping or non-overlapping, depending on their configuration. In the case of overlapping partitions, some priority function may be used to determine which partition to activate. The process to identify partitions is part of the initialization process of the XNNs. When implemented in hardware, partitions can be implemented either using rewriteable addressable memory or similar type of memory, or hardcoded into a circuit for performance, usually with a tradeoff between flexibility and performance, depending on the specific hardware implementation chosen.

When it is possible to fit data using polynomial features, the resulting model may be intuitive. In a standard neural network, modelling non-linearity simply involves adding multiple layers together with activation functions. This may be feasible, but the resulting model may be a black-box and may not be explainable in an intuitive way.

Alternatively, if data can be modeled with something simpler, such as a polynomial fit, polynomial transformations can be embedded within the neural network itself and linear/logistic regression may be added following the transformations. The resulting configuration is considered a white-box.

It may be contemplated that the transformation function may utilize at least one of (i) a sub-neural network, (ii) a gradient descent-based method such as back-propagation, (iii) subsets of an explainable neural network. The transform function pipeline may further contain transforms that analyze sequences of data that are ordered according to the value of one or more variables, including temporally ordered data sequences.

Some neural network architectures may output interpretable results, but these results might not be fully model interpretable. Hence, these neural network architectures are considered black-box, or grey-box if some inner components are considered model interpretable. XNNs offer advantages over these neural network architectures, for example, by providing an output interpretable and fully model interpretable system (white-box). Unlike black-box neural networks, XNNs uniquely use partitions to structure a model into well-defined and interpretable local models. Additionally, since black-box architectures are only output interpretable, it may not be possible to encode the network into machine and human readable rules. Therefore, black-box models may only be capable of providing local explanations, and may not be capable of providing global interpretability directly from the model structure. Since none of these other types of neural network architectures may incorporate the concept of partitioning, the functions that model the different components in these alternative structures may often require a complex non-linear transformation, which may turn out to be entirely a black-box component; this restricts these alternative architectures to being output interpretable and not model interpretable. For full model interpretability understanding of the model, it may be noted that the transformations within the different components should also be interpretable, which may be provided by exemplary embodiments of XNN structures. XNNs may adopt a wide-network approach through the different partitions, thus enabling transformations to be simpler and easier to understand, rather than complex and opaque as with deep networks. It may further be contemplated that XNNs may also support inner components which make use of a deep network structure, thus in combination may be superior to any existing neural network architectures.

XNNs may differ from present state-of-the-art in several aspects: First, XNNs may implement hierarchical features (or hierarchical concepts) through the notion of partitions and rules. In XNNs, an exemplary function f(x) may refer to a local function, which models the feature importance within a specific partition. The combination of all the functions may create a global interpretable model. Further, XNNs may utilize an external process to identify suitable partitions during their initialization, yet also support further training using back-propagation and related techniques.

Since XNNs may be encoded into rules and may make use of an external process to initialize the structure of the XNN partitions, it may be possible to embed human knowledge within the neural network. Thus, XNNs can mix human knowledge and machine-generated knowledge. Knowledge in the form of rules could be refined to create a global model which can also function in a local manner. The current technology is not capable of functioning as such, as a typical neural network is simply used to fit a single large function.

An XNN may be a true white-box, and thus does not suffer from any reconstruction losses or any classification losses. A reconstruction step may not be needed by the XNN, and a precise classification may be created as part of the explanation by the XNN in a lossless manner. All information needed to come up with the classification is preserved by the XNN, and additionally all the activation paths and methods used are also easily identifiable without any additional computational cost.

Hierarchical clustering techniques or other logically equivalent methods can be used for identifying suitable partitions, such as an XAI model induction method which may input a set of training data to a black-box system and analyze the corresponding output using a partitioning function.

In an exemplary embodiment that may use a hierarchical clustering method for partitioning, a variety of appropriate methods may be used for a practical implementation including, but not limited to, agglomerative clustering, divisive clustering, relocation partitioning, probabilistic clustering, k-medoid methods, k-means methods, fuzzy clustering, density based clustering, grid based methods, gradient descent based methods, evolutionary methods, region splitting, region growing, sub-space clustering, projection methods, co-clustering methods and lazy clustering methods.

The input to the partitioning method can be either the input features directly for low-dimensional data (i.e., tabular) or data which has been pre-processed (for example, from a convolutional network). Features which have been transformed using a convolutional process may typically represent a higher-level of abstraction such as an edge, a stroke, or a pattern.

The partitions may be initially created as part of the XNN by an external process that creates the initial XNN, such as the model induction method illustrated in FIG. 16. However, once created, the XNN can use gradient descent methods to further refine the partitions if desired. The XNN partitions may either be locked by having their values set as static values that cannot be changed or can be movable dynamically for each backward training pass using standard back-propagation and related techniques.

Hierarchical clusters may be converted into logically equivalent flat clusters prior to hardware deployment. Additionally, the hierarchical structure can be either pre-calculated and converted to an appropriate hardware implementation, or in the case of more advanced hardware such as FPGAs, can also be implemented locally onboard. Each part of the hierarchy can be implemented either as part of the same hardware circuit or as a set of components that can correspond to a sub-set of the hierarchy. In this manner, a high degree of parallelism can be achieved natively in hardware, especially in high performance applications.

Additionally, the white-box nature of XNNs allows for additional ways of changing the partitions and values using techniques such as Genetic Algorithms and Monte Carlo Simulation Methods, or via Casual Logic and Simulation techniques. These additional ways are not normally available for standard neural network implementations due to their black-box nature, giving a distinct advantage to XNNs. The XNN partitions may be hierarchical rather than just a flat partition. (However, flat partitions may be encompassed by the definition of a hierarchical structure. As such, flat partitions may be supported as a sub-set of hierarchical partitions where there is just a single level.) The utilization of a hierarchy allows for more expressive explanations to be generated that more adequately models the expected nature of a good explanation.

The white-box nature of XNNs gives distinct advantages when implemented in hardware in comparison to a typical black-box ANN, Deep Learning network, and similar types of models. As each part of the XNN is understood and interpretable, logical equivalence between different circuit types can be established in a proven manner, transforming, and optimizing the circuit, for example, for space efficiency or for overall throughput speed. These kinds of transformations cannot be achieved using a black-box model. Additionally, white-box XNNs allow for action triggers to be implemented in hardware, allowing for fast real-time signaling to occur without needing to pause or stop the network in any manner. Triggers may be defined on particular conditions occurring within the network and may be either configurable or hardcoded in a circuit. Upon triggering, a signal is raised which then activates some other part of the circuit to perform an action, hence the name action triggers.

Explainable reinforcement learning (XRL) may refer to an exemplary explainable reinforcement learning process. An exemplary embodiment may be based on the Bellman equation. XRL may introduce explanations to the actions and the environment where the XRL system is deployed. An action may refer to the input provided to the environment, which may be calculated by applying a policy to the current state. This may be discrete or continuous. The set of all possible actions may refer to the action space.

FIG. 13 shows an exemplary reinforcement learning agent FSM/Markov Process. An exemplary embodiment may include an action selection and ranking 1800, that is, some action a for the current state s, which leads to state s'. The reward is denoted by r. The reinforcement learning agent may have a simulation of the environment used in the action selection process. The model may have additional connection points, depending on the structure of the model itself.

An exemplary XRL modification introduces explanations as part of the model/environment model. The world model may return a partial or full explanation regarding the state s' and the reward r, which may be defined as $x_e$. Another modification may be in the action space, which may introduce an associate explanation, a, $x_a$, which may denote an action and explanation of the action, respectively. A policy may refer to the mapping from a past experience to an action. The policy Π, in XRL may become $Π_x$, which may refer to an explainable mapping.

In terms of behavioral finite state machines (FSM), each (state, action) pair can have a constant connection point prior to making the action, after selecting the state, during the action, and after the action is made. For reinforcement learning and XRL, another connection point may be before, during, and after the selection of the action under a policy ff. This may be applicable when the action space and/or the state space is either discrete or continuous. Explanations in the XRL learning process may lead to better safety and control mechanisms since they may allow for better understanding of the inner working of the system which may require adjustments, monitoring, and automatic/manual interventions.

Explainable Transducer/Transformers (XTT) may provide an alternative embodiment which may use: (i.) one or more transducers in a pipeline that outputs the answer together with an explanation as part of the transduction process, and/or (ii.) a suitable transformer architecture, that may optionally be a replacement for gated recurrent neural networks or similar types of machine learning models, where the attention mechanism is extended to cater to the creation of the explanation alongside the answer. The encoder part of the transformer may encode information about which parts of the input data are relevant to each other, together with information about what parts of the explanation data are relevant to each other and may encode this data in a latent space that may include both the answer and the explanation. The decoder part of the transformer may decode the encodings while using the attention mechanism to construct and then output both the answer and its associated explanation. It may be contemplated that alternative embodiments may, for example, use separate latent spaces for the answer and the explanation, and other logical modifications may be found that may be useful for practical and efficient implementations, for example, for large scale parallel processing. Hardware deployments may also be contemplated.

An exemplary embodiment using Interpretable Neural Networks (INNs) may provide an architecture which can automatically generate an explanation using existing deep learning techniques and are fully compatible with AutoXAI. INNs may utilize existing software infrastructures and hardware used for neural networks and may also remain fully compatible with backpropagation training techniques.

An exemplary INN architecture may include a feature transformer which converts the input to some hidden features, and a number of relevance estimators which transform the hidden features to feature weights. The feature weights are then combined with the transformed input in order to extract the attribution of each input transformed feature. The resulting feature attributions may then be aggregated for the result. Feature attribution may be extracted at different levels. For example, attribution may be linked directly with the original inputs. In other cases, such as with embodiments implementing convolutional neural networks (CNN), feature attribution may also be computed for higher-level features which may be found in kernels and filters. Additionally, INNs may split the model into various partitions, thus enabling a higher-level of flexibility and interpretability, by enabling a mixture of local or segmented explainability. In some cases, INNs are also capable of providing global explainability.

In mathematical terms, an exemplary transformation network may be denoted as a function T(X). Similarly, $θ_j(X)$ represents the relevance function of the jth partition. If X→T (X) returns a vector with z transformed dimensions, then X→$θ_j(X)$ also returns a vector with z coefficients, or relevance weights. It may be assumed that $|T(X)|=|θ_j(X)|=z$.

INNs may be flexible enough such that complexity may be modeled through various options and possible configurations. The functions X→T (X) and X→$θ_i(X)$ may be a deep neural network which allow for modelling complex abstract features. It may be contemplated that the combination of T(X) and θi(X) may represent various embodiments of explainable models which are possible to implement with the INN architecture.

An exemplary embodiment may include a conditional network 806, where the neural network handles the conditional aspect of the model. For example, an embodiment may evaluate rules in the form of IF-conditions in order to activate one or more partitions. The output of Ci(X) may be binary. It may be noted that the partitions may be static or dynamic, and may be discovered either through an external partitioning process such as AutoXAI or through a connected neural network. It may also be noted that INNs may also function with only one partition. For example, for all values of X, $C_i(X)$ may always be one (1). This is equivalent to having zero partitions. In this exemplary case, there is no need to apply a partitioning method to find suitable partitions.

The switch layer may select the activated partition. If more than one partition is activated, some ranking function may be applied. The result may be generated through the result layer.

An exemplary embodiment may use causal modelling as part of an explainable framework. Causal inference may measure the effect of causes on specific units. For example, a medical application where causes t and c are known and modelled using a causal DAG may implement causal inferences. The output variable y of a causal inference may measure the effect of the causes on a target u, and can be illustrated as $y_{t(u)}$ and $y_{c(u)}$. The effect of the cause t on a target u relative to cause c on a target u may be measured, for example, as shown in the following equation:

$$Y_t(u) - Y_c(u) \qquad (8)$$

Coefficients or weights may be extracted from the explainable model and used as input to the causal inference model. The output of a causal model may be used to trigger an event or a terminal action in the system.

Referring now to the exemplary embodiment in FIG. 14, FIG. 14 may illustrate an exemplary high-level architecture of a distributed XNN training system. An exemplary distributed explainable architecture DEA may be utilized in a behavioral model framework in order to increase the performance of the defined models. A distributed explainable architecture DEA may contain multiple explainable architectures $DEA_x$, where these architectures may be processed in parallel. The number of explainable architectures 1410 in a distributed framework may be defined as $DEA_n$. FIG. 14 illustrates a high-level architecture of a distributed training system, where $DEA_x$ is the XNN architecture and $DEA_n$ is n models.

Distributed explainable architecture DEA may split the dataset 1400 into multiple subsets 1410 of data in order to train the explainable architectures $DEA_x$. The models trained in a distributed framework DEA are aggregated 1420 during the training phase by calculating the average (or weighted average) from the parallel models. The aggregate model may be formed based directly on the weights of the model, rather than from the result of the individual models. An exemplary distributed explainable architecture DEA may be useful for large datasets where the training data cannot fit in the CPU/GPU memory of a single machine.

A distributed explainable architecture DEA may include hybrid models, such that the models in the architecture are a mix of explainable models, such as XAI, XNN, XTT, XRL, XSN, or XMN, or any other logically equivalent or similar architectures. An exemplary embodiment may implement multiple different models. For example, one data part may implement an XNN while another data part of the same system may implement an XAI. The models may then be combined to create an aggregate model. The aggregate model may be a hybrid model implementing multiple different models.

An exemplary embodiment of a distributed explainable architecture DEA may incorporate multiple independent models where one model, once trained, can work independently without the need to rely on the full distributed architecture, which may be optimized primarily for training purposes. The models in a distributed explainable architecture DEA may be a variant of the explainable architectures. Variants may include convolutional XNNs (CNN-XNNs), predictive XNNs (PR-XNNs), text XTTs (T-XTTs), and the like.

In an exemplary embodiment, an AutoXAI system may be implemented as a distributed system using a heterogeneous mixture of compute nodes and hardware. Different techniques like Horovod, hierarchy or mixture of machine experts, and intelligent message passing may be used to increase the overall throughput and minimize processing time.

In an autonomous system or semi-autonomous system, a behavioral model BM may include feedback actions as an input to the underlying explainable architecture. Feedback actions may represent feedback processes of sub-components within the behavioral model system of the system or an update process that is received from the server of the behavioral system BM.

An exemplary scenario of a feedback process task may refer to an output from a trigger t in $BM_t$ being used to update specified internal parts of the explainable architecture in $BM_x$. This may be possible since explainable architectures in $BM_x$ are white-box models and the coefficients or weights and internal parts of the white-box models are interpretable. This operation may not be possible when using black-box models in the behavioral model BM.

Human knowledge injection or system knowledge injection is another type of input in a behavioral model BM for autonomous or semi-autonomous systems. The coefficients θ of an explainable architecture x within a behavioral model BM may be modified to enforce specific rules. Rule enforcement may also be activated by a conditional constraint located in $BM_c$, where $BM_c \in \{c_1, \ldots, c_n\}$. Activation may fire an event e, where event e may activate a trigger t where such rule enforcement is passed using a feedback action to an explainable model or causal architecture.

Behavioral model BM may include an explainable architecture x. Input constraints may be included during the formal verification of the explainable architecture of an exemplary behavioral model $BM_x$. Input constraints may be based on the internal coefficients or weights of the white-box model, or the feature attributions constructed for the input dimensions of observation o. Feature attributions may identify the importance of a given feature with respect to the result. In an exemplary embodiment, explainable architectures may extend the verification process of behavioral modeling by allowing additional constraints to be designed on feature attributions in order to formally verify the white-box model for potential bias detection in the system.

The output of an exemplary behavioral model BM within an autonomous or semi-autonomous system may include a model interpretation to be used for an explainable update to the user of the system. The model interpretation may also be used to update the underlying explainable architecture $BM_x$ or to update a sub-component within the autonomous or semi-autonomous system.

Examples of explainable or interpretable systems and structures may include, but are not limited to, those based on induced eXplainable artificial intelligence (XAI) models, Interpretable Neural Nets (INNs), eXplainable Neural Nets (XNN), eXplainable Transducer Transformers (XTT), eXplainable Spiking Nets (XSN), eXplainable Memory Net (XMN), eXplainable Reinforcement Learning (XRL), eXplainable Generative Adversarial Network (XGAN), eXplainable AutoEncoders (XAE), eXplainable CNNs (CNN-XNN), Predictive eXplainable XNNs (PR-XNNs), Interpretable Neural Networks (INNs) and related grey-box models which may be a hybrid mix between a black-box and white-box model. Although some examples may reference one or more of these specifically (for example, only XRL or XNN), it may be contemplated that any of the embodiments or examples described herein may be applied to XAIs, XNNs, XTTs, XSNs, INNs, XMNs, and any other contemplated system or explainable model interchangeably. An exemplary embodiment may apply fully to the white-box part of a grey-box model and may apply to at least some portion of a black-box part of a grey-box model. It may be contemplated that any of the embodiments described herein may also be applied to INNs interchangeably.

FIGS. 15A, 15B, and 15C may illustrate an exemplary explanation and interpretation generation system (EIGS) that may serve as an exemplary embodiment of an explainable AI system for use with AutoXAI. An EIGS may be based on an exemplary explanation and interpretation generation pipeline illustrated in FIG. 15A. The exemplary embodiment in FIG. 15A may be distinguished by the three-part process of explanation, filtering, and interpretation, where the filtering step may be optional. An embodiment that produces at least an answer 9061 and its explanation 9141 from an input query 902 may be logically equivalent to the exemplary pipeline in FIG. 15A to some extent.

An exemplary embodiment may begin with an input query 902, representing a data sample, scenario or other question which is currently being examined, which may be then processed through three components: the explainable or interpretable system/model 904, the explainer 908, and the interpreter 912. Each of the three components may produce different outputs which are input to the next component in the process pipeline. It may be contemplated that the input query 902 is not limited to a specific data sample or scenario, and may relate to the entire model (global model explainability) or a modular explanation which deals with a specific component of the interpretable model.

The explainable or interpretable system/model 904 may produce an answer 9061, together with an optional model explanation 9062 of that answer, and optionally a justification 9063 of the answer and/or its model explanation. The justification 9063 of the answer and/or its model explanation may be an explanation of the model explanation (i.e., a meta-explanation) that gives additional information about the assumptions, processes and decisions taken by the explainable or interpretable system/model 904 when outputting such answer and/or model explanation.

The explainer 908 may produce an explanation scaffolding 9101, together with an optional candidate explanation 9102. In an exemplary embodiment, the candidate explanation may be generated as a result of processing of the explanation scaffolding 9101 and can be used to evaluate the contents of the explanation scaffolding in some form of iterative process involving unsupervised or supervised learning and optimization.

The filter 911 is an optional component that may transform and filter the explanation scaffolding 9101 and the interpretation scaffolding 9111, for example, after the explainer 908 has produced output but before the interpreter 912 starts.

The interpreter 912 may produce an explanation 9141, together with an optional interpretation 9142 of that explanation, using an interpretation scaffolding 9111.

The end result 914 of the explanation process may include either an explanation and/or its interpretation, which may be consumed by a human user, another application, another system component forming part of a larger embodiment, or some other automated system.

Note that FIG. 15A presents one exemplary embodiment of a pipeline, and that the pipeline may be implemented in various alternative embodiments that may omit or combine one or more components, and/or execute them in a different order and sequence. For example, in a practical implementation embodiment, it may be contemplated that both components 908 and 912 can be omitted together with their respective outputs 908 and 914. In another exemplary embodiment, components 908 and 912 can be combined together as a single component that produces a combination of the outputs 908 and 914. In another contemplated embodiment, a simplified implementation of the interpreter 914 may take the candidate explanation 9102 and output it as the explanation 9141.

It may be contemplated that in the case of a global (i.e., model level) explanation or a query-less application embodiment, even the input query 902 can be omitted without losing the logical equivalence to the exemplary pipeline in FIG. 15A to some extent.

It may be contemplated that some combination of outputs in FIG. 15A may be combined together or omitted altogether in a practical embodiment. For example, the justification 9063 may be deemed optional in some applications, while the interpretation 9142 may be left for a human interpreter or expert to create instead of an automated system.

An interpretable machine learning system may be thoroughly understood and have its functionality and internal behavior (model interpretability), answers (output interpretability) and explanations interpreted and understood by an interpreter. The final explanations accompanying the answers might not require further post-hoc processing on their core structure, although additional cycles of processing to add syntactic and semantic information and to contextualize and personalize the explanation may be contemplated, as illustrated in FIG. 15A, where the explanation 9141 goes through different stages of transformation and enhancement before it gets to a final stage.

The explanation scaffolding 9101 can also store audit data in appropriate components such as the actions 1538 or the evaluation 1535 components, or via an independent audit system plugged in to the third-party data 1539 extension component.

The interpretation scaffolding 9111, illustrated in FIG. 15C, can also store audit data in appropriate components such as the interactive context 1544 or the protocol context 1548 components. The interpretation scaffolding 9111 may be structured into three main components, the explanation and interpretation scenario component 9112, the framing, protocol, and contextual component 1540, and the interpretation model component 1550.

The explanation and interpretation scenario component 9112 may include a suitable version of the explanation scaffolding 9101, such as the one illustrated in FIG. 15B, together with an interpretation scenario 9113. The interpretation scenario 9113 may be used to aid in the creation and configuration of an interpretation brief 1547. The interpretation scenario 9113 may optionally influence the behavior of the selection model 1553.

The framing, protocol, and contextual component 1540 may include the interpretation framing 1541, interpretation rules and procedures 1542, protocol context 1548, interpretation brief 1547, interpretation templates 1545, interpreter domain knowledge 1546, interpreter beliefs 1543 and interactive context 1544 components.

The interpretation framing 1541 may supply information on how the interpretation may be framed, including any specific models, representations, and simplifications that should be applied by the interpreter.

The interpretation rules and procedures 1542 may supply rules that govern how the interpretation should be created, how disambiguation should be carried out, and what procedures are applicable for the current interpretation.

The protocol context 1548 may contain information about the protocol to be used when processing the explanation scaffolding 9101, and how the different system agents components should communicate. In implementations that require an iterative interrogation sequence of some sort, such as a sequence of questions and answers, that may also involve further queries to the explainable machine learning system, the protocol context 1548 may also contain information about how the interrogation protocol should be implemented.

For example, in a regulated industry such as medicine, certain medical procedures mandate the use of approved medical protocols and processes. In a practical embodiment of a medical diagnosis system, the Protocol Context 1548 may contain details on what information to collect about a patient, in what format and manner it should be collected, and what processes should be applied to any hardware that is being controlled by the system and in what order.

The interactive context 1544 may contain information about interactive and iterative processes that need to be tracked during the interpretation process. The interactive context component 1544 may also generate audit logs containing information about the interactive and iterative processes performed and optionally transmit this audit log to the third-party data component 1539 in a secure and tamper-proof manner.

The interpretation brief 1547 may supply information to the interpreter on how the interpretation is to be carried out. The interpretation brief may be an output of the filters in an exemplary EFI model.

The interpretation templates 1545 may supply information to the interpreter on how the interpretation output and results are to be structured. This is distinct from the presentation information in the scenarios, interaction, and presentation component 1530 within the explanation scaffolding 9101, which is utilized to create a human and machine-readable version of the output as desired for both the explanation and its interpretation. There may be multiple interpretation templates whose selection is governed by the interpretation scenario.

For example, in a medical application, the interpretation templates for a particular medical scan may contain the mandatory and optional pieces of information that are needed as part of the interpretation, together with details about their format, confidence intervals, significance rules, red flagging rules and other suitable instructions.

The interpreter domain knowledge 1546 may contain additional domain-specific knowledge that is available to all interpreters. The information in the interpreter domain knowledge 1546 may be used to enhance and structure the interpretations 9142 via the interpretation scaffolding 9111. The interpreter domain knowledge component 1546 together with the third party data component 1539 within the explanation scaffolding 9101 may enable a practical method to extend the interpreter behavior via third party implementations, plugins, modules and other similar extension methods suitable for the application embodiment and to read and write interpreter domain-specific knowledge in the interpreter domain knowledge component 1546 via an appropriate system that ensures data security and access control.

The interpreter beliefs 1543 may contain a combination of domain-specific and domain-independent knowledge, together with scenario-specific information that is available to one or more interpreters. Each interpreter may share a subset of its interpreter beliefs with other parts of the system or may keep a subset private and thus effectively hidden from the rest of the system.

The interpretation model component 1550 may include the scenario model 1551, interpretation model 1552, selection model 1553 and conflict resolver 1554 components.

The scenario model 1551 may contain scenario-specific details about the current scenario that are needed by the interpreter in addition to the information available in interpretation scenario component 9112 and its sub-components, such as the explanation scaffolding component 9101 and interpretation scenario component 9113.

The interpretation model 1552 may contain a combination of domain-specific, scenario-specific and interpretation brief specific details that are needed by the interpreter in addition to the information available in interpretation scenario component 9112 and its sub-components.

The selection model 1553 may contain details on how the selection process will determine how the ranked and scored interpretations that may result from the interpreter or ensemble of interpreters be filtered and transformed into a final set of selected interpretation(s).

The conflict resolver 1554 may contain a combination of domain-specific and domain-independent knowledge, together with scenario-specific and interpretation brief specific information on how conflicts during the interpretation process and how conflicts between a combination of interpreters and filters should be resolved. The conflict resolver 1554 may additionally contain action triggers that are activated when the current conflict cannot be resolved within the current interpretation process. The action triggers may involve further calls to the explainable machine learning system that created the input or to other appropriate automated systems. It may be contemplated that some action triggers may require human intervention when the automated system determines that a situation has been encountered that cannot be handled in an automatic fashion or where it may be dangerous or otherwise problematic to do so.

Referring to the exemplary embodiment in FIG. 15C, FIG. 15C illustrates an exemplary embodiment of an interpretation scaffolding. Practical embodiments may merge some or all of the components and sub-components together or emit them completely. In an exemplary embodiment, the framing, protocol, and contextual component 1540 may be omitted completely in a simpler implementation. In a further modification example, the sub-components 1551, 1552, 1553 and 1554 of the interpretation model component 1550 may be merged into a single component without loss of functionality for many practical implementations.

In an alternative embodiment, the explanation scaffolding 9101 may be implemented separately from the interpretation scaffolding and input to the interpreter and/or a system implementing the EFI model as an independent component.

The audit and explanation advantages of an exemplary EIGS-based system may be superior to existing solutions, which are either implemented in a hard-coded and inflexible manner to comply with regulations, or may be flexible while relying on a black-box, rendering them impossible to use in a regulated application.

An exemplary embodiment may allow for a practical solution that incorporates modern, flexible machine learning methods within a white-box explainable and interpretable system that can be used in a regulated application.

The explanation scaffolding may be used to provide a practical embodiment of explanations and explanatory information for explainable machine learning systems and other automated systems.

FIG. 15B illustrates an exemplary structure for an explanation scaffolding 9101. The explanation scaffolding 9101 may be structured into four exemplary components: the explanation model component 906, the hypothetical and causal component 1510, the semiotics, taxonomical, and ontological component 1520, and the scenarios, interaction, and presentation component 1530.

In an exemplary embodiment that uses cause-and-effect modelling in its implementation, counterfactual component 1517 may contain information corresponding to Rung 3 (Counterfactuals) in Pearl's Ladder of Causation model (Pearl and Mackenzie, "The Book of Why," 2018).

It may be contemplated that counterfactual component 1517 may be integrated with a stationary or non-stationary stochastic process, such as a Markov process, Wiener process, Levy process, Monte Carlo process or other suitable process model to provide counterfactual capabilities from simulation results obtained by the process model.

It may be contemplated that counterfactual component 1517 may be integrated with a continuous or discrete dynamic systems model, phase space model, recurrent feedback control system model or other suitable process model incorporating cycles to provide counterfactual capabilities from simulation results obtained by a process model that incorporates cycles.

In an exemplary embodiment, components 1515, 1516 and 1517 may be used to form an ordered hierarchy of increasingly powerful causal implementation. For example, intervention component 1516 may use interventions together with associations from associations and assumptions component 1515 to determine answers 9061, model explanations 9062, candidate explanations 9102, explanations 9141, and justifications 9063. As a further example, counterfactual component 1517 may use counterfactuals together with interventions from intervention component 1516 and associations from associations and assumptions component 1515 to determine answers 9061, model explanations 9062, candidate explanations 9102, explanations 9141, and justifications 9063. Practical implementations may omit, simplify, or merge components 1515, 1516 and 1517 depending on the need to handle cause-and-effect explanations for that particular embodiment.

The HKI component 1518 may contain information that enables human knowledge to be incorporated and injected into the EIGS in the form of machine-readable rules, logical sentences, or any other suitable machine-readable format. It may be contemplated that a suitable interpretation process within HKI component 1518 may be used to translate natural language sentences to machine readable format for use by the EIGS. The EIGS may also use HKI component 1518 to incorporate feedback from human users in the explanation generation and interpretation process, and enable an element of collaboration between the machine learning system and human users in tandem with a combination of suitable interactive elements such as 1533, 1534, 1537, 1539, and 1544 or other suitable components within an exemplary EIGS.

The semiotics, taxonomical, and ontological component 1520 may include the metrics and dimensions 1521, taxonomies and ontologies 1522, semiotics 1523, and domain knowledge 1524 components.

The metrics and dimensions component 1521 may contain information about different systems of measurement needed to be utilized by the EIGS together with a combination of: (i.) underlying units and dimensions of measurement including but not limited to: (a.) a suitable distance function, (b.) differentiable manifold functions, (c.) translation, scale, and rotational invariant metric functions, (d.) vector space metrics, (e.) multiset functions, and (f). topological functions; (ii.) relationships between the units and dimensions; (iii.) relationships with the base standard topological space used within EIGS including suitable maps, atlases, and transition maps; (iv.) relationships to the base standard metric system within EIGS for conversion purposes; and (v.) translation processes from machine readable formats to human readable formats and vice-versa.

In an exemplary embodiment, the EIGS may utilize the International System of Units (SI) or the United States customary system (USCS) as its base metric system together with a n-dimensional Euclidean space, a Minkowski space, or Riemann space as its base topological space, together with suitable maps and transforms allowing for the correct conversion and interpretation of units, metrics, metric spaces, dimensions and topological spaces by the EIGS and associated components and machine learning systems.

It may be contemplated that an exemplary embodiment may utilize semiotics, taxonomical, and ontological component 1520 to transform encoded information and units used by machine learning systems, such as one-hot encoding, or word vector embedding encodings to their original unencoded format and vice-versa. It also may be contemplated that the EIGS may utilize semiotics, taxonomical, and ontological component 1520 may implement any relevant gradient-descent and/or dynamic programming function needed by the machine learning system, such as back-propagation, in a verifiably correct manner that outputs results in the format needed as input by relevant subsequent machine learning systems.

The taxonomies and ontologies component 1522 may contain information about taxonomies and ontologies that are used by the EIGS to enhance information in the model 904 and all of the EIGS components while providing a practical solution to the standardization of information to all the EIGS outputs including but not limited to the answers 9061, model explanations 9062, candidate explanations 9102, explanations 9141, justifications 9063, interpretations 9142, explanation scaffolding 9101, and interpretation scaffolding 9111. An exemplary taxonomies and ontologies component 1522 may also contain transformations and mappings between taxonomies and ontologies to facilitate the conversion and translation of taxonomical and ontological data between different taxonomies and ontologies.

An exemplary taxonomies and ontologies component 1522 may also be used to link taxonomies and ontologies to causal models stored in hypotheses and concepts component 1511, thus combining the element of cause-and-effect analysis within the hierarchical structuring provided by taxonomies and ontologies. This causal model link may be used to improve the creation of casual models and improve the resulting quality of the explainable machine learning systems themselves in an iterative process of improvement.

It may be contemplated that taxonomies and ontologies component 1522 may be utilized in extending the features of the models 904 with taxonomy trees, networks and graphs and ontological trees, networks, and graphs. It may be further contemplated that taxonomies and ontologies component 1522 may be utilized in blending and fusing knowledge found in taxonomies and ontologies with human and machine-generated knowledge, which in an exemplary implementation may be transmitted via components HKI component 1518 and 904 respectively, and may also utilize a combination of components 1521, 1523, 1524, 1546, 1539, and 1540 in a practical fusion implementation.

An exemplary embodiment may use the OECD taxonomy of knowledge classes and the Suggested Upper Merged Ontology (SUMO) merged with the YAGO ontology (YAGO-SUMO) as default base taxonomies and ontologies that are then extended according to the specific application implementation.

The explanation model component 906 may include the answer 9061, model explanation 9062, justification 9063, and model fusion and links 9064 components.

The answer 9061, together with an optional model explanation 9062 of that answer, and optionally a justification 9063 of the answer and/or its model explanation may be produced by the explainable or interpretable system or model 904. The justification 9063 may be used by system users to understand when the model 904 may be wrong.

The model fusion and links component 9064 may be used to store model fusion and linkage information that can be utilized to fuse answers, model explanations and justifications coming from a number of models 904 including but not limited to models hosted locally, remotely, via a number of data transmission networks, on the edge, and embedded systems, which are further deployed as a single or distributed model, or as ensembles. Models 904 may be implemented in a mixture of software running on general purpose hardware, software running on dedicated hardware, and various hardware implementation options or some other suitable implementation.

The model fusion and links component 9064 may also be used to store additional meta-data and information associated with a number of models 904 that may be present in the explanation scaffolding 9101 and/or the interpretation scaffolding 9111.

Component 9604 may also be used in conjunction with the taxonomies and ontologies component 1522 to utilize taxonomical and ontological information to aid in the fusion of multiple models 904 and their accessible datasets.

The hypothetical and causal component 1510 may include the hypotheses and concepts 1511, controls and quality 1512, interactions and moderators 1513, mediations 1514, associations and assumptions 1515, interventions 1516, counterfactuals 1517, and HKI 1518 components.

The hypothetical and causal component 1510 within the explanation scaffolding 9101 provides a practical solution for the integration of structural equation models (SEM), structural causal models (SCM) and causal directed acyclic graph (DAG) diagrams that may be used to model cause-and-effect within grey-box and white-box explainable machine learning systems.

Exemplary causal models that may be partially or wholly used in the implementation of causal component 1510 and/or the entire EIGS, may include a combination of Pearl's structural causal models and associated derivations and variations, dynamic causal models and associated Bayesian model comparison methods and variations, granger causal models, relativistic causal models arising from special and general relativity, and other suitable implementations that allow machine learning to represent cause-and-effect.

The hypotheses and concepts component 1511 may contain information about any applicable hypotheses currently applicable to the explanation and its subsequent interpretation. The hypotheses may also be subsequently evaluated against results from testing performed by the model 904. Hypotheses may optionally be used in order to structure the justification 9063 and the model explanation 9062.

Hypotheses that may be used in the implementation of hypotheses and concepts component 1511 may include a combination of: (i) trial hypotheses that provide a suggested outcome based on evidence, which needs to be tested and confirmed or rejected; (ii) abductive hypotheses that provide a suggested explanation that needs to be achieved or a goal that needs to be achieved; (iii) statistical hypotheses, of a suitable form such as the null hypothesis and alternative hypothesis pair; (iv) causal hypotheses, that provide a suggestion about whether one or more features recognized by the model 904 is an effect of a cause triggered by an interaction of one or more features recognized by the model 904.

Abductive hypotheses may be implemented via the appropriate abductive logic system appropriate for the specific EIGS embodiment, for example, Pierce's abductive logic system, and so on. Causal hypotheses may be implemented via the appropriate causal logic system appropriate for the specific EIGS embodiment, for example, if using Pearl's structural causal models, the implementation in hypotheses and concepts component 1511 may use a causal DAG, and so on.

Hypotheses evaluation methods may also be implemented as part of hypotheses and concepts component 1511, including but not limited to the evaluation of testability, falsifiability, the level of parsimony and compactness, scope, genericity, specificity, coverage, and the degree of fit with existing recognized knowledge-systems.

In an exemplary embodiment, an AutoXAI system may define a combination of actions, objective metrics, conditions, constraints, actions, triggers, and events that may utilize a combination of abductive, inductive, deductive logic in conjunction with causal logic. Using inductive logic, the AutoXAI system may predict future behavior based on generalized rules and knowledge that may have been learnt fully automatically. Using deductive logic, the AutoXAI system may predict behavior according to a combination of one or more conditions or constraints. Using abductive logic, the AutoXAI system may retrofit an observed scenario to a known set of possible states in the AutoXAI system or be able to explain the currently observed behavior in a reasonably acceptable manner. Abductive logic may also be useful in practical implementations of AI model discovery and optimization mechanisms based on diagnostic systems and can be used to aid in the diagnosis and troubleshooting of resulting AutoXAI system output using behavioral monitoring and predictive data. Abductive logic may also be useful in the creation of AutoXAI-based explanation narratives that fit an observed state, while inductive and deductive logic may be useful in the creation of AutoXAI-based explanation narratives in general, together with predictive-like narratives. Abductive logic may be useful in situations where the environment provides partial observability. AutoXAI systems may implement causal model specific functionality to handle cause-and-effect, handle association, intervention, and counterfactual causal logic, perform plausibility checks via environmental model input, and also augment training data via causally plausible isomorphisms.

The hypotheses and concepts 1511 component may also contain sets of concepts and a conceptual framework. Each concept forming part of the concepts set is associated with groupings of one or more hypotheses. The hypotheses may connect concepts by specifying the expected relationships between propositions for the relevant concepts, forming a conceptual framework via the hypothesis connection relationships. An exemplary conceptual framework can incorporate any combination of trial, statistical, and causal hypotheses, suitable items in the explanation scaffolding 9101 and also suitable items in the interpretation scaffolding 9111.

It may be contemplated that hypotheses and concepts component 1511 may be used to cluster different types of explanations into concepts, using a cognitive chunk model, such as the one described in (Doshi-Velez et al., "Towards A Rigorous Science of Interpretable Machine Learning," 2017) that details the different aspects that may be taken into consideration in the identification of suitable cognitive chunks.

In an exemplary embodiment, the cognitive chunks may be treated as a non-reducible subset of information within the explanation that are related via a relationship or similar association identified by either the model 904, the answer 9061, model explanation 9062, justification 9063, or the hypothetical and causal component 1510 and its sub-components. Further, the cognitive chunks are in a one-to-one or a one-to-many relationship between hypotheses stored in hypotheses and concepts component 1511.

The controls and quality component 1512 may contain information that may enable the EIGS to achieve a combination of: (i.) generation of output within desired quality parameters; (ii.) obeying compliance constraints within specific tolerance parameters; (iii.) storing and retrieving information about the state of qualitative or quantitative information of all variables and data available to the EIGS and its components such as the Explanation Scaffolding 9101 and Interpretation Scaffolding 9111; (iv.) determining whether the data available to the EIGS and its components are internally consistent; (v.) applying a combination of standardization, data cleansing, data transforms, data profiling, data matching, data linking, data conformity checks, data accuracy checks, data precision checks, data bias checks, and data interpolation methods to the data available to the EIGS and its components; (vi.) applying data privacy and access rules and specifications to the data available to the EIGS and its components; (vii.) triggering actions, modify and configure constraints and activate events and triggers in behavioral models (BMs) or similar systems; (viii.) validating, comparing and analyzing data available to the EIGS and its components in relation to a set of well-defined valid values of reference data to discover new or discrepant values; (ix.) applying data transforms, timestamp checks, data freshness checks, data retention policy compliance of all data available to the EIGS and its components against a defined service level agreement (SLA).

The EIGS may include various methods to reduce the number of data quality checks, according to exemplary embodiments where these are not included or not required. In an exemplary embodiment, the EIGS may use data from the model fusion and links 9064 to check for the source and reliability of the incoming data source, or from the interpretation framing 1541 or from the interpretation brief 1547 to determine what data quality check can be skipped safely.

In an exemplary embodiment, the EIGS may use controls and quality component 1512 together with semiotics 1523, and domain knowledge 1524 components to perform more complex data quality checks involving domain knowledge, to execute well-known processes and functions held in the domain knowledge against a subset of data available to the EIGS and its components, to perform a combination of: (i.) checks against a specific range of values or static interrelationships; (ii.) checks against aggregated process and functions held in the domain knowledge; (iii.) outlier checks and exception case flagging; (iv.) drift checks against nominal conditions that are prespecified or automatically discovered by a machine learning system; (v.) checks against BAU (business as usual) expectations; (vi.) checks using an explainable autoencoder/decoder (XAED) system for drift, shift and abnormality detection. Checks may be made via a combination of: (i.) simple generic aggregation rules; (ii.) complex logic functions on a group of attributes of data input to the well-known processes and functions held in the domain knowledge; (iii.) automatically discovered checks that have been discovered via a suitable machine learning process ran against the well-known processes and functions held in the domain knowledge.

The controls and quality component 1512 may contain control grouping information that can be used by the causal model utilized in the implementation of hypothetical and causal component 1510 and/or the entire EIGS. The grouping information may be utilized to control for a variable according to the different measured values of that variable, to ensure that the variable can no longer act as a confounder.

The controlled-for variables may be subsequently treated as input features both to the model 904 and the EIGS in order to separate their effects from explanatory variables that are utilized by the model 904 and/or the EIGS.

The counterfactuals component 1517 may contain information to mitigate the influence of confounders identified by intervention component 1516 without opening back-door paths to unknown confounders that may happen as a result of the application of the control grouping information in control and quality component 1512.

The interaction and moderator component 1513 may contain information about the statistical correlations and causal interactions identified in the model 904, the EIGS and its components. Statistical and causal interactions can be stored as a combination of: (i.) transformations and mappings of subsets of data features against one or more subsets of data features; (ii.) predictions from information embedded in some reconstructed state space, and/or latent space, and/or phase space; (iii.) statistical correlations and interactions and similar type of information; (iv.) causal interactions and similar type of information; (v.) co-occurrence statistics indicative of cause-and-effect; (vi.) estimator functions and estimands together with their resulting estimates.

In interactions and moderators component 1513, the estimator functions may be used to determine an estimate from an estimand, which can be any relevant piece of information identified in the model 904, the EIGS and its components. Estimator functions in the EIGS may be, for example, (i.) a point estimator that gives a single-valued result or a single vector-valued result or a result that can be expressed as a single function, or (ii.) an interval estimator that gives a range of possible values or vectors or functions. In an exemplary embodiment, the model fit evaluation implementation in hypotheses and concepts component 1511 may be used to determine whether the estimator functions in mediations component 1514 have a high level of fit possibly under increasingly specific constraints or a lower level of fit possibly under more generic and widely applicable constraints.

It may be contemplated that interactions and moderators component 1513 implements a suitable resampling method, applicable to any relevant piece of information identified in the model 904, the EIGS and its components, such as bootstrapping (including but not limited to case resampling, Bayesian, smooth, parametric 1511. Alternatives transmitted to hypotheses and concepts component 1511 may be used as the basis for the additional creation of a black-box machine learning model in cases where it may not be practical to create a standard white-box statistical or causal parametric model. Exemplary black-box machine learning models may in turn be induced to a white-box model and added to the collection of models 904 in an iterative process.

In interactions and moderators component 1513, statistical and causal interaction information may be used to discover the presence of moderators within any relevant piece of information identified in the model 904, the EIGS and its components. The EIGS may implement moderators as a categorical or a quantitative variable that affects the direction and/or strength of the relation between the interactions identified in interactions and moderators component 1513. In an exemplary embodiment, a combination of (i.) a suitable correlation analysis method such as the Pearson product-moment correlation coefficient (PPMCC); or (ii.) a suitable variance analysis method such as ANOVA may be used with a suitable machine learning method such as gradient-descent or mutual information-based methods to provide a practical moderator discovery implementation.

The mediations component 1514 may contain information about the statistical and causal mediations applicable in the model 904, the EIGS and its components. Statistical and causal mediation models may be stored in mediations component 1514, which may use a suitable machine learning process for the identification and creation of such mediation models, which may be serial or parallel in structure.

Statistical mediation models may refer to the statistical information held in hypotheses and concepts component 1511 and interactions and moderators component 1513, while causal mediation models may refer to the casual information held in hypotheses and concepts component 1511 and interactions and moderators component 1513 and the causal model held in hypotheses and concepts component 1511.

For both statistical and causal mediation models, mediation component 1514 may implement a practical way of explaining a subset of the information in the interactions and moderators component 1513 when additional variables, known as mediator variables (sometimes also known as a mediating, intermediary or intervening variable in literature), are necessary to be included to have a better quality candidate explanation 9102 or explanation 9141, for example, by clarifying the relationship between how independent variables influences the dependent variables in the model 904 and the EIGS and its components, via non-observable mediator variables.

The automated identification of mediator variables may provide a practical way of EIGS-based machine learning systems to identify cases of potential omitted-variable bias while also providing suggestions to the end users of the EIGS outputs on potentially missing data features in the input data to the models 904, or potentially missing elements from causal models in hypotheses and concepts component 1511.

Practical implementations of mediation component 1514 may utilize a combination of the Baron and Kenny procedure, the Sobel test, the Preacher and Hayes bootstrap method, or other suitable methods to identify potential mediator variables automatically. It may be contemplated that mediator variables may be classified into either full or partial mediation classes, according to whether the discovered mediator variable can fully or partially account for the observed relationship between variables in the EIGS and its components.

Casual mediation models in mediation component 1514 may operate to identify the extent to which variables in the model 904 and the EIGS and its components participate in the transmission of change from the underlying causes to the observed effects. Causal mediation models in mediation component 1514 may utilize the appropriate causal logic system appropriate for the specific EIGS embodiment, with transmission and exchange of information with associations and assumptions component 1515, interventions component 1516 and counterfactuals component 1517. In a practical implementation, the indirect effect estimation methods of counterfactuals component 1517 can be used by mediation component 1514 to obtain a causal mediation result by calculating a counterfactual expression that estimates the natural indirect effect (NIE) in the absence of confounding.

Conversely, an exemplary EIGS-based system may also present a double-check in the explanation 9141 by considering the hypothetical situation where the medical intervention does not work when performed without aspirin intake. People in the population that take aspirin for reasons other than the medical intervention-induced headache may still experience an NDE related to the medical intervention. Those people in the population who take aspirin solely for the medical intervention-induced headache would have no NDE with the new updated medical intervention (since the headache side-effect is now eliminated). Additionally, the controlled direct effect (CDE) when aspirin intake is fixed at zero, would be the same in the two populations. This double-check allows for the EIGS-based machine learning system to produce a self-explanatory explanation that does not require further information. If the double-check procedure cannot be carried out due to lack of information that prevents the NIE, NDE, or CDE from being estimated, the evaluation component 1535 may add a follow-up, flag, or appropriate information in the explanation which may be used to inform the collaborative follow-up process followed by the consumers of the explanation 9141 and/or interpretation 9142.

Mediation and moderation may co-occur in exemplary explainable machine learning systems. EIGS-based systems allow for the mediation of moderation and the moderation of mediation using interaction and moderator component 1513 and mediation component 1514.

In mediated moderation, a moderating effect is mediated. Mediation component 1514 may handle mediated moderation by checking if the moderators identified by interaction and moderator component 1513 affects the relationship between the input (independent) variables and the output (dependent) variables according to the strength of the moderator itself. If such an effect is detected, mediation component 1514 may create a new mediated moderation path (associated with a new mediator variable) by applying the appropriate moderator effect via a new indirect path from the input (independent) variables to the output (dependent) variables via the newly created mediator variable.

In moderated mediation, one or more paths in a mediation model may be moderated. Mediation component 1514 handles moderated mediation by first establishing one or more mediation paths in conjunction with interaction and moderator component 1513. In an exemplary embodiment, the EIGS-based system may check if each mediation path is also moderated by different levels of another variable accessible to the model 904, the EIGS-based machine learning system, and its components.

An exemplary EIGS may use mediation component 1514 to automatically assign an automatically generated label to the resulting models, and also automatically generate a label for the mediation and moderation effects and variables according to their automatically discovered contributions.

An exemplary implementation of mediated moderation and moderated mediation in EIGS would adopt the methods outlined in (Muller, Judd, and Yzerbyt, "When moderation is mediated and mediation is moderated," 2005), (Preacher, Rucker, and Hayes, "Addressing Moderated Mediation Hypotheses: Theory, Methods, and Prescriptions," 2007) and (Kollenburg and Croon, "Analysis of a Mediated (Indirect) Moderation Model," 2011).

The associations and assumptions component 1515 may contain information pertaining to observations about data accessible to the model 904 and/or the EIGS, that may determine a combination of: (i.) statistical associations between sets of data variables, either directly or via some recursive process; (ii.) conditional probabilities between data variables that may or may not need causal information; (iii.) inferences and associations obtained from data using conditional expectation or similar methods; (iv.) answers to conditional probability sentences of the form $P(y|x)=p$, where the probability of an event $Y=y$, given that $X=x$ was observed, is equal to p, or a similar equivalent for the logic system being used in the EIGS in an exemplary embodiment; (v.) answers to exemplary scenario analysis of the form "What is X?", "How would observing X change the current beliefs in Y?" and similar types of questions.

Autoencoders may refer to a type of artificial neural network architecture which may be used to encode input data in a latent space as well as to reconstruct the input data from the latent space. An exemplary architecture may be validated by measuring the difference between the reconstructed input and the original input. In an exemplary embodiment, the dimensionality of the latent space may be smaller than the input space in order to force the neural network architecture to compress the input space and hence reduce the dimensionality of the feature space in an unsupervised machine learning approach.

In an exemplary embodiment, an explainable autoencoder may convert a black-box autoencoder model into a white-box model. An embodiment may also explain the contribution of the input features to the latent space by partitioning the model and constructing feature attributions. An explanation may be beneficial, for example, for understanding which input features are affecting an anomaly in anomaly detection or for understanding the effect of noise on the latent space in a denoising autoencoder architecture. Additionally, an embodiment may provide an explanation from the latent space to the reconstructed input space in order to understand which latent space features are contributing the most to the reconstructed error by constructing feature attributions. Finally, an embodiment may implement an encoding backmap. The backmap may be used to construct explanations in auto-encoder systems which are connected with larger deep learning systems.

Generative Adversarial Networks (GANs) may be implicit generative models and may be used to create realistic samples from a given training dataset and a prior distribution. The GAN architecture may include a generator and discriminator, which are designed to compete against each other. The generator may generate samples that are then evaluated by the discriminator to determine whether the generated samples are from the training dataset or not.

An exemplary embodiment may implement an Explainable Generative Adversarial Network (XGAN), which may extend a GAN architecture to an explainable architecture by incorporating multiple variants of explainable architectures in the generator and the discriminator. XGAN may enable explainable information that is generated from explainable architectures to be incorporated within a behavioral model framework in order to enable constraints, triggers, events, and actions to be set on such explainable information.

In an alternative embodiment, the partitions may be constructed externally with an induction process such as the process illustrated in FIG. 16. The process may be referred to as a model induction method. For example, the output may be the partition information of an exemplary system accompanied by the feature attribution of the XNN architecture or the INN architecture. Beyond local explainability with feature attributions, XNNs or INNs may also provide global explainability through the white-box nature of the architectures which may allow conversion to rules, and thus making the model human-readable and understandable.

Referring now to exemplary FIG. 16, FIG. 16 may illustrate an exemplary method for extracting rules for an explainable white-box model of a machine learning algorithm from a black-box machine learning algorithm. Since a black-box machine learning algorithm cannot describe or explain its rules, it may be useful to extract those rules such that they may be implemented in a white-box explainable AI or neural network. In an exemplary first step, synthetic or training data may be created or obtained 202. Perturbated variations of the set of data may also be created so that a larger dataset may be obtained without increasing the need for additional data, thus saving resources. The data may then be loaded into the black-box system or neural network as an input 204. The black-box system may be a machine learning algorithm of any underlying architecture. In an exemplary embodiment, the machine learning algorithm may be a deep neural network (DNN). The black-box system may additionally contain non-linear modelled data. The underlying architecture and structure of the black box algorithm may not be important since it does not need to be analyzed directly. Instead, the training data may be loaded as input 204, and the output can be recorded as data point predictions or classifications 206. Since a large amount of broad data is loaded as input, the output data point predictions or classifications may provide a global view of the black box algorithm.

Still referring to exemplary FIG. 16, the method may continue by aggregating the data point predictions or classifications into hierarchal partitions 208. Rule conditions may be obtained from the hierarchal partitions. An external function defined by Partition(X) may identify the partitions. Partition(X) may be a function configured to partition similar data and may be used to create rules. The partitioning function may include a clustering algorithm such as k-means, entropy, or a mutual information-based method.

The hierarchical partitions may organize the output data points in a variety of ways. In an exemplary embodiment, the data points may be aggregated such that each partition represents a rule or a set of rules. The hierarchical partitions may then be modeled using mathematical transformations and linear models. Although any transformation may be used, an exemplary embodiment may apply a polynomial expansion. Further, a linear fit model may be applied to the partitions 210. Additional functions and transformations may be applied prior to the linear fit depending on the application of the black box model, such as the softmax or sigmoid function. Other activation functions may also be applicable. The calculated linear models obtained from the partitions may be used to construct rules or some other logically equivalent representation 212.

Finally, the rules may be stored in an exemplary rule-based format. Storing the rules as such may allow the extracted model to be applied to any known programming language and may be applied to any computational device. Finally, the rules may be applied to the white box model 214. The white box model may store the rules of the black box model, allowing it to mimic the function of the black box model while simultaneously providing explanations that the black box model may not have provided. Further, the extracted white-box model may parallel the original black box model in performance, efficiency, and accuracy. An exemplary embodiment may represent rules in a universal representation format. An exemplary representation format may include a system of disjunctive normal form (DNF) rules or other logical alternatives, like conjunctive normal form (CNF) rules, IF-THEN-ELSE style rules, first-order logic, Boolean logic, second-order logic, propositional logic, predicate logic, modal logic, probabilistic logic, many-valued logic, fuzzy logic, intuitionistic logic, non-monotonic logic, non-reflexive logic, quantum logic, paraconsistent logic, and the like. The representation format can also be implemented directly as a hardware circuit, which may be implemented either using flexible architectures like FPGAs or more static architectures like ASICs or analog/ digital electronics. The transmission can be affected entirely in hardware when using flexible architectures that can configure themselves dynamically.

The localized trigger may be defined by a localization method, which determines which partition to activate. A partition is a region in the data, which may be disjointing or overlapping. A rule may be a linear or non-linear equation which may include coefficients with their respective dimension, and the result may represent both the answer to the problem and the explanation coefficients which may be used to generate domain specific explanations that are both machine and human readable. A rule may further represent a justification that explains how the explanation itself was produced. An exemplary embodiment applies an element of human readability to the encoded knowledge, data and rules which are otherwise too complex for an ordinary person to reproduce or comprehend without any automated process.

Explanations may be personalized in such a way that they control the level of detail and personalization presented to the user. The explanation may also be further customized by having a user model that is already known to the system and may depend on a combination of the level of expertise of the user, familiarity with the model domain, the current goals, plans and actions, current session, user and world model, and other relevant information that may be utilized in the personalization of the explanation.

An exemplary embodiment may provide for automatic discovery of Explainable Artificial Intelligence (XAI) models, as opposed to manual handcrafting. Automatic discovery of artificial intelligence (AI) models may subsume under the rubric of automatic machine learning (AutoML) and/or neural architecture search (NAS), but a present problem in the art may be further exacerbated by the fact that a model may need to learn explainable equivalents of pre-existing black-box models or apply induction to unseen data and generate white-box models de novo. This exemplary problem may be therefore framed as two iterative optimization processes, an external one running the model search by adjusting architecture parameters and coarse-grained connectivity, and an internal one running the training process by adjusting weights. For the purposes of an exemplary embodiment, internal optimization may also be referred to as "training".

The two optimization processes may be merged into one if model search also trains the inductive process, in which case the process collapses into one optimizer that adjusts both architecture and weights. It may be contemplated that the model search and training processes are kept separate. If they are kept separate, each iteration of the external optimization loop runs through at least one entire sequence of the internal training learning process. Naturally, this demands high resource usage. NAS (model discovery applied to neural networks) may thus take hundreds or even thousands of GPU-days (where the GPU-days may represent the number of days required for processing multiplied by the number of GPUs concurrently performing the processing). This may depend on the computational demands of the internal optimizer (such as the training algorithm) as well as the quality and suitability of the external optimizer (such as the search algorithm).

Model search that adjusts network weights as well as architecture might not necessarily run more efficiently. Evolutionary algorithms, for instance, were in the past often employed to run combined architecture and weight optimization, but the weight optimization part could be run more efficiently via a combined approach of evolutionary and backprop techniques in neural networks.

An exemplary embodiment may implement model search generally to an XAI, as well as any other form of XAI such as an explainable neural network (XNN), explainable spiking network (XSN), and any other contemplated model or architecture. The exemplary architecture may be explainable and/or interpretable. The exemplary architecture may be structured in the form of sub-graphs that represent logically related functionality. The sub-graphs may deal with a smaller problem, for example a single feature or feature interaction. The combination of multiple sub-graphs, or sub-networks, may then make up a larger XAI or XNN system.

FIG. 17 illustrates an exemplary high-level XNN architecture. An input layer 2302 may be inputted, possibly simultaneously, into both a conditional network 2600 and a prediction network 2400. The explanations and answers may be concurrently calculated by the XNN by the conditional network and the prediction network. The selection and ranking layer 2700 may ensure that the answers and explanations are correctly matched, ranked, aggregated, and scored appropriately before being sent to the result 2704. The output may include an activation function as part of the output 2310.

The processing of the conditional network 2600 and the prediction network 2400 is contemplated to be in any order. Depending on the specific application of the XNN, it may be contemplated that some of the components of the conditional network may be optional or replaced with a trivial implementation. Depending on the specific application of the XNN, it may further be contemplated that some of the components of the prediction network may be optional and may also be further merged, split, or replaced with a trivial implementation. In another possible embodiment, the entire XNN or parts of it may be encapsulated into a larger XNN or larger neural network.

The exemplary XNN in FIG. 17 may be equivalent to the following system of rules and equations:

$$f(x, y) = \begin{cases} Sigmoid(\beta_{0,0} + \beta_{1,0}x + \beta_{2,0}y + \beta_{3,0}x^2 + \beta_{4,0}y^2 + \beta_{5,0}xy), & x \leq 10 \\ Sigmoid(\beta_{0,1} + \beta_{1,1}x + \beta_{2,1}y + \beta_{3,1}x^2 + \beta_{4,1}y^2 + \beta_{5,1}xy), & x > 10 \wedge x \leq 20 \\ Sigmoid(\beta_{0,2} + \beta_{1,2}x + \beta_{2,2}y + \beta_{3,2}x^2 + \beta_{4,2}y^2 + \beta_{5,2}xy), & x > 20 \wedge y \leq 15 \\ Sigmoid(\beta_{0,3} + \beta_{1,3}x + \beta_{2,3}y + \beta_{3,3}x^2 + \beta_{4,3}y^2 + \beta_{5,3}xy), & x > 20 \wedge y > 15 \end{cases}$$

The ruleset may be structured hierarchically in a multiple number of dimensions depending upon the number of input features, their interactions and/or invariances.

Exemplary FIG. 17 may illustrate a conditional network which defines the conditional portion of the ruleset. The conditional network 2600 may include three main layers that can be combined depending upon the implementation constraints. The conditions are initialized according to the hierarchy of partitions being implemented in the XNN. Non-differentiable neurons such as those found in the conditional network 2600 may be induced using an external process that defines the XNN structure, however the prediction coefficients/weights in the prediction network 2400 may be learnt using gradient descent methods such as back-propagation.

Upon finding the optimal structure of an XNN, the network may be combined into a larger neural network, as shown in the exemplary network of FIG. 18, with an optional segmentation network 3600 and an optional segment prediction network 3700. The components of the network may be made up of smaller XNN sub-graphs or sub-networks. The network works by passing the entire input 3000 to the different sub-graphs. Each sub-graph may be responsible for one or more input features. For example, $$f(X) = \begin{cases} \theta_{1,0}B + \theta_{1,1}XNN(X_1) + \theta_{1,2}XNN(X_2) + \theta_{1,3}XNN(X_1, X_2) + \ldots + \theta_{1,K}XNN(X_i, X_j, X_k), \\ \qquad\qquad\qquad\qquad Segment(X)==1 \\ \qquad\qquad\qquad\qquad \ldots \\ \theta_{n,0}B + \theta_{n,1}XNN(X_1) + \theta_{n,2}XNN(X_2) + \theta_{n,3}XNN(X_1, X_2) + \ldots + \theta_{n,K}XNN(X_i, X_j, X_k), \\ \qquad\qquad\qquad\qquad Segment(X)==n \end{cases}$$

the sub-graph 3100 is responsible for feature $X_1$, whereas sub-graph 3200 is responsible for a feature interaction dealing with $X_1$ and $X_2$. The network remains fully explainable because the inner components of the sub-graphs such as 3100 and 3200 are XNNs, that is, they are fully explainable. When global segmentation is not applied, that is, components 3600 and 3700 are left out, the outputs from the different sub-graphs such as 3100 and 3200 are aggregated directly in step 3400. The aggregation may be a simple addition or may be performed by a graph-like merge. The aggregated or merged result 3400 is then passed to the output 3500. The network may also incorporate an output activation prior to the output 3500, such as sigmoid, ReLU, softmax, etc.

The advantage of using XNNs for building large explainable networks is that the entire neural network remains fully compatible with gradient descent methods such back-propagation. The network in FIG. 18, without global segmentation, that is without 3600 and 3600, may be equivalent to the following system of rules and equations:

$$F(X)=B+XNN(X_i)+XNN(X_2)+XNN(X_1,X_2)+ \ldots +XNN(X_i,X_j,X_k)$$

B in the equation represents a constant known as the intercept or bias. The bias may be a scalar value for single-valued predictions, but it may also be a vector when dealing with multi-output regression, classification, or multi-task problems. The output of each XNN sub-graph may represent the attribution value which a single feature or feature interaction would contribute towards the final result 3500.

In another exemplary embodiment as shown in FIG. 18, the network may also incorporate a global segmenter 3600 and a prediction network for each segment identified by 3700. The segmenter may be a conditional network, such as component 110 as shown in FIG. 12 which consists of a conditional layer, aggregation layer and a switch output layer. The addition of a global segmenter will allow predictions and explanations to be tuned towards specific global segments which the user may have in the dataset. For example, a segment may represent VIP customers, churning customers, or segments may also represent minority classes in the dataset which are not handled well within the global model. The component 3700 is responsible for building a predictive model for each segment. Predictions are handled in a similar approach to those found in a XNN as shown in FIG. 12, such as those found in component 120 which consist of the feature generation and transformations, fit layer, and prediction layer. Finally, the component 3400 is responsible for aggregating and/or merging the results from multiple segments into a final answer, which work in the same way predictions are combined in a standard XNN such as component 128 in FIG. 12. The following system of equations may be equivalent to the network in FIG. 18, whereby k represents the number of sub-graphs, n represents the number of global segments, θ is a coefficient which is multiplied to each output of the XNN sub-graph and the bias coefficient B in each segment:

It may be contemplated that various approaches may be used for finding the segments in component 3600. The methods may include, but are not limited to agglomerative clustering, divisive clustering, relocation partitioning, probabilistic clustering, k-medoid methods, k-means methods, fuzzy clustering, density-based clustering, grid-based methods, gradient descent-based methods, evolutionary methods, region splitting, region growing, sub-space clustering, projection methods, co-clustering methods, and lazy clustering methods.

It may be contemplated that the modular approach using sub-graphs as shown in FIG. 18, may be used for training purposes only. However, once the structure is found and the model is fully trained, the notion of sub-graphs may be discarded, and the system may be converted back into a single XNN graph. This is possible because XNNs make use of graphs to build a hierarchical partitioning network. Multiple activations from multiple sub-graphs, may be represented by having an XNN with multiple activation paths in component 110, which are then combined together using the aggregation and ranking layer 128. The network in FIG. 18 may also be combined with larger neural networks, which may also deal with multi-task problems. The sub-graphs may also contain XNN variants such as CNN-XNN. FIG. 19 shows an exemplary embodiment of an XNN with sub-graphs simplified as one XNN network, with input features 3000 being distributed amongst the hierarchical partition hierarchy 3800 and processed via feature transforms 3900 and local partition models 3910. FIG. 19 shows exemplary polynomial local partition models 3910, although these can be implemented using various other methods as long as they retain end to end explainability, without loss of information from the input to the output. Components 3800, 3900 and 3910 may be implemented in a highly distributed manner and may utilize different parallel communication methods and sequencing. Eventually, the switch output 3850 and the predicted value output 3950 is obtained, which is then further processed, refined and ranked by the aggregation and/or merge process 3400 and finally resulting in the output 3500.

Model search techniques including but not limited to Bayesian optimization, PSO, genetic algorithms, and reinforcement learning may be used to optimize the structure of the sub-graphs and global segments. Model search may also be applied for each sub-graph individually; however, it may also be used to enhance the model globally. An exemplary optimization may include automatic selection of which sub-graphs to include, exclude, or refine, as well as automatic identification of segments in the global network. Other parameters related to regularization and compression may also be tuned. The objective function of the search may take into consideration not only the predictive performance of the model, but also explainability and fairness metrics.

An exemplary embodiment of an AutoXAI system may utilize an explainable model to build another explainable model. The resulting explainable model may be either a more sophisticated and complicated explainable model, in which case the initial explainable model is used to bootstrap the model creation process, or a simpler explainable model, in which case the initial explainable model is used for simplification and compression purposes. Such a solution may have practical applications for multi-task problems, multi-output problems, and in the conversion of Deep Neural Networks (DNNs) to explainable models.

Interpretability is a characteristic that may be defined by an interpreter. The interpreter may be an agent that interprets the system output or artifacts using a combination of (i) its own knowledge and "beliefs", (ii) goal-action plans, (iii) context(s), and (iv) the world environment. An exemplary interpreter may be a knowledgeable human.

An alternative to a knowledgeable human interpreter may be a suitable automated system, such as an expert system, which may be able to interpret outputs or artifacts for a range of applications. For example, a medical expert system, or some logical equivalent such as an end-to-end machine learning system, may be able to output a valid interpretation of medical results in a specific set of medical application domains. It may be contemplated that non-human interpreters may be created in the future that can partially or fully replace the role of a human interpreter, and/or expand the interpretation capabilities to a wider range of application domains.

There may be two different distinct types of interpretability: (i) Model interpretability, which measures how comprehensible and understandable any form of automated or mechanistic model is, together with its sub-components, structure, and behavior; and (ii) output interpretability, which measures how comprehensible and understandable the output of the model is.

Interpretability is thus not a simple binary characteristic but can be evaluated on a sliding scale ranging from fully interpretable to un-interpretable. Model interpretability may relate to the interpretability of the underlying embodiment, implementation, and/or process producing the output, while output interpretability may relate to the interpretability of the output itself or whatever artefact is being examined.

A machine learning system or suitable alternative embodiment may include a number of model components. Model components may be model interpretable if their internal behavior and functioning can be fully understood and correctly predicted, for a subset of possible inputs, by the interpreter. In an exemplary embodiment, the behavior and functioning of a model component can be implemented and represented in various ways, such as a state-transition chart, a process flowchart or process description, a behavioral model, or some other suitable method.

Model components may be output interpretable if their output can be understood and correctly interpreted, for a subset of possible inputs, by the interpreter.

An exemplary embodiment may be deemed to be (i) globally interpretable if it is fully model interpretable (i.e., all of its components are model interpretable), or (ii) modular interpretable if it is partially model interpretable (i.e., only some of its components are model interpretable). Furthermore, an entire exemplary machine learning system or suitable alternative embodiment may be locally interpretable if all of its output is output interpretable.

An exemplary embodiment may provide a grey-box, which may be a hybrid mix of a black-box with white-box characteristics. A grey box may have characteristics of a white-box when it comes to the output, but that of a black-box when it comes to its internal behavior or functioning.

A white-box may be a fully model interpretable and output interpretable system, which can achieve both local and global explainability, making them the most explainable and fully interpretable in terms of both their internal function and their output. An XNN is an example of an output interpretable and a fully model interpretable system.

A black-box may be output interpretable but not model interpretable, and may in some cases achieve limited local explainability, making them the least explainable with little to no explainability capabilities and minimal understanding in terms of their internal function. A deep learning neural network may be an output interpretable yet model un-interpretable system.

A grey-box may be a partially model interpretable and output interpretable system and may be partially explainable in terms of internal function, and interpretable in terms of output. A grey-box may be between a white-box and a black-box on a scale of most explainable and interpretable (white-box) to least explainable and interpretable (black-box). Grey-box systems can also have a level of modular interpretability since some of their components may be model interpretable. An INN is an example of an output interpretable and partially model interpretable system.

An exemplary embodiment may be model interpretable. The interpretable behavior may be used for controlling the final output result. For instance, in a simple linear regression model, the coefficients may be used for the resulting prediction output. In decision trees, the nodes may determine the decision boundaries, which may directly control the final result output through the leaf nodes. An interpretable system or model may be capable of generating a model explanation accompanying the answer output, in a suitable format such as the previously described generalized or universal rule-based format, or any logical equivalent. In a decision graph or hypergraph, the nodes also determine the decision boundaries, with increased expressive power representing items like joint probabilities, complex interactions and relationships that are frequently in real-life datasets. An alternative to graphs and hypergraphs may also be achieved through the use of simplicial complexes.

In an exemplary INN, the relevance estimators combined with the feature transformations may compute the result output and simultaneously generate an explanation in a local manner.

Interpretable models may be global or local. For instance, linear regression and decision trees may be globally explainable. INNs may achieve local explainability within one partition, however through the use of multiple partitions, global explainability may also be achieved. Additionally, INNs may be combined with black-box logic within the network itself. In that case, INNs may function as a locally explainable model, since global explainability may require all the components of the model to be fully-white-box.

For an exemplary globally interpretable system, each individual component may be understandable individually without having to undertake an analysis of the entire system as an indivisible whole. For example, an exemplary XNN may be a globally explainable system, and thus may allow for conversion into several different formats while still retaining logical equivalence. A conversion may not be possible with models that are only capable of providing local interpretability.

The term AutoML may broadly include various model search features and may include NAS as well as other terms.

For example, several terms may overlap or may be closely related with NAS and AutoML, such as hyperparameter optimization, neuro-evolution, AutoAI, evolving connectionist systems (ECOS), and meta-learning/learning-to-learn. Many of these terms may be interchangeable with AutoML or NAS.

Hyperparameter optimization, for instance, may emphasize the fine-tuning of the learning algorithm's parameters while being tangential or unrelated to architecture. Neuro-evolution may refer to the family of optimization techniques inspired by natural evolution applied to neural network architectures. AutoAI may be synonymous with AutoML, or perhaps a refinement of it. ECOS may be a family of NAS techniques specific to spiking neural networks (SNNs). Meta-learning or learning-to-learn may be a wider topic in computer science with some overlap with AutoML; it aims to optimize or automatically learn optimal learning policies from learning metadata. It can be safely assumed that these terms apply equally well to the general thrust of an exemplary embodiment, notwithstanding the fact that reference is made only to NAS and AutoML.

AutoML may refer to a family of related techniques that does away with the handcrafting problem, optimizing the selection of parameters and therefore automatically searching for and discovering ML models. An exemplary embodiment may solve a species of problem related with automated machine learning (AutoML) with particular application to Explainable Artificial Intelligence (XAI). An exemplary embodiment may be referred to as an AutoXAI.

The part of the AutoML workflow that discovers architecture parameters may be referred to as the Neural Architecture Search (NAS).

XAI may solve or avoid a common issue with conventional black-box AI in which the model may successfully learn to solve a given problem without justifying its solution. For example, a house in Beverly Hills with a 1000 m² footprint and a hot tub may be successfully appraised at a $5M value, but the black-box AI model does not explain that price was arrived at on the basis of the location and footprint and not the presence of a hot tub.

In an exemplary embodiment, an exemplary AutoXAI system may be incorporated within an Explanation and Interpretation Generation System (EIGS), allowing for seamless bi-directional collaboration, model discovery, search, and optimization to be achieved within an EIGS based system.

The present problem is made harder by the fact that an XAI model may require learning explainable equivalents of pre-existing black-box models or may apply induction to unseen data and generate white-box models de novo.

Induction may refer to a process that may convert black-box AI models into explainable white-box AI models via model analysis, inference, rules, and knowledge incorporation from various sources. An exemplary explainable AI model may be one of three types of models: global, partition, and local. Together with an explainable context, these may allow explanations to be produced that are fit for purpose and useful to the human end user. As previously described, an exemplary model induction method is illustrated in FIG. 16.

The structure of each of the three types of models (global, partition, local) may be designed to allow the model to be interpretable and understandable by human users, down to a step-by-step level. The explainable model context may allow an explanation to be produced that is fit for a specified purpose and useful or personalized to the human end user.

Thus, an exemplary AutoXAI may be framed as two iterative optimization processes, an external process running the model search by adjusting architecture parameters, learning algorithm hyperparameters, selected features, connectivity, etc., and an internal process running the induction process by adjusting weights-for example, via backpropagation (in XNNs) or an equivalent training method in other XAI models, such as backpropagation through time and/or Hebbian learning in recurrent XSNs or reinforcement learning (RL). For every iteration of the external optimization loop a whole run through the internal optimization loop is affected, predicted, or otherwise simulated. Internal optimization may also be referred to as "training". An exemplary embodiment may address the external optimization part of the XAI problem, called "model search".

FIG. 2 illustrates an exemplary model search use case, with accuracy as a performance metric on an exemplary binary classifier which may be configured to classify training input 701 as positive (P) or negative (N). Input 701 may also show the true classifications. A user, such as a researcher, may start from an existing model that may or may not have inbuilt explainability and may or may not offer good performance. In this exemplary embodiment, the initial candidate prediction 702 shows low accuracy (40%). Model search 703 may search for and generate candidate models that may offer better or an optimal performance 704 (in this case, performance is measured as accuracy, however it may be contemplated that the candidate models may be identified via another metric, such as speed), as well as explainability.

An exemplary embodiment may automate what could otherwise be very complex, power-consuming, and/or time-consuming work. Explainable AI has been notably absent from the field at present, with a few exceptions. One paper in preprint that applies AutoML to XAI is Pfisterer et al. (2019), noted previously. This work describes interpretability as one of the target objectives in a multi-objective optimization (MOO) scenario in an XAI system specific manner. In contrast, an exemplary embodiment applies AutoML/NAS in an XAI system agnostic manner and may thus be equally applied equally to conventional neural network-based XAI, such as XNNs or spiking-network XAI (XSNs) together with other explainable models.

An exemplary embodiment may utilize multi-objective optimization to ensure direct alignment with user objectives. This may be achieved after training and/or model discovery by either embedding rules directly into the explainable model or by hard-coding them in a non-modifiable manner using tamper proof hardware enclaves, write-once memory, or direct implementation as a suitable hardware circuit that cannot be altered.

It is further contemplated that domain-dependent context and query-dependent scenarios may also be used to refine such user objectives, allowing objectives to be defined according to context, for example, fairness and bias metrics, which may be interpreted differently in different contexts. Different fairness and bias metrics, such as disparate impact, equalized odds, equal opportunity ratio, and group benefit ratio may also lead to different results and model structure, which can be refined by considering user-aligned objectives as part of the MOO search parameters.

A difference between an exemplary embodiment that may focus on AutoXAI, and generic AutoML/NAS model search systems is that the internal optimizer in an exemplary embodiment may be an explainable system (XAI) which operationalizes (measures) explainability and/or interpretability—turning the explainability/interpretability into one further objective to optimize against in a MOO context.

Additionally, in an exemplary embodiment, the external optimizer may also be aware of the structure of an explainable white-box AI model, which ensures that the structure of the explainable model handled by the external optimizer also retains its explainability and interpretability characteristics. Operationalization of explainability (also referred to as interpretability) may be implemented in an exemplary embodiment. According to an exemplary embodiment, explainability/interpretability may be quantified into one or more continuous values, such as, for example, a value normalizable to a range between 0 and 1, where the value or values may be available upon candidate model evaluation. This puts explainability in line with other metrics to optimize against (such as performance, feature cost, etc.), enabling MOO. Additionally, an exemplary embodiment may preserve the explainability and/or interpretability of the resulting models arising from the AutoXAI process. This may provide that, for example, a white-box explainable model that undergoes a model search may result in another white-box explainable model, rather than a black-box model.

The precise operationalization of explainability may be implemented in various ways. In an exemplary embodiment, explainability may be automatically quantifiable and made available to the external optimizer at the point when candidate models are available with minimal delay. Thus, some proposed measures of explainability may be more useful than others. As explained in Doshi-Velez et al. (2017), noted previously, measures can be application-grounded, human-grounded, or functionally-grounded.

Exemplary embodiments may rely on functionally-grounded measures, which may be based on formal definitions of interpretability as proxies for explanation quality, and once defined are therefore readily accessible for fully automated evaluation. This makes functionally-grounded measures a useful implementation choice, for example, when an exemplary automated AutoXAI process evaluates a large quantity of evaluations, for example, running in the thousands or millions, that make human evaluation impractical. Functionally-grounded measures can emulate the subjective judgements made by humans on the quality of the resulting explanations. Exemplary embodiments may be practically implemented via some form of interpolation or extrapolation of human judgements, or more automated methods such as some modified F-Measure, BLEU, ROUGE, METEOR, NIST metric, WER, chunking or other appropriate methods. Exemplary embodiments may be evaluated against readily available benchmark datasets or surrogate benchmarks.

It may be contemplated that semi-supervised methods may be incorporated within an AutoXAI process by sampling a practical and reasonable selection of evaluation points during the model search process that can be reasonably evaluated by a human, and either using the samples directly as part of the MOO input, or additionally applying some form of interpolation and/or extrapolation function to obtain plausible values for evaluation points for which an explicit human answer may not be available. It may be contemplated that such a sampling method may provide a practical implementation solution to integrate Human Knowledge Injection (HKI) within an exemplary AutoXAI system.

It may be further contemplated that a combination of automated and human evaluation answers may be utilized in an exemplary implementation. An exemplary embodiment may pre-compute the evaluation points that will be presented to a human evaluator in advance, thus allowing the MOO process to run without interruption once the human evaluation answers are obtained, or alternatively using some form of interactive or batched or cyclical process where the human evaluator may be asked to provide input at regular intervals in an interactive or semi-interactive manner.

An exemplary AutoXAI embodiment may be agnostic of the underlying XAI model and can be applied to any of several types of explainable models. Exemplary embodiments and application of AutoXAI may utilize explainable or interpretable models that include, but are not limited to, those based on induced eXplainable artificial intelligence (XAI) models, Interpretable Neural Nets (INNs), eXplainable Neural Nets (XNN), eXplainable Transducer Transformers (XTT), eXplainable Spiking Nets (XSN), eXplainable Memory Net (XMN), eXplainable Reinforcement Learning (XRL), eXplainable Generative Adversarial Network (XGAN), eXplainable AutoEncoders (XAE), eXplainable CNNs (CNN-XNN), Predictive eXplainable XNNs (PR-XNNs), Interpretable Neural Networks (INNs) and related grey-box models. It is further contemplated that an exemplary AutoXAI embodiment may apply fully to the white-box part of the grey-box model and may apply to at least some portion of the black-box part of the grey-box model. It may also be contemplated that any of the exemplary AutoXAI embodiments described herein may also be applied to INNs interchangeably.

In an exemplary AutoXAI embodiment based on XNNs, which may be an explainable form of artificial neural networks (which may further include an explainable output), model search may optimize the internal weights of XNNs that determine the partitioning of the input data, as well as modify other network parameters such as layer depth, dimensions, and activation functions.

XNNs are typically built in layers, each of which has a fixed width and height in units of neurons. Between iterations, model search may modify these dimensions by proposing new candidates with different properties, as suggested by the NAS algorithm or optimization algorithm. There may be several other network parameters, depending on the underlying XAI model.

In another exemplary AutoXAI embodiment based on explainable spiking networks (XSN), which may refer to the spiking neuron variants of XNNs, and which may be applied to time-series data and/or complex, interrelated causal data, model search may alter XSN connection weight matrices according to causal model input and modify the recurrence ratios of neuron pools.

In another exemplary AutoXAI embodiment based on XAEDs, where XAEDs may be used for dimensionality reduction, (i.e., the reduction of large input datasets to more manageable proportions), and for efficient data coding, model search may modify the XAED layer depth and the compression ratio of input data.

In another exemplary AutoXAI embodiment based on XGANs, where XGANs may be used, for example, to generate and discriminate artificial data of any type, model search may alter any of the parameters that apply to suitable explainable models, such as layer dimensions, depth, and convolutional layer parameters.

As described above, NAS may be a subprocess of AutoML. NAS is a search process that may optimize a neural network's architecture for a particular task, changing parameters such as, but not limited to, layer dimensions, activation function type, number of neural units (or neurons), connectivity patterns, bias, initial weight distributions, and any other contemplated parameter.

Although NAS is typically applied to conventional neural networks that use non-spiking neurons, an exemplary embodiment may be agnostic of the type of XAI and may implement a NAS algorithm which can be equally applied to spiking as well as non-spiking networks. One such field is called evolving connectionist systems (ECOS).

Some aspects of an exemplary embodiment's workflow may go beyond standard NAS implementations. Feature selection, for instance, may be included in an exemplary AutoML workflow. Since both feature selection and neural model search may be optimization processes, an exemplary embodiment may include them both under a single, unified external process that may run the architecture search as well as feature selection. Similarly, in an exemplary XNN, the partition induction process may form part of the XAI architecture search.

NAS may be schematically split into three components: the search space, the search strategy, and estimation techniques. As previously described, the search space may include the combinations of different parameters that describe the network architecture. This may be potentially infinite if continuous variables are used. As the search space becomes larger, finding the optimal solution may become more difficult. In an exemplary embodiment, therefore, the search space may be kept as small as possible or reduced in size, while still ensuring that the model search is successful.

An exemplary embodiment may operate with little data or information regarding the search landscape—for instance, the number and location of local minima, whether there are discontinuities, and how stochasticity might affect the problem (XSNs are inherently stochastic) may be unknown. Thus, a general-purpose optimizer for which few assumptions are needed may be implemented. Evolutionary techniques may be implemented for optimization in a complex landscape. Multiple minima/maxima may also rule out the use of standard gradient descent techniques. Thus, an exemplary embodiment may be applicable to a much wider and general range of applications than gradient descent technique-based implementations, such as Deep Learning methods.

Several alternatives may be used in a practical search strategy implementation, including but not limited to Bayesian Optimization, Genetic Algorithms (GA), Evolutionary Strategies, Gradient Descent techniques, Monte Carlo Simulation (MCS) and Particle Swarm Optimization (PSO). In one exemplary embodiment, Genetic Algorithms may be used for the external optimizer. In another exemplary embodiment, a hybrid approach using a combination of search strategies may be used, for example by combining GA with PSO. In such an exemplary hybrid approach, GA may be used to optimize the discrete and categorical types of model parameters, and PSO may be used for the continuous model parameters, such as weights and bias.

It is further contemplated that in an exemplary embodiment, performance metrics and resource usage caps may be used to limit the number of search iterations and the overall cost of running the AutoXAI system. A predictive model may be used to take the explainable model structure, and hence its associated typical performance characteristics, into account when optimizing the AutoXAI system performance.

It may be contemplated that not every identified candidate architecture is fully trained and evaluated. Instead, an exemplary embodiment may implement estimation techniques of varying reliability and different caveats. In one exemplary embodiment, the performance of candidate architectures may be partly evaluated using a performance prediction system similar to that described in Smithson et al. (2016), noted previously, where a neural network is trained via back propagation on a training set of candidate architectures and their objective performances. This may significantly reduce training time and may also reduce expenses or allow a longer and more accurate model search. In other exemplary embodiments, other contemplated performance estimation methods may be used.

Model search may be implemented by any combination of search strategy and estimation techniques. In an exemplary embodiment, GA and low-fidelity estimates may be used for search strategy and performance estimation, respectively. In another exemplary embodiment, a hybrid approach may combine a hybrid GA and PSO approach together with performance prediction. Alternative exemplary embodiments may utilize diverse combinations of search strategy and estimation techniques.

Multi-Objective Optimization (MOO) may refer to a family of minimizing/maximizing algorithms that apply to multiple, simultaneous, conflicting objectives, as opposed to a single objective optimization. An exemplary embodiment may implement AutoML and NAS with MOO. AutoML, NAS, MOO and the different possible combinations that have been described such as GA, PSO, and so on, may be implemented in a novel manner in conjunction with explainable models to achieve a practical model discovery and search solution for XAI.

Other metrics may be contemplated, such as, for example, model complexity. In an exemplary embodiment, optimization may be conducted against multiple metrics. It may be contemplated that at least one metric for explainability or interpretability may be used in an exemplary application. In an exemplary embodiment, where the AutoXAI system may be producing an explainable model, an explicit explainability and/or interpretability metric may not be always necessary. Other metrics may be introduced, such as performance and robustness, or domain-related metrics, depending on the application at hand. For instance, in an exemplary embodiment in a medical XAI application, feature safety may be an appropriate metric. In an exemplary embodiment in a neuromorphic application hardware cost may be an appropriate metric.

MOO may use a scalar performance metric as one measure to optimize against. A machine learning algorithm may optimize for performance. Performance might not be defined as a single metric, but a family of metrics that may summarize the quality of a learned model in predicting a quantity or class, or in reconstructing a given probability distribution. Robustness too can be operationalized as performance over unseen data distributions or model search problems. For optimal robustness, the immediate performance of a candidate architecture on a particular search problem may be replaced with performance over a distribution of search problems, such as, for example, by choosing an architecture that results in slightly inferior performance over the given search problem as long as it ensures optimality over the entire distribution.

Robustness, therefore, may still be a scalar metric, and might not require multi-objective optimization.

However, there may be other requirements that compel the use of other metrics in an exemplary embodiment. Examples of other metrics may include feature cost, hardware constraints, memory consumption, and the like. Moreover, there may be a trade-off between one or more constraints or requirements. For example, better performance may require a larger architecture, for instance, while hardware implementations may opt for a smaller architecture. Therefore, a candidate performing at 93% classification accuracy, for instance, might be preferable to another performing at 95% accuracy if the former requires only one fifth of the feature cost.

MOO techniques may involve an iterative improvement of what may be referred to as the Pareto front, the set of Pareto-optimal candidates for which one cannot find better alternatives without resorting to a worse tradeoff between search parameters. FIG. 1 illustrates the Pareto front plot for an exemplary multi-objective optimization scenario with two variables: performance (or accuracy) 601 and explainability 602. Successive generations of candidates may improve the Pareto front 603—pushing it farther to the right and upwards. As such, the Pareto front may include any candidates which are optimal. There are various philosophies for the solution of MOO problems. In the simplest of cases, MOO may be used as a selection tool to help pick the best candidate from among several candidates, leaving the generation of candidates for another, separate algorithm. In other processes, MOO may be more tightly integrated with the candidate-generating algorithm.

An exemplary embodiment may utilize explainability and interpretability as MOO objectives. It may be contemplated that explainability and interpretability are two inter-linked MOO objectives. Explainability may refer to a metric that quantifies the quality of the justifications generated by an XAI model in explaining the output to a human interpreter. Explainability may be quantified in various ways. The final candidate explainable architectures resulting from a model search may be those which have an explainability and/or interpretability above a certain threshold, or those with the highest explainability and/or interpretability values. Therefore, these two metrics may be included as one of the multiple objectives that may be included in the MOO workflow of an exemplary embodiment.

It may be contemplated that an exemplary embodiment may implement a MOO workflow which may be successfully applied to both white-box and grey-box explainable models. A suitable conversion process, such as the exemplary model induction method illustrated in FIG. 16, may be used to convert black-box models into a white-box or grey-box format that is suitable for explainable model search and discovery.

Objectives and constraints may be related. Each objective or metric that needs to be optimized may be framed as a constraint on the system. For instance, performance or robustness may be considered soft constraints (poorly performing candidates are not desired, although some performance may be sacrificed to optimize other metrics). Explainability and feature cost may also be considered soft constraints. Furthermore, there may be constraints that are best expressed as hard boundaries of acceptability. For instance, if a medical procedure is fatal on a certain group of people, no compromise will make it acceptable.

The terms interpretable and explainable may have different meanings. Interpretability may be a characteristic that may need to be defined in terms of an interpreter. The interpreter may be an agent that interprets the system output or artifacts using a combination of (i) its own knowledge and beliefs; (ii) goal-action plans; (iii) context; and (iv) the world environment. An exemplary interpreter may be a knowledgeable human. Interpretability may thus be evaluated in NAS and MOO applications as a continuous variable, ranging from un-interpretable to fully interpretable.

An exemplary embodiment may provide a process for the automatic discovery of explainable AI models (XAI). It may be irrelevant whether the process itself is explainable or not, if the final candidate model can justify (i.e., explain) its classifications or predictions. The model discovery process itself might not be visible to the end user of the resulting XAI, who may or may not be the agent running model discovery.

Three types of explainability may be identified and distinguished:

(1) Explainability of a trained model's predictions (output explainability)—measuring how interpretable the physical output is;

(2) Explainability of a model's training process (model explainability)—measuring how interpretable any form of automated or mechanistic model is, together with its sub-components, structure, and behavior; and (3) Explainability of model search (model search explainability)—measuring how interpretable the model search embodied by, for example, an exemplary AutoXAI process may be.

XAI models may be white-box models that may possess output explainability and potentially model explainability.

An exemplary embodiment may compare any two model candidates, using a feature which may be referred to as contrastive visualization. This feature may allow for a descriptive and visual depiction of the transformations that turn one architecture into another, accompanied by the multi-performance changes effected by these transformations. Multi-performance may refer to the vector score that results from full candidate evaluation in the context of multiple objectives. The transformations may be one of: addition, deletion, or modification, and the nodes upon which the transformations act can be layers, neurons, or connections.

Exemplary contrastive visualization is illustrated in FIG. 3A, with A, D and M standing for addition, deletion, and modification, respectively. The initial candidate 801 may be modified to provide candidate 802, which may be further modified in subsequent stages via addition, deletion, and modification to provide six final candidates 803 with various accuracy and explainability combinations.

The system may be able to visualize these differences in a user-friendly manner like the duff method familiar to software developers. Moreover, since the system may be capable of exploring the multi-performance landscape using automated performance prediction, an exemplary embodiment may identify, and the researcher or user may be able to understand, which parameters are vital for performance, allowing for finer, well-informed control over these parameters. Thus, the human user or researcher may be notified if it is a requirement for the final selection, as is necessary, for instance, when exercising judgment that may not be reduced to rule-based algorithms. An exemplary AutoXAI system may also explain, visualize, monitor, and influence the evolution of model candidates as part of the discovery process. FIG. 3B illustrates an exemplary visualization of an explanation that illustrates the evolution of a model within the AutoXAI system and related model discovery process. On the left, model tree 804 has two labelled circles selected, shown with a dashed outline as in 807.

A named reference label may be assigned to particular components within an explainable model. Named reference labels may be descriptive in nature and may also contain additional meta-data and links to external taxonomies, ontologies, and models. For example, named reference labels may contain meta-data about multimedia files associated with that named reference label, units and dimensions associated with the explainable model component, and so on. The named reference label itself is a direct form of symbolic reference, which can either be the named reference label text itself or an associated meta-data. In FIG. 3B, components 807, 808, 809 and 810 all have associated named reference labels and may thus be associated with a neuro-symbolic model. The named reference labels themselves may also be used by an exemplary AutoXAI system to generate human-friendly explanations of dynamical processes, such as model discovery, which may be otherwise difficult to explain.

For example, if FIG. 3B was referring to an exemplary explainable model that predicts property prices, and component 809 was representing a decision or rule, such as "Count(Bedrooms)>50" and component 810 was a node that represents "Property Type='Palace', the user may assign a named reference label of "More than 50 Bedrooms" to 809 and a named reference label of "Palaces" to 810. Rule and hierarchical partition data from the explainable model may be used to automatically add symbolic meta-data to the named reference labels. Continuing with the example, the symbolic expression "Count(Bedrooms)>50" may be assigned automatically as meta-data to the named reference label for 809 and "Property Type='Palace'" may be assigned as meta-data to the named reference label for 810. In the example, an exemplary AutoXAI system has decided that this particular handling is no longer necessary for the explainable model, for example, if the partition structure is modified or that type of property is no longer applicable for the explainable model. In this example, a typical explanation in English may be: "The explainable model has been modified to remove the check for 'More than 50 Bedrooms' and its associated node for 'Palaces'", which is more human friendly than an edit-oriented operator listing like: "{"Deletion": [{"Edge": "809"}; {"Node": "810"}]}".

The novel use of named reference labels in an exemplary embodiment within explainable models and their evolution under an AutoXAI and/or model discovery process, may enable a practical implementation of neuro-symbolic constraints that may apply to some up-stream meta-reasoning layer that has access to the statistical or causal relationships between variables.

Named reference labelling may allow the user to specify which models in the partition are to be modified, deleted, or otherwise prevented from alteration. Named reference labelling also may allow the user to keep track of model candidates that are of particular interest. In a similar manner to nodes, edges can also be named reference labelled. Partition tree 805 shows one named reference labelled edge 808. Partition tree 806 shows a named reference labelled circle 809 that has been deleted.

Named reference labels may also be used to integrate AutoXAI systems with neuro-symbolic AI systems that can use symbolic rule expressions and be used to perform automated symbolic checks and verification that is impossible to do with a black-box AI system. Continuing with the previously presented example with reference to FIG. 3B, a model evolution where edge 809 and node 810 have been deleted may correspond to an exemplary rule like: "IF (Count(Bedrooms)>50) THEN Property Type='Palace'" being deleted or otherwise disabled. In a system that is used to generate symbolic expressions within a workflow system or even an artificial software and/or hardware development language, this model evolution change may represent a change in the workflow or relevant code snippet. It may be further envisaged that an exemplary model evolution explanation may be used to report and integrate such a change with appropriate change-management and audit systems. For example, in an audit system (used for illustrative purposes), the edit operator lists and the model evolution explanation may be saved in a system of record, distributed ledger technology (DLT), database, audit log, or some other suitable system, or transmitted externally (for example, they may be transmitted securely over a telecommunications network, to ensure that a tamper-proof and traceable change record is kept securely in a trustworthy manner). In a further example, where the explainable model is linked to a workflow or a code system, the model evolution explanation may be used as a practical interface with a version control system, for example by creating an appropriate changelog entry. An example changelog entry may read:

commit 5530219c4af5fb13c8301677415f9440
Author: Bart <bart.fitzgerald@umnai.com>
Date: Thu Mar 15 09:44:13 2018+0800
   deletion: PROPVALUE-MODEL-111: Removed check
      for 'More than 50 Bedrooms' and
its associated node for 'Palaces'
   Closes #14580

The model search evolution explanation may let an intelligent agent or user influence or prioritize certain aspects of the discovery process. Furthermore, contrastive visualization may provide a practical solution for a visual type of explanation of the model search process, since users may be able to trace all the changes that occurred to each model as it evolved from the seed candidate to its present form, together with the performance changes that accompanied each parametric change.

In an exemplary embodiment, AutoXAI model search evolution utilizing neuro-symbolic methods may be used to generate source code in a suitable formal programming language that is intended to be interpreted or compiled and then subsequently executed on appropriate hardware, or directly converted into a hardware system. The symbolic source code is used as an interchange mechanism that allows the neural information to be accessed via symbolic calls, for example, by presenting constraints in form of a logical expression, or by representing statistical distributions over image data using an appropriate segmentation and analysis call to a virtual function that is actually executed by the neural network or suitable explainable model. Maintaining a bi-directional link between the source code generation from the explainable neural network (XNN), explainable transformer (XTT) or other suitable explainable model is important for a practical implementation. During Human Knowledge Injection, the structure of the explainable model will need to be changed to reflect changes to the symbolic source code, which cannot be practically done without an underlying explainable architecture in the AI model.

In a further exemplary embodiment, an AutoXAI system may analyse existing process descriptions, programming language source code, workflows, flowchart descriptions, rules and other suitable symbolic descriptions that are linked to the underlying data of the explainable model, to automatically generate a causal model that is then subsequently incorporated into the AutoXAI system to generate better quality explainable AI models.

Constraints and objectives may be framed as analogous to each other. Robustness or base performance, for instance, may be soft constraints on the system in the sense that higher performance candidates may be preferable in an exemplary embodiment. Soft constraints may be easily operationalized and readily quantified as a further objective for the external optimizer. Hard constraints, on the other hand, may be expressed as linear boundaries describing the allowed region in the search or performance landscape. In some embodiments, hard constraints may be expressed as mathematical inequalities.

An exemplary implementation of constraints and objectives may provide the advantage of unifying all requirements into a single framework allowing optimization by a single, automated MOO process without resorting to handcrafting, finetuning or ad hoc rules.

Constraints may be of several types and have different origins. An exemplary embodiment may allow the model search user to specify the constraints that pertain to his or her domain and their mutual relationships. The following is an overview of these differences in type, origin, and function.

Constraints may be soft (e.g., financial cost) or hard (e.g., risk <0.1, precision >0.95).

Constraints may originate from domain and prior knowledge (e.g., features' medical risk, statistical improbabilities describing the relationships of predicted variables), from model evaluation (e.g., performance/robustness, explainability), or from the model search (e.g., budgetary constraints, model size).

Constraints can be expressed as statistical constraints on the distribution of a candidate model's predicted variables (e.g., "unemployed" and "director" cannot both describe the same person), as scalar costs (e.g., performance, explainability, complexity), or as mathematical inequalities (e.g., risk <0.1, number of parameters <1 million).

Constraints can be fixed or a function of input. If constraints are a function of input, a representative dataset may be used to derive an expected cost or expected value, and thus may convert the constraint into a fixed constraint (e.g., medical risk of a feature might depend on age, in which case a fixed risk is derived by working out the mean risk over a representative population).

Pre-hoc constraints may apply to the search space or the data statistics—an exemplary embodiment may identify the model's parameter cost prior to running the training, and thus the agent or user can use this information to guide the selection process before evaluation.

Post-hoc constraints may be evaluated after a training run (e.g., performance/robustness). Evaluation can therefore supply the post-hoc constraints which, together with the pre-hoc constraints improve the direction of search.

Constraints can be expressed as causal constraints that utilise cause-and-effect in modelling possible variable values with respect to the model's variables or via a generative process involving one or more causal models.

Constraints can be expressed as explainability constraints that are used to limit the explainable model search space to search solutions that generate explanations of acceptable quality.

The following are some examples of objectives/constraints: Performance/robustness (for example, precision, accuracy, recall, receiver operating characteristic (ROC) curve based); Interpretability/explainability (for example, functionally-grounded evaluation); Computational cost of a candidate model (for example, memory usage, FLOPS, power usage); Feature cost (for example medical risk, or financial cost); Budgetary or meta-costs associated with the AutoML/NAS process limiting the number of iterations or computation time (for example, cloud computing cost, processor cycles); Constraints specific to the underlying XAI model (for example, partition rules); Inductive biases, such as preference for smaller, parsimonious models based on the Occam's Razor principle (for example, Minimum Description Length, PCA/SVM decomposition, and some form of regularization such as L1/L2/Elastic Net regularization); and Model stability: preference for model configurations that are relatively stable to input perturbation, under the assumption that final candidate configurations should not be sensitive to slight changes in the input data (for example, phase space analysis, Bode plots, Nyquist analysis). Other contemplated objectives or constraints may be implemented as well, depending on the application.

Constraints may reduce the search space. Reducing the search space may make the problem more tractable. Note that introducing some parameters to exploration—such as weights and connectivity—may increase the number of the possible combinations and may therefore increase the search space size. Statistical and causal constraints and domain prior knowledge, therefore, may counteract the effect of the increased search space by eliminating the need to start from blank slate models with randomly initialized connections. Partitions pertaining to an exemplary XAI training process may likewise be informed by constraints, further reducing the time spent on the inner optimization problem.

Constraints may be implemented in a variety of suitable exemplary implementations including, but not limited to, in the form of symbolic rules or system of symbolic expressions, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L2 functions, fractal-based transforms, Hadamard transforms, Type 1 and Type 2 fuzzy logic and difference analysis. Constraints may also be implemented in form of a data structure that references the different features and variables accessible to the explainable model and any associated taxonomies, ontologies, and causal models. Constraints may also be implemented in the form of knowledge graph networks or some other suitable form of knowledge graph embeddings. It is further contemplated that constraints may be implemented in the form of suitable graph, hypergraph, or simplicial complex embeddings.

In an exemplary embodiment, additional transforms and normalization/standardization may be applied to enhance the AutoXAI system performance and the explainable model performance, such as categorical encoding, continuous data bucketization, rotational invariance and rotational adjustments, dimensional and dimensionless scaling and scaling adjustments, translational invariance and translational adjustments, and translational equivariance adjustments, together with other suitable constraint transformations.

An exemplary AutoXAI system may also utilize a taxonomies and ontologies component to enhance information in the model and provide a practical solution to the standardization of information to all the AutoXAI inputs and outputs. It may be further contemplated that the AutoXAI system may use taxonomies and ontologies to represent constraints, transformations and mappings between taxonomies and ontologies to facilitate the conversion and translation of taxonomical and ontological data between different taxonomies and ontologies.

An exemplary AutoXAI system may perform and keep track of feature transformations of the training dataset. The AutoXAI transform function may be a pipeline of transformations, including but not limited to polynomial expansions, rotational transformation, dimensional and dimensionless scaling, Fourier transforms, Walsh functions, state-space and phase-space transforms, Haar and non-Haar wavelets, generalized L1/L2 functions, fractal-based transforms, Hadamard transforms, Type 1 and Type 2 fuzzy logic, knowledge graph networks, categorical encoding, topological transforms of Kolmogorov/Frechet/Hausdorff/Tychonoff spaces, difference analysis and normalization/standardization of data. The transform function pipeline may further contain transforms that analyze sequences of data that are ordered according to the value of one or more variables, including temporally ordered data sequences. The transformation function pipeline may further contain transformations obtained via gradient descent methods and other explainable architectures.

In another exemplary embodiment, taxonomies and ontologies may also be used to link taxonomies and ontologies to causal models, and/or hypotheses and concepts, thus combining the element of cause-and-effect analysis within the hierarchical structuring provided by taxonomies and ontologies. This causal model link may be used to improve the creation and enhancement of casual models and improve the resulting quality of the explainable machine learning models output during the iterative process of improvement implemented as part of an exemplary AutoXAI system.

It may be contemplated that the AutoXAI may utilize taxonomies and ontologies to extend the features of the output explainable models with taxonomy trees, networks and graphs and ontological trees, networks, graphs, hypergraphs, and simplicial complexes. It may be further contemplated that taxonomies and ontologies may be utilized by the AutoXAI in blending and fusing knowledge found in taxonomies and ontologies with human and machine-generated knowledge, which in an exemplary implementation, may be implemented with a combination of symbolic knowledge, rule and expert systems, workflow systems and suitable HKI implementations.

In an exemplary embodiment, an exemplary AutoXAI system may use the OECD taxonomy of knowledge classes and the Suggested Upper Merged Ontology (SUMO) merged with the YAGO ontology (YAGO-SUMO) as default base taxonomies and ontologies that are then extended according to the specific application implementation. (See *Integrating YAGO into the Suggested Upper Merged Ontology*, de Melo 2008).

In another exemplary embodiment, taxonomies and ontologies may provide additional domain-specific methods of optimizing MOO by implementing approaches that evaluate explainability and/or interpretability, for example, by using one of the three evaluation approaches defined in (Doshi-Velez et al., 2017), namely: application-grounded, human-grounded, and functionally-grounded.

FIG. 4 may illustrate an exemplary evolution of an XAI partition model between an early and late-stage generation. The correct (true) partitioning 901 is displayed on the left, while the early 902, middle 903 and late 904 candidate estimates are shown on the right. Each model 901-904 may illustrate 5 partitions (1-5). The partitions in this exemplary embodiment may be, for example, partitions of a dataset. The early stage 902 may illustrate an early candidate identified by an exemplary embodiment. The estimated partitioning of the five exemplary partitions may become successively closer to the true partitioning as the exemplary system proceeds through the stages, shown vertically from top to bottom.

FIG. 5 may illustrate an exemplary evolution which may pertain to an XNN model where the partitioning and predictive parts of the network are split into conditional and prediction parts, respectively. In the early candidate 1001 architecture, the illustrated exemplary model may only have two partitions $P_2$ and $P_3$ 1002. As the exemplary model search proceeds, the number of partitions may increase to better fit the true partitioning. For example, the system may then generate a late candidate 1003, which in this exemplary embodiment used for illustrative purposes includes four partitions: $P_4$, $P_5$, $P_6$ and $P_7$. Constraining the partitions may increase the speed of the search process or offer an initial condition upon which to improve.

Another type of constraint which may be implemented in an exemplary embodiment may originate from causal models of the domain. For example, a Structural Causal Model (SCM), a directed acyclic graph (DAG) or a structural equation model (SEM) may be provided and may be a result of an automated process or encoded from prior human knowledge via Human Knowledge Injection (HKI) processes. This knowledge may be injected into the model search workflow to constrain certain statistical aspects of the process. Causal knowledge in the form of an SCM, DAG, or SEM may be first converted into a Bayesian network or a probabilistic graphical model (PGM). This conversion step may result in a direct representation of the joint distribution of prior knowledge, from which the necessary or desired statistical constraints may be read off or identified.

In addition to and beyond the statistical constraints of the underlying model, some XAI embodiments may have the explicit ability to directly represent causal information. When applicable, the algorithm may be able to extract this causal information to constrain the candidate architectures' causal model if the process is supplied with a DAG, SCM or SEM. Explicit representation of causal information may allow for a comprehensive manipulation of such concepts as interventions and counterfactuals if the underlying XAI system allows it.

Causal reasoning may allow the user to make inferences about the causal relationship between variables, as opposed to the correlational relationship captured by statistics. Causal models of a domain may necessitate the inclusion of variables that may not be immediately relevant to the proper modelling of the statistics of some domain. These "external" variables may impinge upon variables within the statistical model (which may be referred to as exogenous variables, to distinguish them from endogenous variables). Endogenous variables, on the other hand, may be entirely determined by variables within the statistical model.

An exemplary embodiment implementing AutoXAI may benefit from the addition of causal model search and optimization, which may be performed in a semi-supervised manner. The casual model fit for a particular explainable model version can be estimated to determine whether the causal model adequately describes the generative process underlying the dataset itself and/or the explainable model. AutoXAI may be used to find better causal models, or automatically identify gaps within causal models. Identified gaps may need human supervision to fill the gap, and in some cases may be filled automatically using appropriate causal analysis methods or heuristic methods. It may be further contemplated that domain specific methods may be implemented to aid an exemplary embodiment in filling gaps automatically, for example, by using a Physics Model to fill in causal model gaps in a plausible manner. It is further contemplated that in an exemplary embodiment, an AutoXAI system may utilize a suitable causal model discovery method such as IC*, temporal analysis, a Bayesian or Mutual Information-based process or other suitable process to generate possible causal models automatically.

Although there are strong benefits to the use of prior knowledge to constrain model search, this workflow allows the search to proceed with or without prior knowledge. Thus, none, some, or all multiple types of prior knowledge may be used in an exemplary embodiment.

Prior knowledge injection (PKI) may be accomplished on the basis of user-mediated knowledge and/or the result of a separate automated process. In the case where PKI is embodied as human knowledge, it may also be referred to as Human Knowledge Injection (HKI).

Exemplary prior knowledge includes, but is not limited to, hand-crafted SEMs, SCMs, lists of logical impossibilities (implemented as statistical impossibilities; e.g., "5 meter tall people"), and numeric limits of variables.

FIG. 6 illustrates an exemplary hard constraint on input features expressed as a disallowable region 1101 in the feature risk & cost space. This constraint may be injected into the model search as prior knowledge affecting the model's pre-hoc variables. Prior knowledge may be a type of constraint that may be dealt with by model search in a manner similar to other constraints.

An exemplary AutoXAI system may have an interaction and moderator component that contains information about the statistical correlations and causal interactions identified in the explainable model. It may be further contemplated that such an interaction and moderator component may exchange and transmit information to an EIGS and its components.

Statistical and causal interactions can be stored as a combination of, for example: (i.) transformations and mappings of subsets of data features against one or more subsets of data features; (ii.) predictions from information embedded in some reconstructed state space, and/or latent space, and/or phase space; (iii.) statistical correlations and interactions and similar type of information; (iv.) causal interactions and similar type of information; (v.) co-occurrence statistics indicative of cause-and-effect; (vi.) estimator functions and estimands together with their resulting estimates. Other information may also be included in an exemplary embodiment.

An exemplary embodiment may include an AutoXAI interactions and moderators component, in which estimator functions may be used to determine an estimate from an estimand, which can be any relevant piece of information identified in the explainable model and its components. Exemplary estimator functions may include, for example, (i.) a point estimator that gives a single-valued result or a single vector-valued result or a result that can be expressed as a single function, or (ii.) an interval estimator that gives a range of possible values, vectors, or functions. In an exemplary embodiment, the model fit evaluation implementation in the hypotheses and state model kept in the AutoXAI MOO system may be used to determine whether the estimator functions in the AutoXAI mediations component have a high level of fit, possibly under increasingly specific constraints or a lower level of fit or possibly under more generic and widely applicable constraints. The level of fit may be implemented using statistical tests that determine the quality of model fits to the data, with typical tests using the chi-squared test, root mean square error of approximation (RMSEA), comparative fit index (CFI), standardized root mean square residual (SRMR), and other suitable tests. It is further contemplated that causal fit tests may be implemented to determine the quality of the casual model fits to the causal model and to the data, especially for any objective that uses interventions and counterfactuals.

In an exemplary embodiment, the AutoXAI interactions and moderators component may implement a suitable resampling method, applicable to any relevant piece of information identified in the explainable model and its components, such as bootstrapping (including but not limited to case resampling, Bayesian, smooth, parametric, residual resampling, Gaussian Process, Wild, Block, Poisson, bagging, and aggregation), the jack-knife procedure, or exhaustive and non-exhaustive cross-validation to, for example: (i.) estimate sampling distributions; (ii.) estimate precision and accuracy of sample statistics (medians, variances, bias, confidence intervals, prediction error, percentiles, etc.); (iii.) estimate significance via significance tests or permutation tests; (iv.) validate models using random subsets; and (v.) construct alternatives to statistical inference which are transmitted to the AutoXAI MOO system. Alternatives transmitted to the MOO system may be used as the basis for the additional creation of a black-box machine learning model in cases where it may not be practical to create a standard white-box statistical or causal parametric model. Exemplary black-box machine learning models may in turn be induced to a white-box model and added to the collection of models in an iterative process.

In an exemplary embodiment, the AutoXAI interactions and moderators component may utilize statistical and causal interaction information to discover the presence of moderators within any relevant piece of information identified in the explainable model and its components. The AutoXAI system may implement moderators as a categorical or a quantitative variable that affects the direction and/or strength of the relation between the interactions identified. A combination of (i.) a suitable correlation analysis method such as the Pearson product-moment correlation coefficient (PPMCC); or (ii.) a suitable variance analysis method such as ANOVA may be used with a suitable machine learning method such as gradient-descent or mutual information-based methods to provide a practical moderator discovery implementation.

In an exemplary embodiment, the AutoXAI mediations component may be included which may contain information about the statistical and causal mediations applicable in the explainable model and its components. Statistical and causal mediation models implemented as part of the AutoXAI system may use a suitable machine learning process for the identification and creation of such mediation models, which may be serial or parallel in structure. Statistical mediation models may refer to the statistical information held in the form of hypotheses, concepts, or MOO information, and as part of the AutoXAI interactions and moderators component, while causal mediation models may refer to the casual information held in hypotheses, concepts or MOO information and interaction maps.

For both statistical and causal mediation models, an exemplary embodiment including a mediation component may implement a practical way of explaining a subset of the information when additional variables, known as mediator variables (sometimes also known as a mediating, intermediary or intervening variable in literature), may be necessary to be included to have a better quality explanation, for example, by clarifying the relationship between how independent variables influence the dependent variables in the explainable model and its components, via non-observable mediator variables.

The automated identification of mediator variables may provide a practical way for the AutoXAI system to identify cases of potential omitted-variable bias while also providing suggestions regarding potentially missing data features in the input data to the explainable models, or potentially missing elements from relevant causal models.

Practical implementations of the AutoXAI mediation component may utilize a combination of the Baron and Kenny procedure, the Sobel test, the Preacher and Hayes bootstrap method, or other suitable methods to identify potential mediator variables automatically. It may be contemplated that mediator variables may be classified into either full or partial mediation classes, according to whether the discovered mediator variable can fully or partially account for the observed relationship between variables in the explainable model and its components.

In an exemplary embodiment, an exemplary AutoXAI mediation component may implement Causal mediation models to identify the extent to which variables in the explainable model and its components participate in the transmission of change from the underlying causes to the observed effects. Causal mediation models in the AutoXAI mediation component may utilize the appropriate causal logic system appropriate for the specific AutoXAI implementation. In an exemplary practical implementation for illustrative purposes, the counterfactual-based indirect effect estimation methods can be used by the AutoXAI mediation component to obtain a causal mediation result by calculating a counterfactual expression that estimates the natural indirect effect (NIE) in the absence of confounding.

An exemplary AutoXAI system may generate a Feature Map to explain the explainable models that it may create and/or discover. An exemplary Feature Map may provide an overview of the most relevant features pertaining to the outcome of one or more reference transactions. Features that are less relevant may be summarised automatically. Features that are relevant may be referred to as Selected Features and may be classified into one of three classes: (i.) Input and Output Features; (ii.) Transformed Features; (iii.) Feature Interactions.

Features may include the directly accessible features from the dataset(s) used to train the explainable model. They may be directly populated from the observations stored and represented by the data itself. This exemplary subset of selected features may also be referred to as "Input Features." Features may also include the directly accessible output features that are output from the explainable model. This exemplary subset of selected features may also be referred to as "Output Features."

Transformed Features may hold the results of the application of transformation functions or entire transformation pipelines applied to Features. For example, a Polynomial transform may create the square of a feature, which may be denoted by a Polynomial degree 2 transform.

Feature Interactions may hold the results of statistical interactions, causal interactions and logical, symbolic relationships between the Features and Transformed Features. For example, if an explainable model has a feature for 'Profit,' it may also have an interaction with two other Features, such as 'Income' and 'Expense,' where the Feature Interaction may be expressed as 'Profit'='Income'−'Expense'.

Transformations and Interactions may also be applied iteratively. In an exemplary application, a transformed feature may interact with a non-transformed feature, and the result may then be finally transformed. The resulting map of Transformations and Interactions may be, for example, similar to a computational graph, and may show all the predecessor links for a particular variable. Predecessor links, or a predecessor path, may indicate which Transformations and Interactions have been applied. In an exemplary embodiment, an exemplary AutoXAI system may output a computationally oriented graph, which may be referred to as a Dependency Graph.

It may be further contemplated that the Dependency Graph and/or Feature Map may be used by the AutoXAI system as a suitable starting point for the identification and inference of a suitable causal model that explains the dataset itself. In some embodiments, full identification and inference of causal models may require the use Human Knowledge Injection (HKI), however, partial, or incomplete identification and inference may be implemented in a fully automated manner in a number of useful scenarios.

Aside from PKI, an exemplary embodiment may also exploit learned representations during the search process so that new candidate architectures are informed by the latest Pareto-optimal candidates, even if the architectures do not perfectly match. This is a type of transfer learning and may be achieved by morphing existing architectures and reusing previous parameters during the candidate generation step, rather than starting entirely from scratch. Transfer learning may be utilized, for example, for weight and connectivity initialization.

In an exemplary embodiment where an AutoXAI system utilizes Genetic Algorithms (GA), a degree of randomness via mutation may be injected into the process, to prevent the system from settling onto local minima (or maxima), rather than the optimal, global minimum (or maximum). Mutation thus may introduce an exploration tendency, balancing the exploitation inherent to the transfer process. Mutation may be implemented in several ways. In an exemplary embodiment, mutation can be implemented as a random Gaussian noise applied to the candidate offspring in the case of real-valued variables, or random bit-flips in the case of bit-string representation. Mutation may be kept purely exploratory and non-directed (that is, without assumed priors as to which way to mutate), to avoid getting stuck in a local optimum. The exploitative part of the search algorithm (such as crossover in GA, averaging in NES, etc.) may then supply the directed component of the search process.

AutoXAI may be one of multiple components in a wider deep learning ecosystem which may provide an explainable AI. The exemplary embodiment in FIG. 7 illustrates exemplary data flows and the wider context within which AutoXAI may be situated. Machine learning and AI may start from a data gathering operation 1151 or a generation process 1154. These data may be collected in a real dataset 1152 or a synthetic dataset 1155. When data is collected from real-world observation, it may be transformed and cleaned in a further quality assurance process 1153 that may perform several ETL (extract, transform, load procedures) and pre-processing tasks. These transformations are various, possibly including such tasks as converting raw units to logarithms, filling in null data (called "imputation"), standardization and normalization, and dimensionality reduction. In an exemplary embodiment, the Quality Assurance components and processes of an EIGS system may be utilized to perform additional pre-processing.

The synthetic and real datasets may then be merged and perturbed to generate further observations of the input data 1156, resulting in a merged dataset 1158. A separate causal modelling process 1157 may also take the real-world observations and generate a causal model that may inform the synthetic generative process 1154.

At this point, conventional data science techniques 1164 and an exemplary AutoXAI pipeline 1166 may differ from each other. In conventional data science 1164, the final black-box model 1160 may be created through trial and error and/or a tedious process of handcrafting 1159. This may result in sub-optimal performance of the final model and a high demand on human resources. In an exemplary embodiment, a pipeline may follow one of two paths to explainable AI to avoid this sub-optimal performance issue caused by handcrafting 1159.

The first path, the direct path to a white-box explainable model, may feed the causal model and the merged dataset into the AutoXAI process 1161, which may automatically generate optimal final candidates to be trained via induction 1162, resulting in a white-box model 1163. It is further contemplated that this first path may also be implemented in an exemplary embodiment as part of an EIGS system.

The second path, the indirect path to a white-box explainable model, may take an existing black-box model 1160 from the conventional workflow 1164 and submit it to the AutoXAI process 1161 to produce an explainable white-box equivalent. The result may also be a white-box model 1163.

Thus, FIG. 7 illustrates two exemplary paths to producing an exemplary explainable AI. The resulting white-box model from the exemplary AutoXAI may be as powerful or more powerful as existing black-box models created via handcrafting, trial & error, or even AutoML methods that automate black-box model generation.

An exemplary AutoXAI may provide a practical implementation solution for the flexible creation of explainable and interpretable models.

Explainable models may be trained in one step directly without the need to have an external induction step. Explainable models may also be trained using methods such as particle swarm optimization (PSO), genetic algorithms (GAs), Bayesian optimization (BO), reinforcement learning (RLs) and gradient-descent methods. It may be further contemplated that the white-box nature of explainable models may also allow AutoXAI system to implement one-shot and zero-shot learning methods in the creation and/or training of explainable models.

AutoXAI, XAI and XNN Models compute the encoding and explanation in a single feed-forward pass, without the need for further processing or perturbation. Further to the pipeline shown in FIG. 7, an exemplary white-box model may also be associated with extra post-processing steps that transform the output results and/or explanations into another format or apply additional statistical computations such as aggregations.

Still referring to FIG. 7, an exemplary embodiment may have explainable model context which may be an output of an exemplary AutoXAI process 1161 and/or in combination with the Data Generation Process 1154. Causal Models and Data Generation Models 1157 may be a further source of explainable model context, typically extracted from analysis of a Causal Model or via some form of appropriate cause-and-effect analysis (such as d-separation analysis or counterfactual analysis). The Induction Process 1162 may also be further source of explainable model context, which may be extracted via analysis of a black-box AI model.

AutoXAI explainable models may thus contain a combination of data, model and context that is unique to an exemplary embodiment.

Referring now to the exemplary embodiment in FIG. 8, FIG. 8 may illustrate an overview of an exemplary model search workflow. Note that most of the steps in FIG. 8 are exemplary and can be swapped for other techniques in different exemplary embodiments of XAI model search.

In some exemplary embodiments, model search 1201 may include a training dataset which may include several data rows, which may contain observations, and may be organized into multiple columns to indicate features. The training dataset may also include a set of exit conditions. Exit conditions can be of multiple types, acting in conjunction or disjunction, for example: a maximum search budget, a number of iterations, or a minimum improvement per cycle. If feature cost is to be optimized, the workflow may also include a feature cost table. Note that here we are distinguishing between feature value and feature cost. Obtaining a feature value, for example a time-series reading from an invasive EEG electrode, may be associated with a feature cost, in this case the cost or "risk" of the surgical procedure to install an invasive EEG electrode. An AutoXAI system minimizes the overall feature cost by choosing the set of features with minimal feature cost, presenting them to the underlying XAI system, which produces its predictions via use of feature values. If PKI is to be used, then further causal or statistical constraints may be supplied. Without causal and statistical constraints, model search may be initialized randomly.

In exemplary step 1202, features may be mapped onto a fixed cost if feature costs are supplied. If feature costs are a function of feature values, representative samples from the dataset may be used to compute fixed feature costs.

In step 1203, seed candidates may be generated. If the set of supplied constraints do not constrain the network connectivity, then candidate connectivity may be initialized randomly. Alternatively, the supplied constraints may be encoded into a weight & connectivity pattern. Seed candidates may always be a subset of every candidate 1206.

Step 1204 may describe an iterative combination of steps relating to an external optimizer. Each iteration of the external optimizer 1204 may include a step of checking for pre-hoc constrains 1205, which then may be applied to every candidate 1206. Pre-hoc costs then may be evaluated and stored 1207 for every candidate. The iteration 1204 may continue to run every candidate's training 1208 (i.e., internal optimizer)—using backprop, PSO, RL or alternative training techniques applicable to the particular type of XAI. The process may further extract and store test post-hoc scores 1209 of every candidate, which may include: performance of every candidate (or robustness if stability of candidate solution is an objective) and explainability. The extraction of post-hoc scores may include generating score tuples. Each tuple may include, for example, (performance, explainability), or any other contemplated information or metric. Every objective and associated metric may introduce another score in the tuple. For instance, if feature cost is an objective, the tuple may be (performance, explainability score, total feature cost). Other objectives may be implemented in the same way. There may be no limit to the number of objectives to be optimized and associated scores.

Still referring to the external optimizer loop 1204, the process may update the Pareto front 1210 with the new tuples. If any of the exit conditions 1211 are reached, the process or system may exit from the external optimizer loop 1204.

New candidates may be regenerated 1212 via, for example, recombination (if using GA optimization) or other evolutionary techniques from Pareto-optimal candidates. Architecture parameters may be represented as variable-length chromosomes, with each gene set appending and describing a new layer, in GA. Categorical variables may be represented as bitstrings in GA. Recombination via splicing two parents followed by mutation may ensure optimal explore-and-exploit search. If using PSO or natural evolution strategies (NES), discrete and categorical variables may be mapped onto the continuous domain, since these algorithms may not handle discrete representation out of the box.

The step of regenerating new candidates 1212 may also include initializing novel candidates by their parent architectures plus perturbation, wherever their architectures match, in an implementation of transfer learning. Constraints may also be applied to the regenerated new candidates if initial connectivity and weights are represented (and thus may implement prior knowledge injection).

Finally, final candidates may be selected 1213 from among a final list of Pareto optimal candidates, and the model search may be concluded 1214.

An exemplary embodiment may map feature costs 1202. One of the objectives may be feature cost. In this exemplary case, the step prior to external optimization may include mapping features onto their cost. This may be a simple tabulation if costs are fixed and known a priori. If costs are not fixed and are instead a function of other features (e.g., the medical risk of a test procedure may be a function of age, or the cost of an emissions test may be a function of a vehicle's engine type), the fixed cost may be calculated, for example, by averaging over a representative sample from the training dataset. If feature cost is a function of other feature values, a fixed value may not be needed, and may instead be measured alongside or during optimization by summing every training row's total feature cost. Note that feature cost may not be a feature itself. Instead, feature cost may refer to the cost of using a particular feature for prediction purposes and is therefore a type of feature metadata.

Feature extraction may be more costly for some features than others—financially or otherwise. For instance, in the automotive industry it may be much more expensive to measure a vehicle's precise emissions than it is to measure its dimensions. Likewise, an EEG procedure involving surgical implantation of electrodes in the brain can be harmful as well as distressing to a patient, as opposed to a skull-cap EEG. These features have different costs. At the same time, an invasive surgical procedure is likely more reliable a test for certain illnesses than is, in comparison, a skull-cap EEG. Feature cost, therefore, is a separate measure to optimize against, potentially at cross-purposes with model performance: a high-performance model may demand high-cost features.

An exemplary embodiment may generate seed candidates 1203. Initial candidates may be selected by sampling from the entire search space, which may combine the feature possibilities along with algorithm hyperparameters and architecture properties.

If no further constraints are supplied, the seed candidates may be chosen randomly—assuming any of several probability distribution functions as may be supplied by the user, including but not limited to the uniform distribution, Poisson distribution, Gaussian (normal) distribution, beta distribution, binomial distribution, and log normal distribution. If pre-hoc constraints (i.e., constraints applicable to the search space, such as feature cost) are supplied, they may be applied at this stage. The method used to convert a constraint into a distribution of possible parameters may vary with the type of constraint. Soft constraints, for instance, may have an associated metric that quantifies the "fitness" of a candidate (e.g., the probability of selecting a particular candidate may be inversely proportional to its feature cost or medical risk, in some embodiments). Hard constraints, on the other hand, may not have an associated metric. Instead, they may delimit the search space by defining disallowed regions (e.g., the number of model parameters that may have to be below a precise threshold). Seed candidates may initially be unaffected by post-hoc constraints.

The external optimizer 1204 may encapsulate multiple steps of the model search. Each of the steps within the external optimizer 1204 may be carried out as many times as necessary, i.e., until one of the exit conditions is met.

An exemplary external optimizer 1204 may apply, evaluate and store pre-hoc costs 1206/1207. Soft pre-hoc constraints may have an associated cost which may quantify the "fitness" of a candidate or lack thereof. Each candidate's pre-hoc fitness may be stored 1207. The quantified fitness score may be in vector form, and each constraint may supply one dimension of the final candidate score.

The external optimizer may run an internal optimizer/ training 1208. Training may be carried out at the candidate level. The method may depend on the underlying type of XAI model. In explainable neural networks (XNNs), for instance, backprop or PSO may be useful alternatives. In explainable spiking networks (XSNs), backprop through time (BPTT), reinforcement learning (RL) or evolutionary methods may be more appropriate. Several alternative training techniques may apply.

As described previously, performance may also be estimated via one of several estimation techniques. These may include but are not limited to lower-fidelity estimates, learning curve exploitation, weight inheritance/network morphism, one-shot models, and performance prediction.

Another exemplary step of the external optimizer process may evaluate & store post-hoc results 1209. Each soft post-hoc constraint may have an associated cost, which may be evaluated and appended to the pre-hoc costs at this point to form a full score vector. Soft constraints may include performance and explainability. Performance may be replaced with robustness (performance averaged over a distribution of representative datasets) if stability is a concern. Explainability may be quantified via suitable functionally-grounded measures. It may be contemplated that an exemplary embodiment may use explainability measures to optimize and/or enhance model and output explainability.

Exemplary embodiments may rely on functionally-grounded measures, which may be a practical implementation choice when an exemplary automated AutoXAI process may need to evaluate a large quantity of evaluations.

Semi-supervised or fully-supervised methods such as application-grounded and human-grounded measures may also be incorporated within an AutoXAI process by sampling a practical and reasonable selection of evaluation points during the model search process that can be reasonably evaluated by a human. The human evaluation and input from this sampling may be either used directly as part of the MOO input, or by the additional application of some form of interpolation and/or extrapolation function and may obtain plausible values for evaluation points for which an explicit human answer is not available.

In an exemplary embodiment, Boosted Learning may be implemented as part of an exemplary AutoXAI system, by combining appropriate analysis methods such as confusion matrices and data from the Pareto front to direct the next iteration of an AutoXAI system towards portions of the search spaces which may optimize the objectives within the constraints. It may be further contemplated that such directed search may be implemented in a supervised or unsupervised manner. In an unsupervised implementation, constraints may be set to protect parts of the AutoXAI explainable model that are performing within acceptable or desirable performance criteria, effectively limiting the search space to sub-sets of the possible search space. It is further contemplated that a separate explainable model or symbolic sub-graph may be utilized to further boost the results of such directed search. In a supervised implementation, the unsupervised implementation may be extended to implement HKI. In an exemplary embodiment, HKI may be used to decide which parts of the AutoXAI explainable model to protect from change and what parts to allow to be changed by the AutoXAI system. In an exemplary application, such a supervised implementation may be useful in a regulated industry application, such as high-risk application areas such as healthcare devices, where explainable model changes may be disallowed without human oversight and supervision.

In an exemplary embodiment, the AutoXAI system may use an appropriate Strength and Weakness (SAW) metric. In an exemplary embodiment, an appropriate SAW metric may be defined as a two-dimensional vector <strength metric, certainty metric> containing scalar frequency counts of instances matching that particular (strength, certainty) combination. Appropriate strength metrics may be ML model performance metrics, like accuracy, precision, recall, F1-score, and so on, while appropriate certainty metrics may be provided by prediction interval or confidence interval methods. The SAW-AUC metric may be further defined as being the area under the normalized two-dimensional curve (i.e., the integral) of the SAW vector, which may be further pre-processed or post-processed with some form of ranking and weighting function or distribution.

Note that each soft constraint introduces a new scalar in the score vector. In an exemplary embodiment where feature cost and parameter size are soft constraints, for instance, the score tuple looks like this: (feature cost, number of parameters, performance, explainability). In this case, model search will look for the best tradeoff between all these objectives, making sure that candidate models offer low feature cost, few parameters, high performance, and good explainability. Introducing soft constraints such as parameter number and feature cost ensures not only that the final model will be satisfactory in terms of these constraints, but also that the search process avoids candidates with a sudden increase in parameters or feature cost. This may potentially speed up model search.

There is no limit to the number of objectives to be optimized and associated costs.

Each iteration of the external optimizer may update the Pareto front 1210. The Pareto front may refer to the set of candidates that are not Pareto dominated; including the set of candidates whose fitness cannot be improved without losing the tradeoff, i.e., without degrading the scalar fitness of some other objective. Thus, the Pareto front may be updated by identifying which candidates optimize the available metrics based on the values closest to the objectives and which are bound by the constraints. The Pareto front may be useful in MOO, because it may embody the "best" current selection of candidates. Future candidates may be regenerated from parent candidates among the Pareto front. Candidates on the Pareto front are often referred to as potential candidates due to the MOO process.

It may be further contemplated that the candidates may be clustered in N dimensional space, using unsupervised learning techniques such as K-Means clustering or hierarchical clustering algorithms, to identify groups of candidates that lead to a particular position in the Pareto space. The clustered candidates in N dimensional space may correspond to attractors and allow for integration of phase space analysis techniques together with the determination of stability and chaos within the explainable model being discovered, optimized or analyzed by the AutoXAI system. It may be further contemplated that appropriate techniques, such as Nyquist, Bode and Nichols plots and other suitable techniques may be utilized to enhance the resulting quality of the explainable model.

Multiple exit conditions may apply, and the exit conditions may be checked 1211 during each iteration of the external optimizer 1204. These exit conditions may determine the point at which the external optimizer finishes and the set of candidates making the current Pareto front are retained for final sampling. In an exemplary embodiment implementing an iterative external optimizer, exit conditions must be supplied in order to end the iteration. For example, a number of iterations may be given. Other conditions may apply conjunctively or disjunctively, as determined by the user. Conditions include but are not limited to a maximum search budget, a number of iterations, and a minimum improvement per generation (i.e., per cycle of the external optimizer).

If the exit conditions are not met, another exemplary step 1212 may regenerate new candidates from the Pareto front for the next iteration of the external optimizer loop. Regeneration can be realized in several possible ways.

In some embodiments implementing evolutionary optimization techniques, regeneration 1212 may take the form of parent recombination and mutation. This may be the case with genetic algorithms (GAs) and evolution strategies (ES). In an exemplary GA recombination, two parent candidates from the set of top performers may be chosen and their genetic code spliced together using one of a family of techniques called crossover. In ES, recombination may be carried out by a numeric averaging of parents' parameters, and thus parameters may need to be of continuous type. Mutation may add a random element to the search, allowing the search technique to explore as well as exploit the search space. In PSO, evolution of parameters may occur as a result of continuous updates to particle speed through the search space, dependent on factors such as globally best explored position, and previous speed.

In another exemplary embodiment of the external optimizer, Monte Carlo simulation methods may be used for the optimizer. Bandit-based Monte Carlo optimization (BMO), as described in Bagaria et al. (2020) or Monte Carlo tree search (MCTS) may both be used in different exemplary embodiments of the external optimizer. In an exemplary embodiment, recombination may be replaced by a heuristic random process that directs the search towards optimal parts of the space, such as those which optimize the objectives within the constraints.

In another exemplary embodiment of the external optimizer, an RL or XRL agent may be used for the optimizer. In this exemplary case, recombination may be replaced by an agent following some appropriate policy, actions and reward function that directs the search towards those parts of the space that may optimize the objectives. Such an exemplary embodiment may have an inherent advantage in making the optimization process itself explainable in both cases of an RL or XRL agent. An XRL agent adds an additional advantage of utilizing the explanations themselves and introspecting the agent's explanation states in a manner that may direct the search in a possibly more optimal way. In a further exemplary embodiment, an AutoXAI system may implement and/or deploy multiple XRL agents for optimization and discovery purposes. Such multiple XRL agents may utilize a combination of independent and dependent/communicating processes and decisions. It is further contemplated that such decision-making processes may be structured and presented using a suitable Identify-Assess-Resolve (IAR) framework.

In some exemplary embodiments, model search may be relatively open-ended with respect to at least some of the parameters, and some architectural entities may be nested (e.g., layers may contain several neurons), and therefore the representation scheme may need to be sophisticated enough to cater to these requirements without limiting itself to explicit encodings. In some embodiments, some parameters may best be represented via variable-length chromosomes, which may conveniently allow the search process to incrementally add, remove, and manipulate new gene sets that encode for new layers with a variable number of neurons, activation functions, etc. GA may allow this form of manipulation out of the box. Other optimization algorithms may need to be hybridized with GA in order to achieve this versatility.

In some exemplary embodiments, discrete and categorical variables may be represented as bitstrings, which can be manipulated in GA. Other evolutionary strategies such as PSO or ES/NES may include a supplementary step that may convert categorical variables into the continuous domain, and therefore may be retained for the naturally continuous variables in the search space, possibly hybridized with GA.

Transfer learning techniques may be applied at the regeneration stage 1212. Knowledge gleaned from the existing candidates may be reused to reduce training time and/or achieve better performance. One exemplary technique may reuse network weights when candidate architectures share similar structures as the previous generation's structures.

Moreover, all pre-hoc constraints may be applied, evaluated and stored to the newly generated candidates at an exemplary regeneration stage 1212, in the same manner as steps 1206 and 1207. Thus, causal, and statistical constraints in the form of PKI may be applied after regeneration of candidates, as in the seed candidate constraint step.

Select final candidates (1213). Once the external optimizer process terminates, the final candidates may be selected from the Pareto optimal set of candidates 1213. The optimal set of candidates may refer to the set of candidates that form the Pareto front of an exemplary final or last generation. In some exemplary embodiments, human-in-the-loop (HIL) selection may be implemented at this stage, or the selection process may be automated.

In addition to the final selection process, HIL may be implemented throughout the model search process. Evolutionary visualization and evolutionary explanations may be examples of AutoXAI characteristics that may allow the end user to refine or to control the process of AutoXAI model discovery and may allow for named reference labelling and prioritization of selected model candidate trees. HKI may also be a useful category of input that may assist in constraining the search space and speeding up the discovery process, as described in the section on PKI. Nevertheless, HKI & HIL may be optional for the nominal functioning of an exemplary AutoXAI system, and they may or may not be included in an exemplary embodiment.

Several types of parameters may be optimized by the AutoXAI system. In some embodiments, the parameters may be specific to the underlying XAI system, or some parameters may be common across systems. Moreover, it may be contemplated that generic hyperparameters that apply to any black-box neural network model may be distinguished from parameters specific to explainable AI models. Exemplary parameters and their data types may include, but are not limited to, the following: The number of units/neurons may be integral. The number of layers may also be integral, however, it may be contemplated that the number of layers may also be implicitly represented by the number of gene sets that code for layer properties, for example, if the exemplary embodiment allows for variable-length chromosomes in GA). Activation types may be categorical. Layer connectivity maps may be integral and may further be binary integers. Selected features may further be binary integers. Initial weights may be continuous variables. Note that representing the initial weights may obviate the need to represent the number of units as a separate hyperparameter. Representing initial weights may be implemented to enable PKI in the form of statistical and causal constraints. A granular representation on one-to-one basis may increase the search difficulty or complexity. Unit connectivity maps may be integral and may further be binary Granular unit connectivity may also be implemented, for example, for PKI. Training hyperparameters may be of various types, which may depend on the XAI type underlying the search.

An exemplary embodiment implementing AutoXAI systems may monitor the stability of the internal AutoXAI explainable models to determine the stability of the explainable model, by identifying, for example, resilience to data drift and model drift. This monitoring may answer questions such as: How stable is the output of the explainable model? Does changing the dataset slightly end up with the explainable model generating a completely different output and explanation?

In an exemplary application, an AutoXAI system may utilize control engineering tools, such as Nyquist analysis, Bode plots, phase-space analysis and other forms of analyses to monitor and assess the stability of the explainable models. In an exemplary embodiment, an AutoXAI based system (or a sub-system being controlled or monitored by an AutoXAI based system) may be monitored during its nominal operational cycle for anomalies, variances, and deviations from normal operational states and status. It is further contemplated that such a monitoring mechanism may be achieved by combining an AutoXAI system with a Behavioral Model (BM), or similar control engineering solution, that allows the definition and implementation of conditions, event, triggers, and actions and their inclusion in the models produced by the AutoXAI system and/or relevant MOO objective functions. Monitoring constraints and expressions underlying conditions, events, triggers and actions may be implemented in a variety of suitable exemplary implementations including, but not limited to, in the form of symbolic rules or system of symbolic expressions, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L1/L2 functions, fractal-based transforms, Hadamard transforms, Type 1 and Type 2 fuzzy logic and difference analysis. Monitoring constraints and expressions may also be implemented in form of a data structure that references the different features and variables accessible to the explainable model and any associated taxonomies, ontologies, and causal models. Monitoring constraints and expressions may also be implemented in the form of knowledge graph networks, control charts, Nelson rules, Bode plots, Nyquist plots and related methods that determine whether some measured behavioral variable is out of control—i.e., giving a measure of unpredictability versus consistency.

In another exemplary embodiment, AutoXAI may rank and prioritize actual and possible changes in variables using some suitable system, which are subsequently presented to the user or to an automated process in the form of an Identify-Assess-Resolve (IAR) framework.

Some exemplary AutoXAI systems may additionally monitor and assess the stability of the model evolution process itself, which may be useful, for example, when performed over multiple versions of the same model during its evolutionary lifetime. Model discovery may create and discard a large number of models. Over the course of different model versions and multiple runs or iterations of an exemplary AutoXAI process, which may be useful in applications where a model may need to be optimized on a regular basis, an exemplary model discovery process may become increasingly predictable. The Pareto front evolution and the search space for multiple runs may change in a predictable manner from one execution run to another. By keeping track of the model evolution for each execution run, the difference between one run/iteration and another may be determined at an exemplary AutoXAI model discovery process level, rather than just at an explainable model level. Monitoring of changes at the model discovery process level may lead to the detection of potential instabilities in the explainable models, in the dataset being used, or in the model discovery process or optimization itself. In an exemplary application, for example, concerning the automated inspection and classification of robotic welding seams, the explainable model that controls the robotic welder may be optimized regularly as different types of metal objects and metals of different quality are regularly presented to the system. In such an example, an exemplary AutoXAI system may monitor the evolution of the explainable model during the optimization process and compare it with previous execution runs. It may be contemplated that if the explainable model is modified in a predictable manner that follows past behavior within some acceptable tolerance level, the new explainable model may be accepted for further testing and eventually used to substitute the current model version in production. If the exemplary explainable model evolves in an unpredictable manner, even if it outperforms the current model version on the MOO metrics, such an anomaly may be flagged for further inspection. This exemplary type of monitoring may detect subtle problems that may creep in over multiple versions of an explainable model that may remain undetected, such as when the MOO metric improvements are small from one version to another.

It may be further contemplated that the named reference labels used to generate model evolution explanations may also serve as useful anchor points for the monitoring of model stability over multiple versions. For example, if many named reference labels suddenly are deleted, perhaps by error, or the position of the named reference labels drastically shifted from one model version to another, this may indicate an anomalous situation which may be flagged for further inspection.

In an exemplary embodiment, an AutoXAI system and its explainable models may be implemented and verified by on a combination of systems based on one or more of the Temporal Logic of Actions, Abstract Machine Notation, Petri Nets, Computation Tree Logic, and other suitable implementation methods that can formally represent modal logics, intuitionistic logics, and/or relational semantics, including but not limited to Kripke semantics and/or Alexandrov topologies.

In an exemplary embodiment, an AutoXAI system and its explainable models may utilize anchor terms. A number of nodes and edges, and other events, triggers, constraints, and actions in an AutoXAI may be deemed to be important or critical for the particular application domain. Such importance may be determined either by the application or usage context, or via an external third party, such as a regulatory or legal authority or an industry standard making body, that imposes certain mandatory constraints. These type of important or critical constraints may be referred to as anchor terms, anchor variables, anchor nodes, anchor edges, anchor events, anchor triggers, anchor constraints and anchor actions, respectively. Such anchor components are analogous to the anchor terms within Explanation Structure Models (ESMs). Anchor terms may also be assigned a named reference label.

In an exemplary embodiment, quantization methods may be applied during AutoXAI processing to increase performance and possibly reduce implementation size, especially on resource constrained hardware. It is further contemplated that some form of instability reduction technique, such as using Ordinary Differential Equation (ODE) solvers as presented in Qin et al., "Training Generative Adversarial Networks by Solving Ordinary Differential Equations" (2020) may be applied to partially counteract any detrimental effects of quantization on the AutoXAI accuracy and reduce instability during training.

In an exemplary embodiment, an AutoXAI may utilize a combination of model-free and model-based optimization methods. Model-free methods that rely on statistical relationships and suitable measures such as covariance, correlation and mutual information and other suitable techniques can be used to generate the necessary structures within an explainable model without having access to a model or suitable set of priors. Model-based methods that rely on causal relationships, symbolic knowledge or other suitable methods further refine explainable models by adding a richer and more expressive optimization step due to the wider computational representation capabilities of model-based methods.

Explanation constraints and objectives may be quantified in a number of ways. For example, in a human-grounded approach, input and output pairs $\langle I, O \rangle$ may be presented to human judges who may produce an explanation $E_h$ for each input-output pair. The same input and output pairs may be presented to the relevant XAI model being evaluated by the AutoXAI system, which may produce an explanation $E_s$ for each input-output pair. Some suitable distance or scoring function $S_h$ may compare $E_h$ with Es, giving an evaluation function $V_h$ of the form: $V_h(\langle I, O, E_s \rangle, \langle I, O, E_h \rangle) = S_h(E_s, E_h)$.

Using a functionally-grounded approach, human judges may be presented with an input, output, explanation tuple $\langle I, O, E_s \rangle$ and then may be asked to provide a subjective score $S_h'$ that in their opinion best represents the quality or suitability of $E_s$ given the domain and query context and any other information that the human judges deem suitable for the evaluation task. A suitable machine learning method may be used to learn a domain specific function Vs which is trained on $\langle I, O, E_s \rangle$, $S_h'$ pairs. Functionally-grounded measures can avoid or reduce the amount of human intervention via such suitable machine learning methods that emulate the subjective judgements made by humans via some form of interpolation or extrapolation. It is contemplated that more autonomous methods can also be used in a practical exemplary embodiment using some modified F-Measure, BLEU, ROUGE, METEOR, NIST metric, WER, chunking or other appropriate methods.

An exemplary embodiment may implement a learnt function $V_s$ to perform additional domain-specific optimization of induced XAI models and logically equivalent grey-box and white-box explainable machine learning systems by creating an optimized domain-specific function Vo from Vs as follows:

$$V_o(\{\langle I_1, O_1, E_{s1} \rangle, \ldots, \langle I_n, O_n, E_{sn} \rangle\}) = \underset{i \in n}{\mathrm{argmax}} V_s(\langle I_i, O_i, E_{si} \rangle)$$

$V_o$ may be used to optimize XAI systems in various ways, including but not limited to, (i.) the selection and ranking of explanations from a range of possible explanations; (ii.) modification of an explanation to make it more amenable for human use; and (iii.) transformation of an explanation to make it more useful in a domain-specific context. $V_o$ can be learnt and optimized further using methods such as back-propagation, Viterbi, and other suitable methods. $V_o$ may be used as part of the AutoXAI MOO system.

In an exemplary embodiment, AutoXAI systems may be used to discover, modify, and optimize explainable models that may be used as the basis of a practical data privacy preserving AI system implementation.

Data privacy may be violated intentionally or unintentionally by AI systems in a number of scenarios: (i.) personal data from training datasets unintentionally incorporated in AI models; (ii.) personal data can be re-extracted or re-created by analysing the model answers repeatedly; (iii.) personal data of certain uniquely identifiable groups may end up at a higher risk of identification; (iv.) model inversion and membership inference techniques, that can associate model data via a unique key or signature; (v.) other sources of information, such as public data sources, which may be combined with private information, may re-create or otherwise identify private information. The main data privacy preserving solutions for AI can be classified under four categories: (i.) differential privacy; (ii.) secure multi-party computation; (iii.) federated learning; (iv.) homomorphic encryption. Exemplary embodiments of AutoXAI systems may enable practical implementations under all four categories.

In an exemplary privacy preserving solution (i.), differential privacy, the introduction of noise in the training data or some other suitable means of obfuscation, may be used to generate a controllable amount of privacy through a noise factor or ratio, in the XAI model. Exemplary embodiments of AutoXAI systems, which may include selective deletion and editing capabilities, may add such noise selectively according to a data privacy model. Data owners may have the added advantage of having control over the noise level added to the model, thus making it a superior solution to what can be achieved via a black-box. The audit trail functions of an AutoXAI can also be used to detect an anti-obfuscation attack and generate noisy information on purpose to defeat such an attack to prevent private information from being identified through repeat querying of the same data row. The noise level may be a variable which the user may be able to supply or edit. An exemplary embodiment may implement the noise level as a constraint and/or objective.

In privacy preserving solution (ii.), secure multi-party computation (SMPC) may be used to obtain a correct answer while concealing partial information about data and may simultaneously compute the answer using data from one or more sources. Exemplary embodiments of AutoXAI and explainable models may extend SMPC protocols to apply to explanation generation apart from answer output. Commonly used protocols for SMPC implementations, such as the SPDZ protocol, typically allow operations such as combinations of additions and multiplications between two secretly shared numbers. SMPC implementations may utilize exemplary embodiments of AutoXAI that utilize XNNs for their explainable models may use a polynomial basis for the fit layer and that have hierarchical partition functions that may be described using a sequence of additions and multiplications.

Additionally, due to their white-box nature, exemplary embodiments of AutoXAI derived explainable models can be analysed and evaluated formally for security and trust building purposes without revealing any private information. A secure enclave may also be used to decrypt the data in a protected space within the hardware processor, limiting the possibility that other parts of the system can access such data in clear text. An end-to-end hardware implementation of an AutoXAI system and/or an AutoXAI derived explainable model with a secure enclave may be resilient to most forms of data attacks.

In privacy preserving solution (iii.), federated learning, an XAI model may be jointly trained across various decentralized devices that hold only local data samples. The local data samples are not shared with other devices, thus limiting, but not completely eliminating, the privacy risk involved. Exemplary embodiments of AutoXAI systems and AutoXAI derived explainable models may be utilized in a decentralized or federated implementation, and may be implemented directly, for example, in IoT or edge computing applications where messaging options are limited or constrained by the network topology, such as in a mesh network.

In privacy preserving solution (iv.), homomorphic encryption, or homomorphic computing, a protocol such as the Cheon-Kim-Kim-Song (CKKS) protocol, Brakerski-Gentry-Vaikuntanathan (BGV), Brakerski/Fan-Vercauteren (BFV), or the FHEW Fully Homomorphic Encryption protocol (sometimes given the bacronym "Fastest Homomorphic Encryption in the West"), may be used to allow computation on encrypted data without either decrypting the data and also, optionally, using an encrypted XAI model. Homomorphic encryption may be applicable to applications where data privacy is paramount or where making use of such private data is usually already complex, for example, due to regulations, the significance of the data, and security concerns. Homomorphic encryption may also be used for applications where the XAI model itself and its learned information may need to remain encrypted and protected from the data of users or owners themselves. Exemplary homomorphic encryption schemes may be based on ring algebraic structures, which may allow addition-like and multiplication-like operations to be performed, while admitting neutral elements for both operations, for example, natural integers. Homomorphic computing may use an integer polynomial expression to encrypt information and may be able to perform computations on the encrypted polynomial.

In an exemplary embodiment, data may be homomorphically encrypted and, depending on the specific application, the AutoXAI system and AutoXAI derived explainable models themselves may also be homomorphically encrypted.

In some exemplary embodiments in which only the data is homomorphically encrypted, further optimizations may be possible in practice, giving AutoXAI explainable models an inherent advantage for such privacy preserving applications. AutoXAI explainable models may also be readily integrated with homomorphic computing libraries, including but not limited to the HEAAN, SEAL, HElib and PALISADE libraries. The choice and type of functions within an AutoXAI explainable model can also make them more efficiently implementable for exemplary privacy preserving applications, for example, by utilizing linear polynomial transformations of reasonably low degree whenever possible to further minimize the number of multiplications that are necessary to perform. AutoXAI systems and AutoXAI explainable models may also have the added advantage of being able to build up an encrypted explanation based on the encrypted answer, which can then be decoded safely in the recipient's secure environment. An exemplary embodiment implementing homomorphic computing with hardware based secure AutoXAI implementations may present a practical way of implementing highly secure XAI models that may be utilized in environments and applications involving highly sensitive data and/or models without needing to establish much trust, if any, between the parties involved.

In an exemplary embodiment, AutoXAI systems and AutoXAI explainable models may employ Fast XAI extensions that use Fast Weights, also known as Fast XNNs (F-XNNs). Fast Weights are used to implement dynamic updates to the weights stored in the edges of a neural network that are typically performed at run-time via another sub-network, neural network module or a different neural network entirely. Fast Weight updates use the output from an artificial neuron to modify the weights stored in an edge connection, for example by adding or subtracting weight values, without needing to use slower update methods, such as gradient-descent based techniques like back-propagation (back-propagation was originally classified as a Slow Weight update procedure). The ability of Fast Weights to utilize and link multiple neural networks simultaneously makes it ideal in a distributed AI application. Fast Weights are a concept that is still not used in typical modern AI systems, apart from limited applications in the hidden units of Long Short Term Memory (LSTM) systems and some recursive networks, despite being invented in the early 1990s by Schmidhuber. An exemplary embodiment utilizes Fast Weights in an explainable machine learning model or ensemble of explainable machine learning models in an entirely novel application. Fast Weights combined with action triggers can give a superior boost to runtime performance of the resulting system while enabling it to adapt quickly to changing input dataset distribution and new previously unforeseen training data samples that were not part of the original training dataset.

In an exemplary embodiment, AutoXAI systems and AutoXAI explainable models may allow for selective deletion of particular logical rules or selective deletion of specific components from an explainable model. In an exemplary application, customer records may have to be deleted due to data protection issues and the right to be forgotten (such as, for example, to comply with Article 17 of the EU General Data Protection Regulation, or GDPR). An exemplary embodiment implementing white-box explainable models may easily identify which partitions, components or connections could potentially be impacted by a removing a specific data point. Analysis may be performed such that the impact is examined locally (on a specific partition) as well as globally (on the entire explainable model). The analysis may incorporate, for example, frequency analysis of a specific path trace along partitions, connections, and features to identify the rarity or commonality of the specified data point. In an exemplary embodiment, the trace path analysis may be in the form of a backmap process whereby the output of the neural network may be projected back to the input in order to analyse and perform an impact assessment of the partition, feature importance, and data in the explainable model and data via HKI processes, against a number of criteria and thresholds and values set against those criteria.

If the impact assessment concludes that such data points will result into different model behavior, various mitigation strategies may be applied if desired. For example, one exemplary mitigation strategy may involve updating weights to minimize or remove a path without the need for re-training. Another exemplary strategy may involve updating weights along the connection to minimize or reduce the effect of the data point without needing re-training. A third strategy may involve using Fast XAI extensions to achieve the two other strategies in real-time by updating the explainable model in real-time without need for re-training. A fourth strategy may also involve re-training parts of the model using a modified version of the original dataset which may now exclude the selected data points. A fifth strategy may also involve using the AutoXAI model discovery and modification to update the explainable model to exclude the selected data points.

Unlike black-box models, exemplary AutoXAI explainable models may eliminate the need to retrain the entire model from scratch, which in some cases may not be practical. Other impact assessment strategies may be implemented according to the specific embodiment and application, considering domain specific processes and knowledge as may be applicable. The trace path itself may have trace path frequency information calculated as a weighted combination of the frequencies of the components lying on that particular trace path. The rarity or conversely, commonality, of that trace path respectively may determine the identifiability or conversely, anonymity, of a particular data point. The trace path frequency and impact assessment may be combined in assessing the extent to which the explanation and the justification may need to be modified to accommodate the process of selective editing and deletion. The justification may include an explicit marker that HKI processes were involved in the creation of such modified answers. The process of selective deletion may allow AutoXAI explainable models to comply with privacy laws, right to be forgotten laws, and allow assertion of ownership rights over training data sets to take place effectively and in line with best practices in Europe, USA, and the rest of the world.

Different exemplary embodiments of the model search process may employ different combinations of the generic search process (and may also skip some parts) as well as use different techniques for each of the steps. While the below text may illustrate some exemplary embodiments, this is not meant to be comprehensive. Moreover, several of the exemplary embodiments below may be implemented in software form on conventional computers or embodied by specialized hardware such as reprogrammable FPGA, ASIC, quantum computers or neuromorphic chips. Exemplary hardware implementations may offer better power consumption, higher throughputs and miniaturization while opening up edge applications and IoT deployments, but may be, in some cases, less flexible than software implementations.

In one exemplary embodiment, the underlying XAI model may be an explainable neural network (XNN). As previously described in reference to FIG. 12, an XNN may be a white-box equivalent of a conventional black-box neural network. The role of model search, in this case, may be to find the optimal neural network architecture parameters that give the best performance and explainability over a particular problem. In this exemplary embodiment, the XNN may be applied to problems including but not limited to medical imaging, predictive finance, structural damage detection, scene detection, customer lifetime prediction, and anomaly detection.

In FIG. 9A, an exemplary embodiment of an XNN model is applied to medical imaging to detect anomalies such as malignant tumours or hairline fractures. While human expertise may be necessary for a final diagnosis, an automated system 1302 which may be an XNN, may be able to ingest large volumes of medical images 1301 and flag suspect cases into medical reports 1303 for further analysis by a human, reducing workload or flagging overlooked cases, for example, in incipient stages.

FIG. 9B shows possible failure modes of output of an exemplary XNN model applied to bone fracture imagery, such as X-rays. In all cases A 1401, B 1402, C 1403 and D 1404, the predictive model may be supplied with an X-ray image of a hairline fracture in the leg's tibia. In failure mode A 1401, no hairline fracture is detected, even though one is present. In failure mode B 1402, a hairline fracture is detected but no explanation is provided. In failure mode C 1403, a hairline fracture is detected but the wrong explanation is provided, and in success case D 1404 a hairline fracture is detected, and the correct explanation is provided.

In this exemplary embodiment, model search starts from an untrained XNN with the objective of achieving correct detection and explanation as exemplified by case D 1404. The output of case A 1401 may be incorrect because the wrong detection is made by the XNN. Cases B 1402 and C 1403 are unusable because they give no explanation and the wrong explanation, respectively. In this exemplary embodiment, model search may optimize the XNN model to give correct and explainable output in the largest proportion of input cases. A conventional XNN will also optimize its internal parameters (typically, the weights) to give correct and explainable output in the largest proportion of input cases, but model search and AutoXAI has a wider scope. In addition to the internal weights that are optimizable via XNN training, model search may modify any of several other hyperparameters that may allow it to achieve far greater performance and explainability over the same problem set. In effect, model search trains not only the network, but the trainer itself.

In another exemplary embodiment, model search may use an underlying explainable spiking network (XSN) with an injected causal model of structural integrity, which may, for example, determine possible failure modes of an engineering problem, as illustrated in FIGS. 10A-C. In this exemplary case, explainability may be desired, since an engineer supervising the process may desire a short digest of the reasons explaining failure, thus reducing downtime. FIG. 10A shows a schematic of the exemplary engineering structure and the physical relationship of input variables $T_i$. For example, FIG. 10A may illustrate a structure, and the input variables $T_1$ through $T_6$ may refer to physical tension or stress in joints, connections, or points in the structure which may be under load. In this exemplary case, a causal model of the structure may be supplied to model search in the form of an SEM, SCM or a directed acyclic graph (DAG), as shown in FIG. 10B. FIG. 10B is a DAG that embodies the engineering problem in FIG. 10A. While connections in FIG. 10A referred to physical relationships between locations in the structure, connections in FIG. 10B are interpreted as probabilistic relationships between the load variables of the engineering problem. Note that in this exemplary application, failure mode 1601 depends only on $T_4$, $T_5$ and $T_6$. The causal model input may help constrain the model search by initializing the distribution of parameters as explained above. The resulting XSN structure may be generated as shown in FIG. 10C, which illustrates the strong connections 1701 transposed directly from the causal model. Weak connections 1702 may be left in the model to allow for weaker associations that are not captured by the causal model but that may still be used by the model to improve performance. Unconstrained models may have difficulty in solving complex tasks such as the task illustrated in the exemplary embodiment of FIG. 10A, underlining the importance of statistical and causal constraints.

An exemplary embodiment may utilize different hardware for the implementation, including but not limited to: (i) Application Specific Integrated Circuits (ASICs), (ii) Field Programmable Gate Arrays (FPGAs), (iii) neuromorphic hardware or (iv) analogue/digital circuitry.

Hardware may be used for a partial or full implementation of the AutoXAI system, either involving a complete self-contained system that may be used to perform AutoXAI on the device itself via its own dedicated interface, or by providing support for the user interface that may then be augmented by appropriate software and/or external information.

It may be further contemplated that in some exemplary applications, such as the correct handling of safety boundaries, or ethical applications and safety applications, the incorporation of human provided rules and information may prove beneficial. In an exemplary embodiment, the AutoXAI system may use a secure processor, secure crypto-processor, hardware security module, trusted platform module or appropriate hardware device for a practical implementation. An exemplary application may be in a factory or warehouse utilizing autonomous robots that adapt to changing environments, where people may come into close vicinity of robots. The safety parameters loaded into the robot's behavioral model, linked to the explainable system controlling the robot, may be coded in a secure processing hardware environment to provide an element of tamper proofing, as tampering in such an application may lead to potentially unsafe situations for the people interacting with the robots. Such a safety system may allow the robots to adapt using the AutoXAI system yet may continue to guarantee safe operations that cannot be tampered with or changed by the AutoXAI system.

Another exemplary embodiment might be used in the finance industry to generate XAI models that process temporal data such as, for example, stock market prices. In an exemplary embodiment which processes stock market prices, an exemplary generated XAI model may be used to issue buy and sell directives, for example. In this exemplary embodiment, the AI system may need to satisfy multiple requirements or objectives. Speed and quality of judgment may be prioritized in an exemplary embodiment. The XAI system may be faster than black-box equivalents, owing to the AutoXAI model search process that may also optimize the number of parameters to keep computations to a minimum. Quality of judgement may be supplemented by a white-box with an explanation describing the reasons why a certain buy or sell decision was made in a human-digestible format. This may also improve traceability and auditability, which may be salient in the finance industry.

In another exemplary embodiment, AutoXAI may be implemented using neuromorphic hardware. The model discovery and optimization of AutoXAI may also run entirely natively on appropriate neuromorphic hardware. Explainable models, such as XNNs, may allow neuromorphic architectures to be made understandable by presenting a white-box model that can be further presented to users in the form of rules and/or workflows. This surface representation form can be modified and seamlessly reconverted back into the neural, connectionist format that may be needed for neuromorphic hardware. Such an exemplary embodiment may provide a practical solution for editing, adding, and deleting relevant information and consequently changing the behavior of neuromorphic devices in a controlled, reliable, and replicable manner.

In another exemplary embodiment, AutoXAI may be implemented using a quantum processing system. It is contemplated that an AutoXAI system implemented on a quantum processing system will have rules and characteristics that are similar to classical explainable models with the addition of quantum specific extensions. For example, such an extension may allow for the specification of quantum annealing effects and their correct interpretation. In another example, an extension may allow for the correct interpretation of multiple qubit states, qubit basis states, mixed states, Ancilla bits, and other relevant quantum effects due to entanglement and/or decoherence. In another example, an extension may allow for the introduction of quantum logic specific operators and/or hardware logic gates within an XNN, such as quantum CNOT, CSWAP, XX, YY, ZZ gates, Pauli gates, Hadamard gates, Toffoli gates and other relevant quantum logic operations that may be combined serially or in parallel. Furthering these examples, such quantum specific extensions may be implemented in various parts of the AutoXAI system, for example by having quantum extended versions of MOO, PSO and GAs. It is further contemplated that such quantum extended versions of MOO, PSO and GAs may take advantage of quantum processing implementations, for example, to evaluate multiple objectives in MOO in significantly fewer processing steps needed than possible on a classic processing implementation. PSO may take advantage of quantum processing implementations to find minima and maxima faster and may also utilise analogue particle simulations to converge faster to a solution. GAs may take advantage of quantum processing implementations to perform more than one combination of crossover, mutation, and so on in a single step and evolve to better versions and variants of solutions quicker and more efficiently than possible on a classic processing implementation. AutoXAI may also use quantum processing implementations to search through multiple partitions and multiple possible ways of structuring such partitions faster. AutoXAI may also use quantum processing implementations to speed up the evaluation of potential edits such as the Modification/Addition/Deletion sequences as in FIG. 3A by potentially evaluating multiple such edit sequences simultaneously.

It another exemplary embodiment, an AutoXAI model search may be used to generate XAI models that may process sequence data. Sequence data may include a number of data points which contain feature data in various sequential formats including, but not limited to: 2D data, 3D data, transactional data, sensor data, image data, hyper-spectral data, natural language text, video data, audio data, haptic data, LIDAR data, RADAR data, SONAR data, and the like. Data points may have one or more associated labels which may indicate the output value or classification for a specific data point or a continuous or non-continuous interval of data points. Data point sequences may result from an internal and/or external process that may output a combination of synthetic data points, perturbed data, sampled data, or transformed data.

In another exemplary embodiment, an XAI system may monitor flight control input in an airplane. This may be implemented as software on the main flight computer or, if power efficiency is a concern, may be implemented as neuromorphic hardware or ASIC hardware requiring only a fraction of the power for the same computations as a conventional system. In parts of the flight envelope, some input may lead to dangerous instability or even irrecoverable situations, such as "deep stall" or "flat spin", respectively. An AI system may be able to analyze these situations in order to prevent them from happening. However, an exemplary XAI system may be able to explain which input configurations are causing dangerous flight conditions and offer suggested changes as part of the explanation, so that the pilot may quickly adjust the control stick input to recover good flight characteristics or, if deemed necessary, retain the current input. In a crisis this solution may save lives. The exemplary embodiment in FIG. 11 illustrates the flight control envelope of an exemplary airplane, containing the normal controlled flight region 1801 along with a safety buffer 1802, an unstable region 1803, and irrecoverable region 1804. An input configuration detected to be in the safety buffer is illustrated by a circle 1805. The explainable XAI system may be able to suggest quick remedial action to the pilots, so that they may exit the safety buffer with the smallest possible configuration change and enter within a range of normal flight operations 1806.

In situations involving complex physics such as flight dynamics, a causal model of the interactions may be implemented to reduce training time and improve performance. Unconstrained models may find it difficult to converge on a successful model.

In another exemplary embodiment, model search may be used to optimize an explainable generative adversarial network (explainable GAN or XGAN) in a context where realistic generation of customer data may be needed for business processes downstream. Thus, data generated with an unrealistic statistical distribution may need to be penalized or removed/ruled out. In the original customer database, a small fraction may be unemployed, and another small fraction may be company executives, but logically, these groups do not overlap. The generated data may need to satisfy the same mutual relationships between groups. If these relationships are known, constraints may help the model search process converge quickly on a good candidate solution. In this case, statistical constraints may be input into the model search as disallowed regions of the output data's probability distribution.

In an exemplary embodiment an AutoXAI system may be used for the generation and detection of synthetically generated multi-dimensional data. It is contemplated that suitable explainable models, such as Explainable Generative Adversarial Networks (XGANs) and/or Explainable Generative Adversarial Imitation Learning (XGAIL) model, may be used to extend the generation and detection capabilities of AutoXAI.

In another exemplary embodiment, an AutoXAI system may be implemented within a camera processing system to automatically generate, insert and blend accurately positioned, framed, scaled, lit, and rendered synthetic images of people and objects within a combination of actual imagery and computer-generated imagery. It is further contemplated that such a synthetic image blending system may be implemented within an Augmented Reality (AR), Virtual Reality (VR) or similar metaverse system. In a further exemplary embodiment, an AutoXAI based system may be implemented within portable hardware ocular devices that are utilized for AR/VR/metaverse applications, to perform real-time blending of synthetic images with real-life imagery or metaverse imagery. It is further contemplated that such an AutoXAI based system may be implemented within medical hardware for use within surgeries or analysis of medical images; within engineering applications for use in equipment inspection processes and manufacturing inspection processes; and within medical implants that transmit data in human readable and interpretable formats, such as within an electro-mechanical interface, an electro-chemical biological interface or an appropriate biological-electrical human machine interface such as a biological neuron-artificial AI system interface. In a further exemplary embodiment, an AutoXAI based system may be implemented as part of a medically implanted device that bridges two or more biological neurons, receiving input signals from a biological neuron and outputting signals to a biological neuron, in a suitably encoded format. It is contemplated that such applications may provide a practical solution for bridging damaged biological nervous system connections, for example, in paraplegic patients or assist in the implantation and connection of artificial devices such as cameras and other sensors in advanced prosthetic devices. It is further contemplated that the simulator and data sample synthesis of an XGAIL system implemented as part of an AutoXAI system will enable the AutoXAI system to generate multi-modal mixed output that is properly synchronized according to the relevant sequence ordering of the different modalities and the environmental world context (for example, temporal synchronization). It is further contemplated that such an exemplary AutoXAI system implementation may also be used to create novel data samples, imagery, digital and analogue mixed-media paintings, and 3D sculptures using a variety of learnt styles that can be used to modify the generated data samples appropriately, for example, to imitate a particular artistic style. It is further contemplated that such generated data samples may be tagged with some secure traceable digital code, distributed ledger entry or non-fungible token (NFT).

In an exemplary embodiment, a multi-modal AutoXAI implementation may be used to generate additional output in different modalities, for example, utilizing video generation to create accompanying video for music, pose estimation and deepfake generation models to create dance videos with realistic synthetically generated avatars with human-like movement and similar applications. It is further contemplated that a multi-modal AutoXAI implementation may be used to analyze input in different modalities, for example, to associate speech, pose estimation, text, and gesture identification to create realistically moving and behaving avatars in a virtual environment.

In another exemplary embodiment, AutoXAI model search may be used to generate an explainable autoencoder (XAED) for anomaly detection. In anomaly detection, AEDs may be included as part of a pipeline where they may attempt to reconstruct an input. If the reconstruction is poor, it may be the case that the input is an anomaly (fraudulent or abnormal). In this exemplary case, an XAED or an XAI that uses an AED as a component might be able to provide an explanation of the anomaly, highlighting the parts that determine the classification of the input observation as normal or anomalistic.

In another exemplary embodiment, an AutoXAI may be integrated with a Robotic Process Automation (RPA) system with a bi-directional exchange of information between the AutoXAI system and the RPA system. Symbolic information within the AutoXAI system may be made accessible to the RPA system, which can then take automated action accordingly. Conversely, RPA system information or operational states may be made accessible to the AutoXAI system for control and configuration purposes. It may be further contemplated that alternative exemplary embodiments can be practically implemented, where the RPA system may be substituted with a suitable alternative, such as an action-trigger system or a real-time control system.

In another exemplary embodiment, AutoXAI may be integrated with a workflow system with a bi-directional exchange of information between the AutoXAI system and the workflow system, including both processing data and event data. Symbolic information within the AutoXAI system may be made accessible to the workflow system, which can then take automated action accordingly. Conversely, workflow system information and workflow transition states or operational states may be made accessible to the AutoXAI system for control and configuration purposes. It is further contemplated that the AutoXAI and workflow combination may be further integrated within a Robotic Process Automation (RPA) system, Decision Support System (DSS) or a Data Lake system.

In another exemplary embodiment, an AutoXAI system may be combined with a larger machine learning system. It may be contemplated that one or more AutoXAI explainable models may be combined together to form a combined AutoXAI explainable model. It may be further contemplated that one or more AutoXAI explainable models and one or more non-AutoXAI explainable models may be combined together to form a combined explainable model.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer implemented method for performing a model search, comprising executing on a processor the steps of:
   receiving a training dataset and at least one exit condition;
   extracting a plurality of features from the training dataset;
   receiving one or more objectives and/or one or more pre-hoc constraints;
   mapping a plurality of feature costs to the extracted features to form a search space;
   sampling the search space and generating one or more seed candidates from the sampled search space based on the objectives and/or pre-hoc constraints;
   iteratively optimizing the one or more seed candidates until the exit condition is met, by iteratively performing one or more iterations in a loop, each iteration comprising the steps of:
      applying the set of pre-hoc constraints to the seed candidates to quantify a fitness level of each of the seed candidates;
      evaluating the fitness level of each of the seed candidates by comparing the fitness level to the objectives;
      storing a plurality of candidates from the plurality of seed candidates based on the pre-hoc constraints;
      training the candidates by applying one or more pre-determined training techniques;
      evaluating the candidates based on the post-hoc constraints, wherein the post-hoc constraints comprise at least one of performance, robustness, and explainability;

forming or updating, based on a fitness level of one or more candidates, a Pareto front comprising the one or more candidates;

checking if at least one of the one or more exit conditions has been reached, wherein if the exit conditions have not been reached, regenerating seed candidates identified based on the stored plurality of candidates on the Pareto front and performing another iteration of optimizing the seed candidates, or if at least one of the exit conditions has been reached, selecting one or more final candidates based on the seed candidates in the Pareto front, and exiting the loop; and outputting the final candidates.

2. The method of claim 1, wherein each of the seed candidates comprise an explainable artificial intelligence model, the explainable artificial intelligence model comprising one or more explainable neural network sub-graphs, and wherein the constraints are implemented as one or more of a graph, a hypergraph, or a simplicial complex.

3. The method of claim 1, wherein the seed candidates are generated by:

partitioning the dataset into one or more partitions;

fitting one or more local models to the one or more partitions, wherein a local model in the one or more local models corresponds to each partition in the one or more partitions, wherein fitting one or more local models to the one or more partitions comprises providing a local partition input to each partition in the one or more partitions and receiving a local partition output for said each partition in the one or more partitions, formulating, for each of the partitions in the one or more partitions, an equation with one or more coefficients and one or more features corresponding to said partition, wherein each of the one or more coefficients is assigned based on an importance of each of the one or more features in determining a final output, and wherein one or more of the coefficients are implemented in the local models based on a fast weighting technique whereby artificial neuron outputs directly modify weights of the one or more coefficients;

forming rules based on the one or more local models;

representing the rules in a symbolic logic format;

forming an explainable model for each seed candidate with the rules and the one or more local models.

4. The method of claim 2, further comprising generating the seed candidates using a model induction method.

5. The method of claim 1, further comprising identifying a plurality of observations from the training dataset and identifying the features from the observations.

6. The method of claim 1, further comprising receiving, from a user, a selection of candidates, and then performing the loop using the selection of candidates as the seed candidates.

7. The method of claim 1, wherein the objectives comprise at least one of performance, fairness, bias, and explainability.

8. The method of claim 1, wherein the feature cost is a function of two or more features, and calculating the feature cost as a fixed cost by averaging the feature costs of the two or more features over a representative sample of the training dataset.

9. The method of claim 1, wherein the feature cost is a function of a plurality of feature values, and further comprising calculating the feature cost as a fixed cost by the feature costs of corresponding features.

10. The method of claim 1, wherein the feature cost comprises a cost of using the corresponding feature.

11. The method of claim 1, wherein generating seed candidates is performed by randomly choosing seed candidates using a probability distribution function.

12. The method of claim 11, wherein the probability distribution function is one of a uniform distribution, Poisson distribution, Gaussian (normal) distribution, beta distribution, binomial distribution and log normal distribution.

13. The method of claim 1, wherein generating seed candidates is further based on at least one of: one or more algorithm hyperparameters and user selected features.

14. The method of claim 1, wherein the pre-hoc constraints comprise soft constraints and hard constraints, wherein soft constraints comprise a fitness metric, and hard constraints comprise a disallowed region of the search space, and further comprising implementing a separate explainable model or symbolic sub-graph to identify hard constraints.

15. The method of claim 1, wherein the predetermined training techniques comprise one or more of backpropagation, backpropagation through time, evolutionary methods, particle swarm optimization, Hebbian learning, Bayesian methods, Monte Carlo methods and reinforcement learning.

16. The method of claim 1, wherein the candidates are clustered using an unsupervised learning technique to identify candidates within the plurality of candidates to create the Pareto front.

17. The method of claim 1, wherein the regenerating seed candidates further comprises recombining and mutating the candidates on the Pareto front.

18. The method of claim 1, wherein the regenerating seed candidates further comprises implementing one or more reinforcement learning agents, wherein each reinforcement learning agent is configured to operate independently while communicating processes and decisions to the other reinforcement learning agents, and where the reinforcement learning agents are structured using an Identify-Assess-Resolve framework.

19. The method of claim 1, wherein the regenerating seed candidates further comprises implementing transfer learning to transfer the candidates to seed candidates.

20. The method of claim 1, wherein the optimizing the one or more seed candidates further comprises, after training the candidates, presenting the candidates to a user, and receiving, from the user, a selection of the candidates to remove from the plurality of candidates.

21. The method of claim 1, further comprising, before regenerating seed candidates identified based on the candidates, storing the seed candidates as a set of previous seed candidates, and after regenerating seed candidates based on the plurality of candidates on the Pareto front, comparing the regenerated seed candidates with the previous seed candidates to identify one or more differences between the regenerated seed candidates and the previous seed candidates, wherein the identified differences are greater than a predetermined difference threshold, and outputting a flag describing the one or more identified differences.

22. The method of claim 21, wherein the differences are identified by comparing coefficients or weights associated with an explainable model within the seed candidates.

23. The method of claim 21, further comprising presenting a user with the identified differences.

24. The method of claim 1, wherein the method is implemented on a distributed architecture implemented using one or more of: a Horovod technique, a hierarchy of machine experts, and intelligent message passing.

25. The method of claim 1, further comprising generating source code in a formal programming language based on the final candidates.

26. The method of claim 1, further comprising forming a causal model based on an analysis of at least one of an existing source code, workflow, flowchart descriptions, a set of rules, or a symbolic description associated with the training dataset.

27. The method of claim 1, further comprising identifying a Strength and Weakness metric comprising a two-dimensional vector indicating a strength value and a certainty value.

28. The method of claim 1, further comprising, during the loop, monitoring for at least one of anomalies, variances, and deviations from a normal operational state.

29. A non-transitory computer-readable medium containing program code that, when executed, causes a processor to perform steps of:
   receiving a training dataset, wherein the training dataset comprises training data and at least one exit condition;
   identifying a plurality of features from the training dataset;
   receiving or defining one or more objectives and/or one or more pre-hoc constraints, conditions, actions, triggers, and events;
   mapping a plurality of feature costs to the identified features to form a search space;
   sampling the search space and generating one or more seed candidates from the sampled search space based on the objectives and/or pre-hoc constraints;
   iteratively optimizing the one or more seed candidates until the exit condition is met, by iteratively performing one or more iterations in a loop, each iteration comprising the steps of:
      applying the set of pre-hoc constraints to the seed candidates to quantify a fitness level corresponding to each of the seed candidates;
      evaluating the fitness level of each of the seed candidates by comparing the fitness level to one or more objectives;
      storing a plurality of candidates from the plurality of seed candidates based on the pre-hoc constraints and objectives;
      training the candidates by applying one or more predetermined training techniques;
      evaluating the candidates based on post-hoc constraints, wherein the post-hoc constraints comprise at least one of performance, robustness, and explainability;
      forming or updating, based on a fitness level of one or more candidates, a Pareto front comprising the one or more candidates;
      checking if at least one of the one or more exit conditions has been reached, wherein
         if the exit conditions have not been reached, regenerating seed candidates identified based on the stored plurality of candidates on the Pareto front and performing another iteration of optimizing the seed candidates, or
         if at least one of the exit conditions has been reached, selecting one or more final candidates based on the seed candidates in the Pareto front, and exiting the loop; and outputting the final candidates.

30. The method of claim 29, wherein the objectives comprise at least one of performance and explainability, and where the objectives, constraints, conditions, actions, triggers, and events are implemented in one of an abductive logic, inductive logic, deductive logic in combination with causal logic.

* * * * *